US009041826B2

(12) United States Patent
Jung et al.

(10) Patent No.: US 9,041,826 B2
(45) Date of Patent: May 26, 2015

(54) CAPTURING SELECTED IMAGE OBJECTS

(75) Inventors: Edward K. Y. Jung, Bellevue, WA (US);
Royce A. Levien, Lexington, MA (US);
Robert W. Lord, Seattle, WA (US);
Mark A. Malamud, Seattle, WA (US);
John D. Rinaldo, Jr., Bellevue, WA (US)

(73) Assignee: The Invention Science Fund I, LLC, Bellevue, WA (US)

( * ) Notice: Subject to any disclaimer, the term of this patent is extended or adjusted under 35 U.S.C. 154(b) by 1650 days.

(21) Appl. No.: 11/506,760

(22) Filed: Aug. 18, 2006

(65) Prior Publication Data

US 2007/0040928 A1    Feb. 22, 2007

Related U.S. Application Data

(63) Continuation-in-part of application No. 11/143,970, filed on Jun. 2, 2005.

(51) Int. Cl.
*H04N 5/235* (2006.01)
*H04N 5/238* (2006.01)
(Continued)

(52) U.S. Cl.
CPC ....... *H04N 1/2166* (2013.01); *H04N 21/25875* (2013.01); *H04N 1/00251* (2013.01); *H04N 1/2187* (2013.01); *H04N 5/76* (2013.01); *H04N 7/0122* (2013.01); *H04N 7/17318* (2013.01); *H04N 21/472* (2013.01); *H04N 2101/00* (2013.01); *H04N 2201/212* (2013.01); *H04N 21/4627* (2013.01); *H04N 2201/216* (2013.01); *H04N 2201/214* (2013.01);
(Continued)

(58) Field of Classification Search
USPC ........ 348/231.99, 231.6, 220.1, 221.1, 223.1, 348/231.5, 333.05, 333.09, 333.11, 207.99, 348/241, 222.1, 362, 218, 239, 333.01; 345/326
See application file for complete search history.

(56) References Cited

U.S. PATENT DOCUMENTS 4,124,871 A    11/1978   Morrin, II
4,249,218 A    2/1981    Davis et al.
(Continued)

FOREIGN PATENT DOCUMENTS

EP    0940711 B1    11/2003
JP    5064225       3/1993
(Continued)

OTHER PUBLICATIONS

U.S. Appl. No. 11/703,063, Jung et al.
(Continued)

*Primary Examiner* — Ahmed A Berhan

(57) ABSTRACT

Exemplary embodiments provide a technique that processes captured images derived from selected targeted objects in a field of view. The captured images may be transferred via a communication link to a storage location for future availability. A possible aspect may provide a cross-reference association between saved multiple exposures having different quality characteristics. In some instances an identifier record is provided to enable future accessibility to selected captured data by one or more authorized parties or approved devices or authorized recipients. In some embodiments the captured data may include both a video data stream and one or more still image frames derived from related fields of view. Stored versions of the captured images may be provided in original or altered form to be incorporated in a composite visual work.

64 Claims, 61 Drawing Sheets

(51) Int. Cl.
*H04N 5/225* (2006.01)
*H04N 5/222* (2006.01)
*H04N 21/258* (2011.01)
*H04N 1/00* (2006.01)
*H04N 1/21* (2006.01)
*H04N 5/76* (2006.01)
*H04N 7/01* (2006.01)
*H04N 7/173* (2011.01)
*H04N 21/472* (2011.01)
*H04N 21/4627* (2011.01)
*H04N 21/4143* (2011.01)
*H04N 101/00* (2006.01)
*G11B 27/32* (2006.01)
*H04N 1/32* (2006.01)

(52) U.S. Cl.
CPC ........... *G11B 27/32* (2013.01); *H04N 1/32122* (2013.01); *H04N 21/4143* (2013.01)

(56) References Cited

U.S. PATENT DOCUMENTS

| | | | |
|---|---|---|---|
| 4,763,146 A | 8/1988 | Niikura | |
| 4,788,565 A | 11/1988 | Masuda et al. | |
| 4,829,384 A | 5/1989 | Iida et al. | |
| 4,862,280 A | 8/1989 | Iida et al. | |
| 5,001,504 A | 3/1991 | Okada | |
| 5,034,759 A | 7/1991 | Watson | |
| 5,150,215 A | 9/1992 | Shi | |
| 5,164,831 A | 11/1992 | Kuchta et al. | |
| 5,341,192 A | 8/1994 | Wally, Jr. et al. | |
| 5,388,197 A | 2/1995 | Rayner | |
| 5,410,343 A | 4/1995 | Coddington et al. | |
| 5,444,476 A | 8/1995 | Conway | |
| 5,467,288 A | 11/1995 | Faciano et al. | |
| 5,485,553 A | 1/1996 | Kovalick et al. | |
| 5,485,554 A | 1/1996 | Lowitz et al. | |
| 5,493,353 A | 2/1996 | Chen | |
| 5,546,145 A | 8/1996 | Bernardi et al. | |
| 5,561,883 A | 10/1996 | Landry et al. | |
| 5,588,029 A | 12/1996 | Maturi et al. | |
| 5,612,715 A | 3/1997 | Karaki et al. | |
| 5,629,778 A | 5/1997 | Reuman | |
| 5,633,678 A * | 5/1997 | Parulski et al. | 348/231.5 |
| 5,655,144 A | 8/1997 | Milne et al. | |
| 5,659,662 A | 8/1997 | Wilcox et al. | |
| 5,675,789 A | 10/1997 | Ishii et al. | |
| 5,689,343 A | 11/1997 | Loce et al. | |
| 5,689,442 A | 11/1997 | Swanson et al. | |
| 5,701,163 A | 12/1997 | Richards et al. | |
| 5,715,487 A | 2/1998 | McIntyre et al. | |
| 5,738,522 A | 4/1998 | Sussholz et al. | |
| 5,751,338 A | 5/1998 | Ludwig, Jr. | |
| 5,764,800 A | 6/1998 | Yamagata | |
| 5,793,630 A | 8/1998 | Theimer et al. | |
| 5,796,879 A | 8/1998 | Wong et al. | |
| 5,809,161 A | 9/1998 | Auty et al. | |
| 5,818,977 A | 10/1998 | Tansley | |
| 5,825,506 A | 10/1998 | Bednar et al. | |
| 5,852,753 A | 12/1998 | Lo et al. | |
| 5,867,614 A | 2/1999 | Ito | |
| 5,889,895 A | 3/1999 | Wong et al. | |
| 5,892,509 A | 4/1999 | Jakobs et al. | |
| 5,915,135 A | 6/1999 | Fiorentini | |
| 5,917,958 A | 6/1999 | Nunally et al. | |
| 5,917,962 A | 6/1999 | Chen et al. | |
| 5,926,605 A | 7/1999 | Ichimura | |
| 5,949,484 A | 9/1999 | Nakaya et al. | |
| 5,956,081 A | 9/1999 | Katz et al. | |
| 5,959,622 A * | 9/1999 | Greer et al. | 715/719 |
| 5,977,867 A | 11/1999 | Blouin | |
| 5,995,095 A | 11/1999 | Ratakonda | |
| 6,011,901 A | 1/2000 | Kirsten | |
| 6,021,403 A | 2/2000 | Horvitz et al. | |
| 6,028,585 A | 2/2000 | Ishii et al. | |
| 6,034,786 A | 3/2000 | Kwon | |
| 6,046,762 A | 4/2000 | Sonesh et al. | |
| 6,107,918 A | 8/2000 | Klein et al. | |
| 6,115,341 A | 9/2000 | Hirai | |
| 6,122,003 A | 9/2000 | Anderson | |
| 6,122,411 A | 9/2000 | Shen et al. | |
| 6,134,345 A | 10/2000 | Berman et al. | |
| 6,157,406 A | 12/2000 | Iura et al. | |
| 6,157,935 A | 12/2000 | Tran et al. | |
| 6,167,350 A | 12/2000 | Hiramatsu et al. | |
| 6,167,469 A | 12/2000 | Safai et al. | |
| 6,177,958 B1 | 1/2001 | Anderson | |
| 6,188,383 B1 | 2/2001 | Tamura | |
| 6,198,526 B1 | 3/2001 | Ohtsuka | |
| 6,222,465 B1 | 4/2001 | Kumar et al. | |
| 6,229,565 B1 | 5/2001 | Bobry | |
| 6,229,850 B1 | 5/2001 | Linzer et al. | |
| 6,275,260 B1 | 8/2001 | Anderson | |
| 6,282,377 B1 | 8/2001 | Lawther et al. | |
| 6,285,794 B1 | 9/2001 | Georgiev et al. | |
| 6,332,666 B1 | 12/2001 | Ikeda | |
| 6,333,792 B1 | 12/2001 | Kimura | |
| 6,359,649 B1 | 3/2002 | Suzuki | |
| 6,366,577 B1 | 4/2002 | Donovan | |
| 6,380,972 B1 | 4/2002 | Suga et al. | |
| 6,384,862 B1 | 5/2002 | Brusewitz et al. | |
| 6,400,848 B1 | 6/2002 | Gallagher | |
| 6,411,742 B1 | 6/2002 | Peterson | |
| 6,437,797 B1 | 8/2002 | Ota | |
| 6,445,822 B1 | 9/2002 | Crill et al. | |
| 6,446,095 B1 | 9/2002 | Mukai | |
| 6,452,974 B1 | 9/2002 | Menon et al. | |
| 6,456,339 B1 | 9/2002 | Surati et al. | |
| 6,476,858 B1 | 11/2002 | Ramirez Diaz et al. | |
| 6,493,028 B1 | 12/2002 | Anderson et al. | |
| 6,499,016 B1 | 12/2002 | Anderson | |
| 6,509,931 B1 | 1/2003 | Mizosoe et al. | |
| 6,512,541 B2 | 1/2003 | Dunton et al. | |
| 6,516,154 B1 | 2/2003 | Parulski et al. | |
| 6,519,612 B1 | 2/2003 | Howard et al. | |
| 6,522,418 B2 | 2/2003 | Yokomizo et al. | |
| 6,535,228 B1 | 3/2003 | Bandaru et al. | |
| 6,539,169 B1 | 3/2003 | Tsubaki et al. | |
| 6,542,183 B1 | 4/2003 | DeAngelis et al. | |
| 6,546,189 B1 | 4/2003 | Koda | |
| 6,567,122 B1 | 5/2003 | Anderson et al. | |
| 6,573,927 B2 | 6/2003 | Parulski et al. | |
| 6,577,311 B1 | 6/2003 | Crosby et al. | |
| 6,577,336 B2 | 6/2003 | Safai | |
| 6,587,602 B2 | 7/2003 | Wakisawa et al. | |
| 6,611,293 B2 | 8/2003 | Tarnoff et al. | |
| 6,629,104 B1 | 9/2003 | Parulski et al. | |
| 6,633,309 B2 | 10/2003 | Lau et al. | |
| 6,646,676 B1 | 11/2003 | DaGraca et al. | |
| 6,650,366 B2 | 11/2003 | Parulski et al. | |
| 6,650,704 B1 | 11/2003 | Carlson et al. | |
| 6,654,543 B2 | 11/2003 | Ando et al. | |
| 6,657,667 B1 | 12/2003 | Anderson | |
| 6,678,413 B1 | 1/2004 | Liang et al. | |
| 6,680,748 B1 | 1/2004 | Monti | |
| 6,687,877 B1 | 2/2004 | Sastry et al. | |
| 6,698,021 B1 | 2/2004 | Amini et al. | |
| 6,701,845 B2 | 3/2004 | Ohmura | |
| 6,710,809 B1 | 3/2004 | Niikawa | |
| 6,714,192 B1 | 3/2004 | Torres | |
| 6,734,911 B1 | 5/2004 | Lyons | |
| 6,735,253 B1 | 5/2004 | Chang et al. | |
| 6,738,155 B1 | 5/2004 | Rosenlund et al. | |
| 6,741,864 B2 | 5/2004 | Wilcock et al. | |
| 6,750,902 B1 | 6/2004 | Steinberg et al. | |
| 6,757,008 B1 | 6/2004 | Smith | |
| 6,757,431 B2 | 6/2004 | Loce et al. | |
| 6,757,480 B1 | 6/2004 | Moon et al. | |
| 6,762,791 B1 | 7/2004 | Schuetzle | |
| 6,766,036 B1 | 7/2004 | Pryor | |
| 6,801,719 B1 | 10/2004 | Szajewski et al. | |
| 6,813,312 B2 | 11/2004 | Tullberg et al. | |
| 6,816,071 B2 | 11/2004 | Conti | |

(56) References Cited

U.S. PATENT DOCUMENTS

| | | | |
|---|---|---|---|
| 6,822,660 B2 | 11/2004 | Kim | |
| 6,823,092 B1 | 11/2004 | Sato | |
| 6,832,009 B1 | 12/2004 | Shezaf et al. | |
| 6,871,010 B1 | 3/2005 | Taguchi et al. | |
| 6,879,731 B2 | 4/2005 | Kang et al. | |
| 6,885,395 B1 | 4/2005 | Rabbani et al. | |
| 6,898,173 B2 | 5/2005 | McPherson et al. | |
| 6,903,763 B1 | 6/2005 | Noguchi et al. | |
| 6,928,230 B2 | 8/2005 | Squibbs | |
| 6,930,707 B2 | 8/2005 | Bates et al. | |
| 6,947,075 B1 | 9/2005 | Niikawa | |
| 6,954,224 B1 | 10/2005 | Okada et al. | |
| 6,961,083 B2 | 11/2005 | Obrador et al. | |
| 6,961,087 B1 | 11/2005 | Yoshida | |
| 6,967,780 B2 | 11/2005 | Hillis et al. | |
| 6,978,047 B2 | 12/2005 | Montgomery | |
| 6,987,528 B1 | 1/2006 | Nagahisa et al. | |
| 6,999,626 B2 | 2/2006 | Andrew | |
| 7,015,949 B1 | 3/2006 | Sah | |
| 7,015,954 B1 | 3/2006 | Foote et al. | |
| 7,023,469 B1 | 4/2006 | Olson | |
| 7,046,273 B2 | 5/2006 | Suzuki | |
| 7,046,292 B2 | 5/2006 | Ziemkowski | |
| 7,068,316 B1 | 6/2006 | Pine | |
| 7,075,567 B2 | 7/2006 | Hunter et al. | |
| 7,079,176 B1 | 7/2006 | Freeman et al. | |
| 7,084,910 B2 * | 8/2006 | Amerson et al. | 348/239 |
| 7,110,025 B1 | 9/2006 | Loui et al. | |
| 7,110,027 B2 | 9/2006 | Wyman | |
| 7,196,317 B1 | 3/2007 | Meissner, II et al. | |
| 7,203,648 B1 | 4/2007 | Ostermann et al. | |
| 7,218,792 B2 | 5/2007 | Raskar et al. | |
| 7,219,365 B2 | 5/2007 | Sato et al. | |
| 7,221,863 B2 | 5/2007 | Kondo et al. | |
| 7,227,569 B2 | 6/2007 | Maruya | |
| 7,236,690 B2 | 6/2007 | Matsukawa | |
| 7,257,317 B2 | 8/2007 | Ohnishi | |
| 7,287,088 B1 | 10/2007 | Anderson | |
| 7,292,229 B2 | 11/2007 | Morag et al. | |
| 7,327,387 B2 | 2/2008 | Tanaka et al. | |
| 7,333,134 B2 | 2/2008 | Miyamoto | |
| 7,339,623 B2 | 3/2008 | Kawai | |
| 7,340,766 B2 | 3/2008 | Nagao et al. | |
| 7,362,968 B2 | 4/2008 | Kim | |
| 7,366,979 B2 | 4/2008 | Spielberg et al. | |
| 7,379,116 B2 | 5/2008 | Okamura | |
| 7,383,508 B2 | 6/2008 | Toyama et al. | |
| 7,411,623 B2 | 8/2008 | Shibutani | |
| 7,417,667 B2 | 8/2008 | Shibutani | |
| 7,444,593 B1 | 10/2008 | Reid | |
| 7,448,063 B2 | 11/2008 | Freeman et al. | |
| 7,460,495 B2 | 12/2008 | Li | |
| 7,504,942 B2 | 3/2009 | Marman | |
| 7,529,411 B2 | 5/2009 | Haupt et al. | |
| 7,535,491 B1 | 5/2009 | Kumagai et al. | |
| 7,551,787 B2 | 6/2009 | Marks | |
| 7,576,770 B2 | 8/2009 | Metzger et al. | |
| 7,587,674 B2 | 9/2009 | Broeksteeg | |
| 7,612,804 B1 | 11/2009 | Marcu et al. | |
| 7,612,806 B2 | 11/2009 | Kazami et al. | |
| 7,626,614 B1 | 12/2009 | Marcu | |
| 7,626,733 B2 | 12/2009 | Kodama et al. | |
| 7,650,058 B1 | 1/2010 | Garoutte | |
| 7,733,371 B1 | 6/2010 | Monroe | |
| 7,751,628 B1 | 7/2010 | Reisman | |
| 7,782,365 B2 | 8/2010 | Levien et al. | |
| 7,860,319 B2 | 12/2010 | Obrador et al. | |
| 7,872,675 B2 | 1/2011 | Levien et al. | |
| 7,904,814 B2 | 3/2011 | Errico et al. | |
| 7,924,324 B2 | 4/2011 | Fujita | |
| 8,026,944 B1 | 9/2011 | Sah | |
| 8,098,287 B2 | 1/2012 | Misawa et al. | |
| 8,350,946 B2 | 1/2013 | Jung et al. | |
| 2001/0015756 A1 | 8/2001 | Wilcock et al. | |
| 2001/0028398 A1 | 10/2001 | Takahashi | |
| 2001/0029521 A1 | 10/2001 | Matsuda et al. | |
| 2001/0030709 A1 | 10/2001 | Tarnoff et al. | |
| 2001/0031005 A1 | 10/2001 | Nister et al. | |
| 2001/0033333 A1 | 10/2001 | Suzuki et al. | |
| 2001/0042043 A1 | 11/2001 | Shear et al. | |
| 2001/0046199 A1 | 11/2001 | McPherson et al. | |
| 2001/0050875 A1 | 12/2001 | Kahn et al. | |
| 2002/0012071 A1 | 1/2002 | Sun | |
| 2002/0015094 A1 | 2/2002 | Kuwano et al. | |
| 2002/0028026 A1 | 3/2002 | Chen et al. | |
| 2002/0028060 A1 | 3/2002 | Murata et al. | |
| 2002/0030749 A1 | 3/2002 | Nakamura et al. | |
| 2002/0054232 A1 | 5/2002 | Inagaki | |
| 2002/0069036 A1 | 6/2002 | Mizokawa | |
| 2002/0090217 A1 | 7/2002 | Limor et al. | |
| 2002/0145622 A1 | 10/2002 | Kauffman et al. | |
| 2002/0149677 A1 | 10/2002 | Wright | |
| 2002/0171737 A1 | 11/2002 | Tullis | |
| 2002/0171747 A1 | 11/2002 | Niikawa et al. | |
| 2002/0176016 A1 | 11/2002 | Misawa et al. | |
| 2002/0176508 A1 | 11/2002 | Boyce et al. | |
| 2002/0186668 A1 | 12/2002 | Thomason | |
| 2002/0191952 A1 | 12/2002 | Fiore et al. | |
| 2002/0196344 A1 | 12/2002 | McIntyre et al. | |
| 2002/0197067 A1 | 12/2002 | Ohnishi | |
| 2003/0007078 A1 | 1/2003 | Feldis, III | |
| 2003/0018802 A1 | 1/2003 | Romanik et al. | |
| 2003/0020814 A1 | 1/2003 | Ono | |
| 2003/0021455 A1 | 1/2003 | Dixon et al. | |
| 2003/0026596 A1 | 2/2003 | Betti et al. | |
| 2003/0037111 A1 | 2/2003 | Yoshioka | |
| 2003/0058265 A1 | 3/2003 | Robinson et al. | |
| 2003/0063114 A1 | 4/2003 | Nishida | |
| 2003/0063211 A1 | 4/2003 | Watanabe et al. | |
| 2003/0069898 A1 | 4/2003 | Christodoulou et al. | |
| 2003/0070174 A1 | 4/2003 | Solomon | |
| 2003/0072491 A1 | 4/2003 | Sirivara et al. | |
| 2003/0080878 A1 | 5/2003 | Kirmuss | |
| 2003/0081140 A1 | 5/2003 | Furukawa | |
| 2003/0090690 A1 | 5/2003 | Katayama et al. | |
| 2003/0095191 A1 | 5/2003 | Saito | |
| 2003/0103144 A1 | 6/2003 | Sesek et al. | |
| 2003/0103670 A1 | 6/2003 | Schoelkopf et al. | |
| 2003/0112261 A1 | 6/2003 | Zhang | |
| 2003/0112354 A1 | 6/2003 | Ortiz et al. | |
| 2003/0113014 A1 | 6/2003 | Katoh | |
| 2003/0117505 A1 | 6/2003 | Sasaki et al. | |
| 2003/0117642 A1 | 6/2003 | Haraguchi | |
| 2003/0131002 A1 | 7/2003 | Gennetten et al. | |
| 2003/0151679 A1 * | 8/2003 | Amerson et al. | 348/231.6 |
| 2003/0152263 A1 | 8/2003 | Kawano et al. | |
| 2003/0160870 A1 | 8/2003 | Ziemkowski | |
| 2003/0162556 A1 | 8/2003 | Libes | |
| 2003/0189654 A1 | 10/2003 | Kage et al. | |
| 2003/0206232 A1 | 11/2003 | Suzuki et al. | |
| 2003/0222998 A1 | 12/2003 | Yamauchi et al. | |
| 2003/0226023 A1 | 12/2003 | Peters | |
| 2003/0227560 A1 | 12/2003 | Mattsson et al. | |
| 2003/0229894 A1 | 12/2003 | Okada et al. | |
| 2003/0234953 A1 | 12/2003 | Dawson et al. | |
| 2003/0236674 A1 | 12/2003 | Henry, Jr. | |
| 2003/0236831 A1 | 12/2003 | Ortiz et al. | |
| 2003/0236832 A1 | 12/2003 | McIntyre et al. | |
| 2004/0001145 A1 | 1/2004 | Abbate | |
| 2004/0001161 A1 | 1/2004 | Herley | |
| 2004/0017333 A1 | 1/2004 | Cooper et al. | |
| 2004/0032517 A1 | 2/2004 | Walmsley et al. | |
| 2004/0037540 A1 | 2/2004 | Frohlich et al. | |
| 2004/0042679 A1 | 3/2004 | Yamada | |
| 2004/0046885 A1 | 3/2004 | Regan et al. | |
| 2004/0056960 A1 | 3/2004 | Hayashi | |
| 2004/0066968 A1 | 4/2004 | Glickman | |
| 2004/0070586 A1 | 4/2004 | Taubin | |
| 2004/0070678 A1 | 4/2004 | Toyama et al. | |
| 2004/0071445 A1 | 4/2004 | Tarnoff et al. | |
| 2004/0075750 A1 | 4/2004 | Bateman | |
| 2004/0080537 A1 | 4/2004 | Adler | |
| 2004/0085456 A1 | 5/2004 | Kwag et al. | |
| 2004/0095474 A1 | 5/2004 | Matsufune | |

(56) References Cited

U.S. PATENT DOCUMENTS

| | | |
|---|---|---|
| 2004/0108995 A1 | 6/2004 | Hoshino et al. |
| 2004/0119733 A1 | 6/2004 | Morimoto et al. |
| 2004/0119841 A1 | 6/2004 | Shimizu |
| 2004/0120562 A1 | 6/2004 | Hays et al. |
| 2004/0123131 A1 | 6/2004 | Zacks et al. |
| 2004/0130634 A1* | 7/2004 | Delaney et al. ......... 348/231.99 |
| 2004/0131282 A1 | 7/2004 | Yoshida et al. |
| 2004/0141056 A1 | 7/2004 | Izumi et al. |
| 2004/0145501 A1 | 7/2004 | Hung |
| 2004/0145657 A1 | 7/2004 | Yamamoto et al. |
| 2004/0150641 A1 | 8/2004 | Duiker |
| 2004/0150724 A1 | 8/2004 | Nozaki et al. |
| 2004/0160453 A1 | 8/2004 | Horton et al. |
| 2004/0166930 A1 | 8/2004 | Beaulieu et al. |
| 2004/0174434 A1 | 9/2004 | Walker et al. |
| 2004/0174454 A1 | 9/2004 | Okamura |
| 2004/0179121 A1 | 9/2004 | Silverstein |
| 2004/0179545 A1 | 9/2004 | Erola et al. |
| 2004/0183903 A1 | 9/2004 | Pedersen |
| 2004/0187583 A1 | 9/2004 | Ogawa |
| 2004/0189856 A1 | 9/2004 | Tanaka |
| 2004/0196399 A1 | 10/2004 | Stavely |
| 2004/0201683 A1 | 10/2004 | Murashita et al. |
| 2004/0201690 A1 | 10/2004 | Bryant et al. |
| 2004/0201709 A1 | 10/2004 | McIntyre et al. |
| 2004/0201748 A1 | 10/2004 | Goldstein et al. |
| 2004/0216173 A1 | 10/2004 | Horoszowski et al. |
| 2004/0218894 A1 | 11/2004 | Harville et al. |
| 2004/0221063 A1 | 11/2004 | Mogul |
| 2004/0233308 A1 | 11/2004 | Elliot et al. |
| 2004/0239958 A1 | 12/2004 | Nagata et al. |
| 2004/0243419 A1 | 12/2004 | Wang |
| 2004/0252193 A1 | 12/2004 | Higgins |
| 2004/0252230 A1 | 12/2004 | Winder |
| 2004/0257462 A1 | 12/2004 | Goris et al. |
| 2004/0263609 A1 | 12/2004 | Otsuki et al. |
| 2004/0263658 A1 | 12/2004 | Cozier et al. |
| 2005/0007471 A1 | 1/2005 | Walmsley et al. |
| 2005/0013602 A1 | 1/2005 | Ogawa |
| 2005/0017947 A1 | 1/2005 | Shahoian et al. |
| 2005/0018053 A1 | 1/2005 | Suga et al. |
| 2005/0028221 A1 | 2/2005 | Liu et al. |
| 2005/0033991 A1 | 2/2005 | Crane |
| 2005/0036033 A1 | 2/2005 | Imai |
| 2005/0046707 A1 | 3/2005 | Takane |
| 2005/0047676 A1 | 3/2005 | Kang et al. |
| 2005/0050043 A1 | 3/2005 | Pyhalammi et al. |
| 2005/0057687 A1 | 3/2005 | Irani et al. |
| 2005/0058321 A1 | 3/2005 | Buehler |
| 2005/0084037 A1 | 4/2005 | Liang |
| 2005/0086391 A1 | 4/2005 | Chu et al. |
| 2005/0088417 A1 | 4/2005 | Mulligan |
| 2005/0093980 A1 | 5/2005 | Nonaka et al. |
| 2005/0099519 A1 | 5/2005 | Creamer et al. |
| 2005/0103863 A1 | 5/2005 | Zhu et al. |
| 2005/0105806 A1 | 5/2005 | Nagaoka et al. |
| 2005/0113136 A1 | 5/2005 | Gosieski, Jr. |
| 2005/0130717 A1 | 6/2005 | Gosieski, Jr. et al. |
| 2005/0131905 A1 | 6/2005 | Margolus et al. |
| 2005/0140803 A1 | 6/2005 | Ohtsuka et al. |
| 2005/0150362 A1 | 7/2005 | Uehara |
| 2005/0158015 A1 | 7/2005 | Nakayama et al. |
| 2005/0162533 A1 | 7/2005 | Noguchi et al. |
| 2005/0162965 A1 | 7/2005 | Fukuda et al. |
| 2005/0169367 A1 | 8/2005 | Venetianer et al. |
| 2005/0185062 A1 | 8/2005 | Hillis et al. |
| 2005/0187901 A1 | 8/2005 | Maritzen et al. |
| 2005/0193421 A1 | 9/2005 | Cragun |
| 2005/0195285 A1 | 9/2005 | Ide |
| 2005/0203930 A1 | 9/2005 | Bukowski et al. |
| 2005/0207487 A1 | 9/2005 | Monroe |
| 2005/0210267 A1 | 9/2005 | Sugano et al. |
| 2005/0212912 A1 | 9/2005 | Huster |
| 2005/0212950 A1 | 9/2005 | Kanai |
| 2005/0231625 A1 | 10/2005 | Parulski et al. |
| 2005/0237388 A1 | 10/2005 | Tani |
| 2005/0243176 A1 | 11/2005 | Wu et al. |
| 2005/0262097 A1 | 11/2005 | Sim-Tang et al. |
| 2005/0271251 A1 | 12/2005 | Russell et al. |
| 2005/0275747 A1 | 12/2005 | Nayar et al. |
| 2006/0008254 A1 | 1/2006 | Seo |
| 2006/0023066 A1 | 2/2006 | Li et al. |
| 2006/0034533 A1 | 2/2006 | Batchvarov |
| 2006/0044398 A1 | 3/2006 | Foong et al. |
| 2006/0044416 A1 | 3/2006 | Miyazaki et al. |
| 2006/0044444 A1 | 3/2006 | Okamoto et al. |
| 2006/0048057 A1 | 3/2006 | Herberger et al. |
| 2006/0050785 A1 | 3/2006 | Watanabe et al. |
| 2006/0056326 A1 | 3/2006 | Croome |
| 2006/0072837 A1 | 4/2006 | Ralston et al. |
| 2006/0083298 A1 | 4/2006 | Wang et al. |
| 2006/0085534 A1 | 4/2006 | Ralston et al. |
| 2006/0087559 A1 | 4/2006 | Huberman et al. |
| 2006/0092291 A1 | 5/2006 | Bodie |
| 2006/0098112 A1 | 5/2006 | Kelly |
| 2006/0104483 A1 | 5/2006 | Harel et al. |
| 2006/0109349 A1 | 5/2006 | Takashima |
| 2006/0119711 A1* | 6/2006 | Ejima et al. ............... 348/222.1 |
| 2006/0125922 A1 | 6/2006 | Albert et al. |
| 2006/0143665 A1 | 6/2006 | Meek et al. |
| 2006/0173756 A1 | 8/2006 | Benight |
| 2006/0174204 A1 | 8/2006 | Jung et al. |
| 2006/0176392 A1 | 8/2006 | Rainier et al. |
| 2006/0177150 A1 | 8/2006 | Uyttendaele et al. |
| 2006/0192887 A1 | 8/2006 | Miyamaki et al. |
| 2006/0195322 A1 | 8/2006 | Broussard et al. |
| 2006/0197839 A1 | 9/2006 | Senior et al. |
| 2006/0203099 A1 | 9/2006 | Omata |
| 2006/0209089 A1 | 9/2006 | Date |
| 2006/0226298 A1 | 10/2006 | Pierson |
| 2006/0268117 A1 | 11/2006 | Loui et al. |
| 2006/0274165 A1 | 12/2006 | Levien et al. |
| 2006/0288273 A1 | 12/2006 | Erol et al. |
| 2007/0097214 A1 | 5/2007 | Jung et al. |
| 2007/0100533 A1 | 5/2007 | Jung et al. |
| 2007/0100606 A1 | 5/2007 | Rogers |
| 2007/0100621 A1 | 5/2007 | Jung et al. |
| 2007/0100860 A1 | 5/2007 | Jung et al. |
| 2007/0120980 A1 | 5/2007 | Jung et al. |
| 2007/0217761 A1 | 9/2007 | Chen et al. |
| 2007/0274705 A1 | 11/2007 | Kashiwa et al. |
| 2008/0023232 A1 | 1/2008 | Morag et al. |
| 2008/0192129 A1 | 8/2008 | Walker et al. |
| 2008/0298796 A1 | 12/2008 | Kuberka et al. |
| 2008/0303909 A1 | 12/2008 | Watanabe et al. |
| 2009/0215388 A1 | 8/2009 | Karaoguz et al. |
| 2010/0017289 A1 | 1/2010 | Sah et al. |
| 2011/0270916 A1 | 11/2011 | Shih et al. |
| 2012/0105716 A1 | 5/2012 | Jung et al. |

FOREIGN PATENT DOCUMENTS

| | | |
|---|---|---|
| JP | H09-018762 | 1/1997 |
| JP | 10023303 A | 1/1998 |
| JP | 2001086383 | 3/2001 |
| JP | 2001-309236 A | 11/2001 |
| JP | 2002-083280 A | 3/2002 |
| JP | 2002-094862 A | 3/2002 |
| JP | 2003-009044 A | 1/2003 |
| WO | WO 2005/045807 A1 | 5/2005 |
| WO | WO 2005/078597 A1 | 8/2005 |
| WO | WO 2005/112437 A1 | 11/2005 |

OTHER PUBLICATIONS

U.S. Appl. No. 11/702,034, Jung et al.
U.S. Appl. No. 11/655,734, Jung et al.
U.S. Appl. No. 11/640,836, Levien et al.
U.S. Appl. No. 11/594,695, Levien et al.
U.S. Appl. No. 11/591,435, Jung et al.
U.S. Appl. No. 11/541,382, Jung et al.
U.S. Appl. No. 11/526,886, Jung et al.
U.S. Appl. No. 11/510,139, Jung et al.
U.S. Appl. No. 11/508,554, Jung et al.

(56) References Cited

OTHER PUBLICATIONS

U.S. Appl. No. 11/475,516, Levien et al.
U.S. Appl. No. 11/455,001, Jung et al.
U.S. Appl. No. 11/441,785, Jung et al.
U.S. Appl. No. 11/413,271, Jung et al.
U.S. Appl. No. 11/396,279, Jung et al.
U.S. Appl. No. 11/213,324, Jung et al.
U.S. Appl. No. 11/210,284, Jung et al.
U.S. Appl. No. 11/173,166, Jung et al.
U.S. Appl. No. 11/153,868, Jung et al.
U.S. Appl. No. 11/129,045, Jung et al.
U.S. Appl. No. 11/122,274, Jung et al.
U.S. Appl. No. 11/115,078, Jung et al.
U.S. Appl. No. 11/095,768, Jung et al.
U.S. Appl. No. 11/089,530, Jung et al.
U.S. Appl. No. 11/069,909, Jung et al.
U.S. Appl. No. 11/064,787, Jung et al.
U.S. Appl. No. 11/048,644, Jung et al.
U.S. Appl. No. 11/048,629, Jung et al.
Colbert, Martin; Voglimacci, Catherine; Finkelstein, Anthony; "Live, Audio-Visual Communication Systems for Distance Learning: Experience, Heuristics and ISDN"; pp. 1-40.
Cummins, Fred; "Synchronization Among Speakers Reduces Macroscopic Temporal Variability"; pp. 1-6.
Dodd, George; "Music Performance Venues—keeping them in tune with modern requirements"; pp. 1-11.
El Saddik, Abdulmotaleb Dr.; "Multimedia Communications: Multimedia Technologies & Applications"; Multimedia Communications Research Laboratory, School of Information Technology and Engineering, University of Ottawa, Ottawa, Ontario, Canada; 22 slides; pp. 1-8.
Physorg.com; "World's First Built-In Wi-Fi-Enabled Digital Cameras"; pp. 1-3; located at http://www.physorg.com/news6183.html; bearing a date of Sep. 2, 2005; printed on Sep. 7, 2005.
Seifert, Eric; Eligator, Ron; "Acoustical Design Considerations at Universal Studios CityWalk™, Orlando, Florida"; Acoustics at CityWalk; pp. 1-5; located at http://www.acousticdimensions.com/tech_CityWalk.htm; bearing dates of Apr. 23, 1999 and Apr. 24, 1999; printed on Jul. 20, 2005.
"SOUNDaround: Get cinema quality surround sound through two speakers"; RAM: SOUNDaround by Xitel; pp. 1-7; located at http://www.ramelectronics.net/html/soundaround.html; printed on Jul. 20, 2005.
"Yamaha Internet 'MidLive vol. 3': An Open Experiment: The First MidLive to Feature Synchronized Streaming of MIDI and Audio Data"; Yamaha News Release: wMid Live vol. 3x; pp. 1-5; located at http://www.yamaha.co.jp/english/news/97121101.html; bearing a date of Dec. 1997; printed on Jul. 19, 2005.
2tiff.com; "Introduction to 2tiff"; pp. 1-3; located at http://www.2tiff.com/help/; bearing a date of 2004; printed on Feb. 16, 2005.
About.com; "Image Size and Resolution"; pp. 1-3; located at http://grahicssoft.about.com/od/resolution/; bearing a date of 2005; printed on Feb. 16, 2005.
Adobe.com; "Share images with Photo Mail (Win only)"; pp. 1-4; located at http://www.adobe.com/tips/phsel3photomail/main.html; printed on Jan. 26, 2005.
Bockaert, Vincent; "Interpolation"; pp. 1-4; located at http://www.dpreview.com/learn/?/Glossary/Digital_Imaging/Interpolation_01.htm; bearing a date of 1998-2005; printed on Feb. 16, 2005.
Canon.ca; "Print/Share Button"; pp. 1-2; located at http://www.canon.ca/digitalphotography/english/ctech_article.asp?id=174&tid=6; bearing a date of Jan. 26, 2005; printed on Jan. 26, 2005.
Cg.its.tudelft.nl; Delft University of Technology; "Shared cameras"; pp. 1; located at http://www.cg.its.tudelft.nl/~spiff/descSC.html; printed on Jan. 27, 2005.
Chainstyle.com; "Resolution and Image Size"; pp. 1-9; located at http://www.chainstyle.com/photoshop/webhelp/tutorials/basics/resolution_and_image_size.htm; printed on Feb. 16, 2005.

Chastain, Sue; "Q. Is it better to use in-camera digital zoom or crop and resample with software?"; pp. 1-2; located at http://graphicssoft.about.com/cs/digitalimaging/f/digitalzoom.htm; bearing a date of 2005; printed on Feb. 17, 2005.
Cisco Systems, Inc.; "Cisco Catalyst 6500 Series Switches—High Availability for the Cisco Catalyst 6500 Series Switches"; pp. 1-9; located at http://www.cisco.com/en/US/products/hw/switches/ps708/products_white_paper09186a0080088874.shtml; bearing a date of 1992-2005; printed on May 3, 2005.
Co-array.org; "A Brief Overview of Co-Array Fortran"; pp. 1-3; located at http://www.co-array.org/caf_intro.htm; printed on May 3, 2005.
Dave; "How Many Pixels? A reasoned approach to digicam specifications"; pp. 1-5; located at http://www.imaging-resource.com/ARTS/HOWBIG/HOWBIG.HTM; bearing a date of 1999; printed on Feb. 16, 2005.
Debian.org; "GNUstep application for digital still cameras"; pp. 1-2; located at http://packages.debian.org/unstable/graphics/camera.app; bearing a date of Jan. 26, 2005; printed on Jan. 27, 2005.
Digital Photography Review; "Kodak EasyShare One"; pp. 1-5; located at http://www.dpreview.com/news/0501/05010605kodakeasyshareone.asp; bearing a date of Jan. 6, 2005; printed on Jan. 26, 2005.
Ekdahl, Lars; "Image Size and resolution"; pp. 1-5; located at http://www.ekdahl.org/kurs/resolution/resolution2_eng.htm; bearing a date of 2002; printed on Feb. 16, 2005.
Geocities.com; "Which is better? Resample the image in a photo editor, print at a low resolution, use Genuine Fractals, or resample in many small steps?"; pp. 1-4; located at http://www.geocities.com/roberthaus/olytest/resample.html; printed on Feb. 16, 2005.
Gizmodo.com; "FlashPoint ShareDrives"; pp. 1-2 located at http://www.gizmodo.com/gadgets/peripherals/storage/flashpoint-sharedrives-110083.php; bearing a date of Mon Jun. 27; printed on Jun. 29, 2005; Published by Gawker Media.
Har-Peled, Sariel; Koltun, Vladlen; Song, Dezhen; Goldberg, Ken; CiteSeer.Ist:; "Efficient Algorithms for Shared Camera Control"; pp. 1-2; located at http://citeseer.ist.psu.edu/har-peled02effiecient.html; bearing a date of 2002; printed on Jan. 26, 2005.
Hernandez, J.R.; Perez-Gonzalez, F.; Rodriguez, J.M.; "Coding and Synchronization: A Boost and a Bottleneck for the Development of Image Watermarking"; pp. 1-7; Dept. Tecnologias de las Comunicaciones, ETSI Telecom., Universidad de Vigo, 36200 Vigo, Spain.
Hewlett-Packard Development Company, L.P.; "Presenting the big picture"; pp. 1-7; located at http://www.matrixdisplay.com/pdf/HP_Big_Picture_Main_Brochure.pdf; bearing a date of 2003.
Home.iprimus.com.au; "Digital Cameras and Resampling"; pp. 1-2; located at http://home.iprimus.com.au/painless/resample.htm; printed on Feb. 16, 2005.
Hp.com; "HP Image Zone Express step-by-step: HP Instant Share"; pp. 1-4; located at http://www.hp.com/united-states/ize/steps_instant_share.html; printed on Jan. 26, 2005.
Hua, Zhigang; Xie, Xing; Lu, Hanqing; Ma, Wei-Ying; Research.Microsoft.com; "COBO: Building Cooperative Environment for Cross-Device Image Sharing"; pp. 1; located at http://research.microsoft.com/research/pubs/view.aspx?type=technical+report&id=823; bearing a date of Nov. 2004; printed on Jan. 25, 2005.
Imaging resource.com; "The Imaging Resource Quick Review"; pp. 1-22; located at http://www.imaging-resource.com/PRODS/I700/I70A.HTM; bearing a date of 2001; printed on Feb. 16, 2005.
Intel.com; "Instantly Capture and Share your World with an Intel® PC Camera"; pp. 1-2; located at http://www.intel.com/pccamera/; printed on Jan. 27, 2005.
Jain, Anil K.; "Fundamentals of Digital Image Processing"; 1989; pp. 1-569; Prentice-Hall, Inc.; Englewood Cliffs, NJ U.S.A.
Kodak.com; "Frequently Asked Questions"; pp. 1; located at http://www.kodak.com/global/en/service/knowledgebase/digital-camera-faqs.jhtml?pq-path=1396/5759; bearing a date of Jan. 6, 2005; printed on Jan. 26, 2005.
Koren, Norman; "Understanding image sharpness: Digital cameras vs. film, part 2"; pp. 1-16; located at http://www.normankoren.com/Tutorials/MTF7A.html; bearing a date of 2000-2004; printed on Feb. 3, 2005.

(56) References Cited

OTHER PUBLICATIONS

LTL Imagery; "About Resolution Understanding Digital Image Resolution"; pp. 1-10; located at http://www.ltlimagery.com/resolution.html; bearing a date of 2000-2004; printed on Feb. 16, 2005.

Mahmoud, Qusay H.; "Getting Started with Data Synchronization Using SyncML"; pp. 1-6; located at http://developers.sun.com/techtopics/mobility/midp/articles/syncml/; bearing dates of Sep. 2004 and 1994-2005; printed on May 3, 2005.

Mobilemag; "Nikon D2H WiFi Digital Camera"; pp. 1-2; located at http://www.mobilemag.com/content/100/336/C2502/; bearing a date of Feb. 20, 2004; printed on Jan. 25, 2005.

CNNMoney; "Playboy coming to iPod"; pp. 1-2; located at http://money.cnn.com/2005/01/05/technology/personaltech/playboy_ipod/index.htm; bearing a date of Jan. 5, 2005; printed on Jan. 26, 2005.

National Instruments Corporation; "Advanced Analog Triggering and Synchronization Techniques"; pp. 1-2; located at http://zone.ni.com/devzone/conceptd.nsf/webmain/A387B5C0AC6F6F4E86256C87005FCDDF?opendocument&node=dz00000_us; bearing a date of 2005; printed on May 3, 2005.

National Instruments Corporation; "Genlocking Multiple JAI CV-M1 Cameras"; pp. 1-5; located at http://zone.ni.com/devzone/conceptd.nsf/webmain/7a6b5853548850e886256c21005b1413; bearing a date of 2005; printed on May 3, 2005.

National Instruments Corporation; "Multi-Camera Acquisition"; pp. 1-3; located at http://zone.ni.com/devzone/conceptd.nsf/webmain/D91BAC1317F9D0A686256C9300769A0D; bearing a date of 2005; printed on May 3, 2005.

Rains, Nick; "Vietnam Travel Photography the Digital Way"; pp. 1-7; located at http://www.luminous-landscape.com/locations/vietnam.shtml; bearing a date of 2003;.printed on Feb. 3, 2005.

Ritzcamera.com; "Canon—Powershot A85 Digital Camera"; pp. 1-8; located at http://www.ritzcamera.com/webapp/wcs/stores/servlet/ProductDisplay?storeId=10001&catalogId=10001&langId=-1&productId=13176854; printed on Jan. 26, 2005.

Roadcasting.org; "A new type of radio"; "Final Design"; "Process"; "Conclusions"; "Recognition"; "How Roadcasting Works"; "Download"; pp. 1-15; located at www.roadcasting.org; printed on Jun. 2, 2005.

Ross, Suzanne; Research.Microsoft.com; "The Life of a Digital Photo"; pp. 1-5; located at http://research.microsoft.com/displayArticle.aspx?id=605; printed on Jan. 25, 2005.

Sciannamea, Michael; "WiFi-Enabled Digital Cameras About to Tap a Growing Marketplace"; pp. 1-5; located at http://wifi.weblogsinc.com/entry/7312187118786387/; bearing a date of Oct. 12, 2004; printed on Jan. 25, 2004.

Sellen, Abigail; Fleck, Rowanne; Kindberg, Tim; Spasojevic, Mirjana; Research.Microsoft.com; "How and Why People Use Camera Phones"; pp. 1-16; located at http://research.microsoft.com/research/pubs/view.aspx?type=technical+report&id=823 bearing a date of Nov. 2004; printed on Jan. 25, 2005.

Starbursthomepage.com; "Life is all about Sharing"; p. 1; located at http://www.starbursthomepage.com/flashpointx.htm; printed on Jun. 29, 2005.

Starbursthomepage.com; "Sharing-On-The-Go Technology"; pp. 1-3; located at http://www.starbursthomepage.com/fsota.htm; printed on Jun. 29, 2005.

Starbursthomepage.com; "Specifications and Data Transfer Information"; pp. 1-5; located at http://www.starbursthomepage.com/fspec.htm; printed on Jun. 29, 2005.

Starbursthomepage.com; "What are FlashPoint ShareDrives"; pp. 1-4; located at http://www.starbursthomepage.com/fproducts.htm; printed on Jun. 29, 2005.

Sutherland, Ed; "CSR Intros Low-Cost, Single-Chip WiFi"; pp. 1-3; located at http://www.wi-fiplanet.com/news/article.php/3434131; bearing a date of Nov. 10, 2004; printed on Jan. 25, 2005.

Swgc.mun.ca; "About image size and resolution"; pp. 1-7; located at http://www.swgc.mun.ca/vart2600/resolution.html; printed on Feb. 16, 2005.

U.S. Appl. No. 12/290,538, Jung et al.

U.S. Appl. No. 12/284,202, Jung et al.

U.S. Appl. No. 12/283,420, Jung et al.

"About Flickr"; bearing a date of 2006; pp. 1-2; located at http://www.flickr.com/about/.

"About the SD Memory Card"; bearing a date of 2004; pp. 1-3; located at http://www.sdcard.org/sd_memorycard/index.html; SD Card Association; printed on Mar. 7, 2006.

"Auto Exposure Bracketing (AEB Mode)"; PowerShot G3 Digital Camera; bearing a date of 2004; pp. 1-4; located at http://web.canon.jp/Imaging/PSG3/PSG3_129-e.html; Canon Inc., printed on Sep. 7, 2006.

Darlin, Damon; "Why Do-It-Yourself Photo Printing Doesn't Add Up"; bearing a date of Oct. 8, 2005; pp. 1-3; located at http://www.nytimes.com/2005/10/08/technology_08photo.ready.html; The New York Times; printed on Aug. 28, 2006.

"Digital Cameras Glossary"; pp. 1-3; located at http://www.crutchfieldadvisor.com/ISEO-rgbtcspd/learningcenter/home/digitalcameras_glossary.html; printed on Mar. 8, 2006.

"Digital Cameras: How to Choose"; pp. 1-3; located at http://www.crutchfieldadvisor.com/ISEO-rgbtcspd/learningcenter/home/digitalcameras.html; printed on Mar. 8, 2006.

"Fujifilm, Summus Collaborate to Provide Wireless Photo Services"; bearing a date of Feb. 18, 2004; pp. 1-2; located at http://phx.corporate-ir.net/phoenix.zhtml?c=131111&p=irol-newsArticle&ID=807972&highlight=; Oasys Mobile, Inc., printed on Mar. 17, 2006.

"JVC Everio GZMG77 2.0MP CCD 30GB HDD Camcorder with 10x Optical Zoom"; bearing a date of 1996-2006; pp. 1-8; located at http://www.amazon.com/gp/product/B000E1332W/ref=pd_cp_title/103-4351641-1963832; Amazon.com; printed on Apr. 25, 2006.

Kim, Jeong; Zimmerman, John; "Cherish: Smart Digital Photo Frames for Sharing Social Narratives at Home"; bearing a date of Apr. 22-28, 2006; pp. 1-6; located at http://www.cs.cmu.edu/~johnz/pubs/2006_CHI_cherish.pdf#search=%22cherish%3B%20smart%20digital%20photo%20frames%20for%20sharing%20social%20narratives%20at%20home%22.

"Kodak's dual-lens camera"; bearing a date of Jan. 2, 2006; pp. 1; lcoated at http://news.com/2300.com/2300-1041_3-6014914-2.htnl?tag=ne.gall.pg; c/net news.com; printed on Mar. 7, 2006.

"Kodak Unveils Worlds First Dual-Lens Digital Camera; Combines Ultra-Wide Angle and Zoom Lenses in Compact Body"; bearing a date of Jan. 2, 2006; pp. 1-2; Kodak; located at: http://www.kodak.com/cknee/PageQuerierjhtml?pg-path=2709&pg-locale=en_US&gpcid=0900688a80465805; printed on Mar. 7, 2006.

"Leading Edge Eyecam Extreme High Resolution Wireless Color Video Camera System"; pp. 1-2; located at: http://parts.rctoys.com/rc-toys-hobbies/Items/329769%20-%20(S); Draganfly Parts Warehouse; printed on Mar. 9, 2006.

Lyons, Max; "Max Lyons Digital Image Gallery"; bearing a date of 2000-2005; pp. 1-3; located at http://www.tawbaware.com/maxlyons/; printed on Apr. 18, 2006.

Mills, Elinor; "HD camera, new monitor attract crowds"; bearing a date of 1995-2006; pp. 1; located at http://news.com.com/2102-7353_3-6023300.html?tag=st.util.print; c/net news.com; printed on Mar. 7, 2006.

"Multiple Camera Acquisition"; bearing a date of 2006; pp. 1; located at http://sine.ni.com/apps/we/niepd_web_display.display_epd4?p_guid=B45EACE3E80B56A4E034080020E74861&p_node=DZ52489&p_source=external; National Instruments Corporation; printed on Aug. 29, 2006.

"New High Capacity SD Memory Card Specification Under Final Review by SD Card Association"; bearing a date of Jan. 4, 2006; pp. 1-2; SD Card Association News Release.

Ng et al.; "Light Field Photography with a Hand-Held Plenoptic Camera"; bearing dates of 2004-2005; pp. 1-3; located at http://graphics.stanford.edu/papers/lfcamera/; printed on Sep. 7, 2006.

Nicholls, Kyle; "Non-photorealistic Camera—Depth Edge Detection and Rendering using Muli-Flash Imaging"; bearing dates of 2000-2006; pp. 1-3; located at http://photo.net/learn/technology/mflash/merl-non-photo.html; printed on Apr. 18, 2006.

"OkIP Video . . . Anywhere Solar Powered! Protecting Critical Government Infrastructure Military and Homeland Surveillance"; pp. 1-8; located at http://www.oksolar.com/ip_anywhere/; printed on Mar. 9, 2006.

(56) References Cited

OTHER PUBLICATIONS

Raymond, Emily; "Kodak Digital Cameras: Kodak EasyShare V570 Digital Camera Review"; pp. 1-2; bearing a date of Jan. 22, 2006; located at http://www.digitalcamerainfo.com/content/Kodak-EasyShare-V570; printed on Apr. 19, 2006.

Reichmann, Mchael; "Understanding Raw Files"; Luminous-landscape.com; pp. 1-9; located at http://www.luminous-landscape.com/tutorials/understanding-series/u-raw-files.shtml; printed on Oct. 25, 2005.

"Sanyo Xacti VPC-HD1 5.1MP MPEG4 High Definition Camcorder x/10x Optical Zoom: Product Description"; bearing dates of 1996-2006; pp. 1-5; located at: http://www.amazon.com/gp/product/product-description/B000E0E6YC/ref=dp_nav_2/002-0210595-1654445?%5Fencoding=UTF8&n=502394&s=photo; Amazon.com; printed on Mar. 7, 2006.

"Secure Digital Card"; Wikipedia, pp. 1-6; located at http://en.wikipedia.org/wiki/Secure_Digital; Wikipedia; printed on Mar. 7, 2006.

Skillings, Jonathan; "Kodak packs two lenses in latest camera"; bearing a date of Feb. 7, 2006; pp. 1; located at http://news.com.com/2102-1041_3-6014939.html?tag=st.util.print; c/net news.com; printed on Mar. 7, 2006.

"Sony DCR-DVD405 3MP DVD Handycam Camcorder with 10x Optical Zoom"; pp. 1-12; Amazon.com; located at: http://www.amazon.com/gp/product/B000E0DU7G/ref=pd_cp_title/103-4351641-196383; printed on Apr. 25, 2006.

"Storage device—A Word Definition From the Webopedia Computer Dictionary"; bearing dates of Oct. 30, 2001 and 2005; pp. 1-4; located at http://www.webopedia.com/TERMS/storage_device.htm; Webopedia.com; printed on Oct. 25, 2005.

"VisualStream: Digital Multimedia USB 1.1 High Resolution PC Camera"; bearing a date of 2002; pp. 1-4; D-Link Systems, Inc.; Irvine, CA.

"What is Flickr?"; bearing a date of 2006; pp. 1-6; located at http://www.flickr.com/learn_more.gne; printed on Aug. 28, 2006.

Woodrow, E.; Heinzelman, W.; "Spin-It: a data centric routing protocol for image retrieval in wireless networks"; bearing dates of Jun. 24-28, 2002; pp. 1-5; Image Processing 2002, Proceedings. 2002 International Conference; vol. 3; pp. 913-916; located at http://ieeexplore.ieee.org/xpl/absprintf.jsp?arnumber=1039121&pag; printed Mar. 19, 2006.

European Search Report; European App. No. EP 07751674.8; May 27, 2009; pp. 1-5.

"Federal Standard 1037C Telecommunications: Glossary of Telecommunication Terms"; Bearing a date of Aug. 7, 1996; printed on May 30, 2009; total of 8 pages; General Services Administration Information Technology Service, Federal Standard 1037C.

"Merriam-Webster Collegiate Dictionary"; Bearing dates of 1993 and 1997; total of 3 pages; Merriam-Webster, Inc., Tenth Edition; Springfield, Massachusetts, USA.

"Editing & Organizing Photos" Snapfish Website; bearing a date of: Jan. 20, 2005; located at: http://web.archive.org/web/20050405222248/www.snapfish.com/helpediting; pp. 1-8; printed on Apr. 22, 2010.

"Snapfish Privacy Policy"; Snapfish Website; bearing a date of: Jan. 20, 2005; located at: http://web.archive.org/web/20050403221640/www.snapfish.com/privacy/t_=0; pp. 1-5; printed on Apr. 22, 2010.

U.S. Appl. No. 12/806,060, Royce A. Levien et al.

Adobe Photoshop User Guide 5.0;bearing a date of 1998; pp. 1,2,22,31-35,41,46,48,55-58,101,108,128,167-1-7,259-284, and 311-316; Adobe Systems Inc.

U.S. Appl. No. 13/135,255, Jung, et al.

* cited by examiner

# US 9,041,826 B2

CAPTURING SELECTED IMAGE OBJECTS

PRIORITY CLAIM, CROSS-REFERENCE TO RELATED APPLICATION, AND INCORPORATION BY REFERENCE

The present application is related to and claims the benefit of the earliest available effective filing date(s) from the following listed application(s) (the "Related Applications") (e.g., claims earliest available priority dates for other than provisional patent applications or claims benefits under 35 USC §119(e) for provisional patent applications, for any and all parent, grandparent, great-grandparent, etc. applications of the Related Application(s)).

RELATED APPLICATIONS

For purposes of the USPTO extra-statutory requirements, the present application constitutes a continuation in part of United States patent application entitled ESTIMATING SHARED IMAGE DEVICE OPERATIONAL CAPABILITIES OR RESOURCES, naming Edward K. Y. Jung, Royce A. Levien, Robert W. Lord, Mark A. Malamud, and John D. Rinaldo, Jr. as inventors, filed Jun. 2, 2005, Ser. No. 11/143,970, which is currently co-pending, or is an application of which a currently co-pending application listed as a Related Application is entitled to the benefit of the filing date;

For purposes of the USPTO extra-statutory requirements, the present application constitutes a continuation in part of United States patent application entitled SHARED IMAGE DEVICE DESIGNATION, naming Edward K. Y. Jung, Royce A. Levien, Robert W. Lord, Mark A. Malamud, and John D. Rinaldo, Jr. as inventors, filed Jul. 26, 2005, Ser. No. 11/190,516, which is currently co-pending, or is an application of which a currently co-pending application listed as a Related Application is entitled to the benefit of the filing date;

For purposes of the USPTO extra-statutory requirements, the present application constitutes a continuation in part of United States patent application entitled SAVED-IMAGE MANAGEMENT, naming Royce A. Levien, Robert W. Lord, and Mark A. Malamud, as inventors, filed Oct. 31, 2005, Ser. No. 11/263,587, which is currently co-pending, or is an application of which a currently co-pending application listed as a Related Application is entitled to the benefit of the filing date For purposes of the USPTO extra-statutory requirements, the present application constitutes a continuation in part of United States patent application entitled CONDITIONAL ALTERATION OF A SAVED IMAGE, naming Royce A. Levien, Robert W. Lord, and Mark A. Malamud, as inventors, filed Nov. 1, 2005, Ser. No. 11/264,701 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled IMAGERY PROCESSING, naming Edward K. Y. Jung, Royce A. Levien, Robert W. Lord, Mark A. Malamud, and John D. Rinaldo, Jr. as inventors, filed 28 Feb. 2006, Ser. No. 11/364,496 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled DATA MANAGEMENT OF A DATA STREAM, naming Edward K. Y. Jung, Royce A. Levien, Robert W. Lord, Mark A. Malamud, and John D. Rinaldo, Jr. as inventors, filed Mar. 15, 2006, Ser. No. 11/376,627 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled STORAGE ACCESS TECHNIQUE FOR CAPTURED DATA, naming Royce A. Levien, Robert W. Lord, and Mark A. Malamud as inventors, filed Apr. 3, 2006, Ser. No. 11/397,357 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled THIRD PARTY STORAGE OF CAPTURED DATA, naming Royce A. Levien, Robert W. Lord, and Mark A. Malamud as inventors, filed Apr. 13, 2006, Ser. No. 11/404,104 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled DATA STORAGE USAGE PROTOCOL, naming Royce A. Levien, Robert W. Lord, and Mark A. Malamud as inventors, filed Apr. 14, 2006, Ser. No. 11/404,381 which is currently co-pending, or is an application of which a currently co-pending application listed as a Related Application is entitled to the benefit of the filing date.

For purposes of the USPTO extra-statutory requirements, the present application constitutes a continuation in part of United States patent application entitled DEGRADATION/PRESERVATION MANAGEMENT OF CAPTURED DATA, naming Edward K. Y. Jung, Royce A. Levien, Robert W. Lord, Mark A. Malamud, and John D. Rinaldo, Jr. as inventors, filed May 15, 2006, Ser. No. 11/434,568, which is currently co-pending, or is an application of which a currently co-pending application listed as a Related Application is entitled to the benefit of the filing date.

For purposes of the USPTO extra-statutory requirements, the present application constitutes a continuation in part of United States patent application entitled DUAL MODE IMAGE CAPTURE TECHNIQUE, naming Royce A. Levien, Robert W. Lord, Mark A. Malamud, and John D. Rinaldo, Jr. as inventors, filed May 19, 2006, Ser. No. 11/437,284, which is currently co-pending, or is an application of which a currently co-pending application listed as a Related Application is entitled to the benefit of the filing date.

For purposes of the USPTO extra-statutory requirements, the present application constitutes a continuation in part of United States patent application entitled ENHANCED VIDEO/STILL IMAGE CORRELATION, naming Royce A. Levien, Robert W. Lord, Mark A. Malamud, and John D. Rinaldo, Jr. as inventors, filed 23 May 2006, Ser. No. 11/440,409, which is currently co-pending, or is an application of which a currently co-pending application listed as a Related Application is entitled to the benefit of the filing date.

All subject matter of the Related Applications and of any and all parent, grandparent, great-grandparent, etc. applications of the Related Applications is incorporated herein by reference to the extent such subject matter is not inconsistent herewith.

SUMMARY

Various possible system embodiment implementations are disclosed herein. For example an exemplary image selection system may include an image capture module with specified quality parameters for capturing one or more targeted objects that may be incorporated in a field of view; a user-interface for facilitating selection of a designated targeted object, wherein the user-interface includes a data record that identifies the designated targeted object as a point of interest; and a controller operatively coupled to the data record and configured to activate the image capture module to take multiple exposures of the designated targeted object, wherein the multiple exposures each have different quality characteristics. A related system aspect may include storage media for retaining a stored version of the multiple exposures for future reference, wherein the stored version includes a cross-reference association between the multiple exposures of the designated targeted object.

Some exemplary methods of capturing an image may include creating a visual display that represents a field of view of an image capture device: providing a user-interface that enables an identification of one or more targeted objects that may be incorporated in the field of view; and enabling a user to make a selection from among the at least one or more targeted objects, which selection is identified as a point of interest via the user-interface. Additional aspects may include initiating operation of the image capture device for taking multiple exposures of the selection, including providing a different quality characteristic for each exposure; and creating a stored version of each of the multiple exposures.

An exemplary computer program product may include one or more computer programs for executing a process that includes creating a visual display that represents a field of view of an image capture device; providing a user-interface that enables an identification of possible targeted objects that may be incorporated in the field of view, enabling a user to make a selection of one or more particular targeted objects, which selection is identified as a point of interest via the user-interface; and initiating operation of the image capture device for taking multiple exposures of the selection, wherein each exposure has at least one different quality characteristic.

A computer program product embodiment may include storage media and/or signal communication media for encoding instructions for executing the process.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
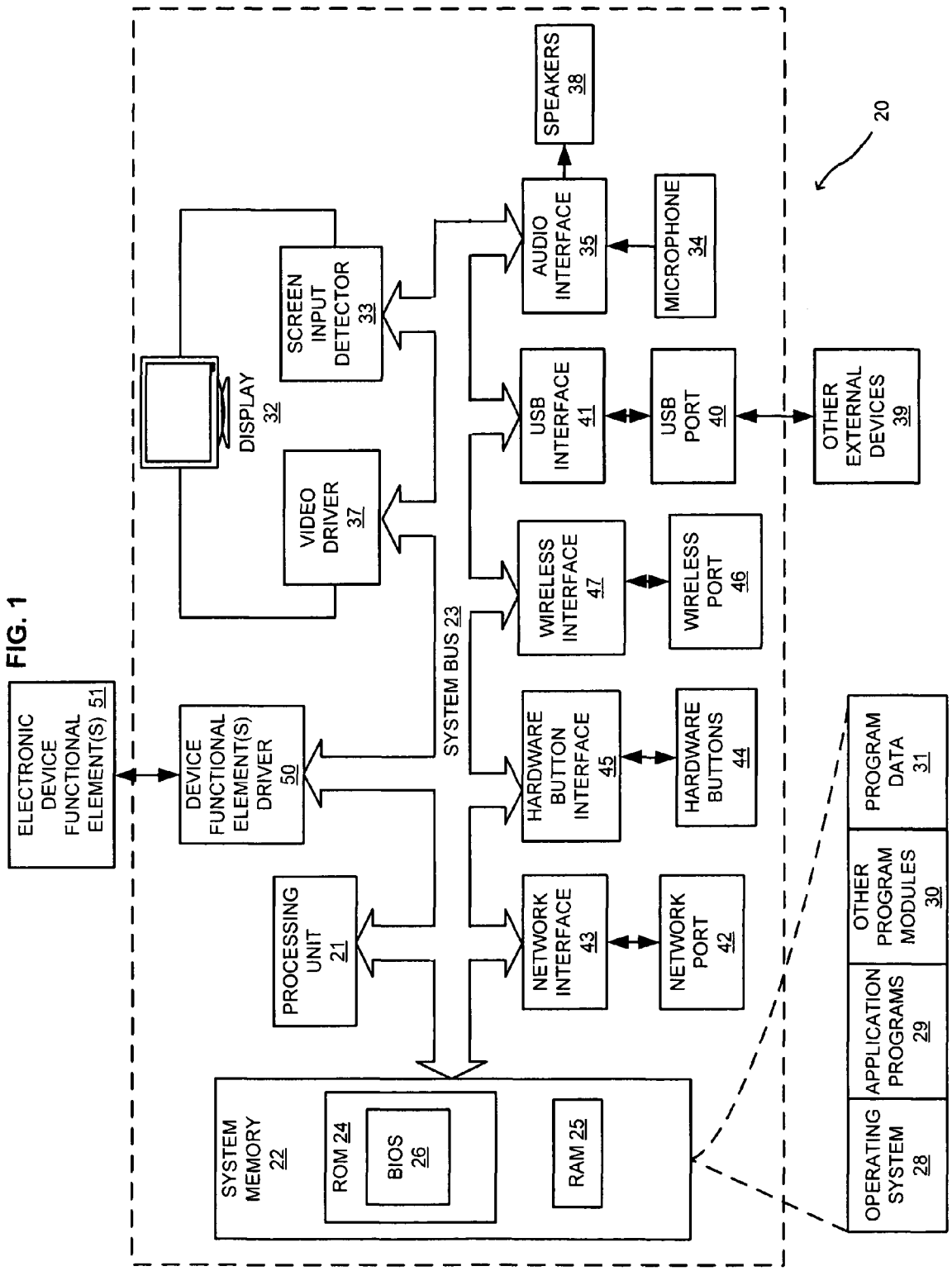
FIG. 1 illustrates the exemplary system that includes a thin computing device that may interface with an electronic device.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1 provides a brief, general description of an illustrative and/or suitable exemplary environment in which embodiments may be implemented. In FIG. 1, as in the other figures, the figure is an example of an environment and does not suggest any limitation as to the structure, scope of use, or functionality of an embodiment. An embodiment should not be interpreted as having any dependency or requirement relating to any one or combination of components illustrated in an exemplary environment. For example, in certain instances, elements of an environment and/or a method may be deemed not necessary and omitted. In other instances, other elements may be deemed necessary and added.

FIG. 1 illustrates the exemplary system that includes a thin computing device 20 that may interface with an electronic device (not shown). The electronic device may include one or more functional elements 51. For example, the electronic device may include any item having electrical and/or electronic components playing a role in a functionality of the item, such as a limited resource computing device, a game console, a digital camera, a cell phone, a printer, a refrigerator, a car, and an airplane. The thin computing device includes a processing unit 21, a system memory 22, and a system bus 23 that couples various system components including the system memory to the processing unit. The system bus may be any of several types of bus structures including a memory bus or memory controller, a peripheral bus, and a local bus using any of a variety of bus architectures. The system memory includes read-only memory (ROM) 24 and random access memory (RAM) 25. A basic input/output system (BIOS) 26, containing the basic routines that help to transfer information between sub-components within the thin computing device, such as during start-up, is stored in the ROM. A number of program modules may be stored in the ROM and/or RAM, including an operating system 28, one or more application programs 29, other program modules 30, and program data 31.

A user may enter commands and information into the computing device 20 through user input devices, such as a number of switches and buttons, illustrated as hardware buttons 44, which may be associated with the electronic device and connected via a suitable interface 45. Input devices may further include a touch-sensitive display screen 32 with suitable input detection circuitry 33. The output circuitry of the touch-sensitive display screen is connected to the system bus 23 via a video driver 37. Other input devices may include a microphone 34 connected through a suitable audio interface 35, and a physical hardware keyboard (not shown). In addition to the display 32, the computing device 20 may include other peripheral output devices, such as at least one speaker 38.

Other external input or output devices 39, such as a joystick, game pad, satellite dish, scanner, an external computer readable medium, or the like may be connected to the processing unit 21 through a USB port 40 and USB port interface 41, to the system bus 23. Alternatively, the other external input and output devices 39 may be connected by other interfaces, such as a parallel port, game port or other port. The computing device 20 may further include or be capable of connecting to a flash card memory (not shown) through an appropriate connection port (not shown). The computing device may further include or be capable of a connection with a network through a network port 42 and network interface 43, and/or through wireless port 46 and corresponding wireless interface 47. Such a connection may be provided to facilitate communication with other peripheral devices, including other computers, printers, and so on (not shown). It will be appreciated that the various components and connections shown are exemplary and other components and means of establishing communications links may be used.

The computing device 20 may be designed to include a user interface having a character, key-based, other user data input via the touch sensitive display 32 using a stylus (not shown). Moreover, the user interface is not limited to an actual touch-sensitive panel arranged for directly receiving input, but may alternatively or in addition respond to another input device, such as the microphone 34. For example, spoken words may be received at the microphone 34 and recognized. Alternatively, the computing device may be designed to include a user interface having a physical keyboard (not shown).

The device functional elements 51 are typically application specific and related to a function of the electronic device. The device functional elements are driven by a device functional element(s) interface 50, which coupled with the system bus 23. A functional element may typically perform a single well-defined task with little or no user configuration or setup, such as a refrigerator keeping food cold, a cell phone connecting with an appropriate tower and transceiving voice or data information, and/or a camera capturing and saving an image.

In the description that follows, certain embodiments may be described with reference to acts and symbolic representations of operations that are performed by one or more computing devices, such as the thin computing device 20 of FIG. 1. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures in which data is maintained are physical locations of the memory that have particular properties defined by the format of the data. However, while an embodiment is being described in the foregoing context, it is not meant to be limiting as those of skill in the art will appreciate that the acts and operations described hereinafter may also be implemented in hardware.

Embodiments may be described in a general context of computer-executable instructions, such as program modules, being executed by a computer. Generally, program modules include routines, programs, objects, components, data structures, etc., that perform particular tasks or implement particular abstract data types. An embodiment may also be practiced in a distributed computing environment where tasks are performed by remote processing devices that are linked through a communications network. In a distributed computing environment, program modules may be located in both local and remote computer storage media including memory storage devices.

Embodiments may be implemented with numerous other general-purpose or special-purpose computing devices, computing system environments, and/or configurations. Examples of well-known computing systems, environments, and/or configurations that may be suitable for use with an embodiment include, but are not limited to, personal computers, handheld or laptop devices, personal digital assistants, multiprocessor systems, microprocessor-based systems, set top boxes, programmable consumer electronics, network, minicomputers, server computers, game server computers, web server computers, mainframe computers, and distributed computing environments that include any of the above systems or devices.

Figure 2:
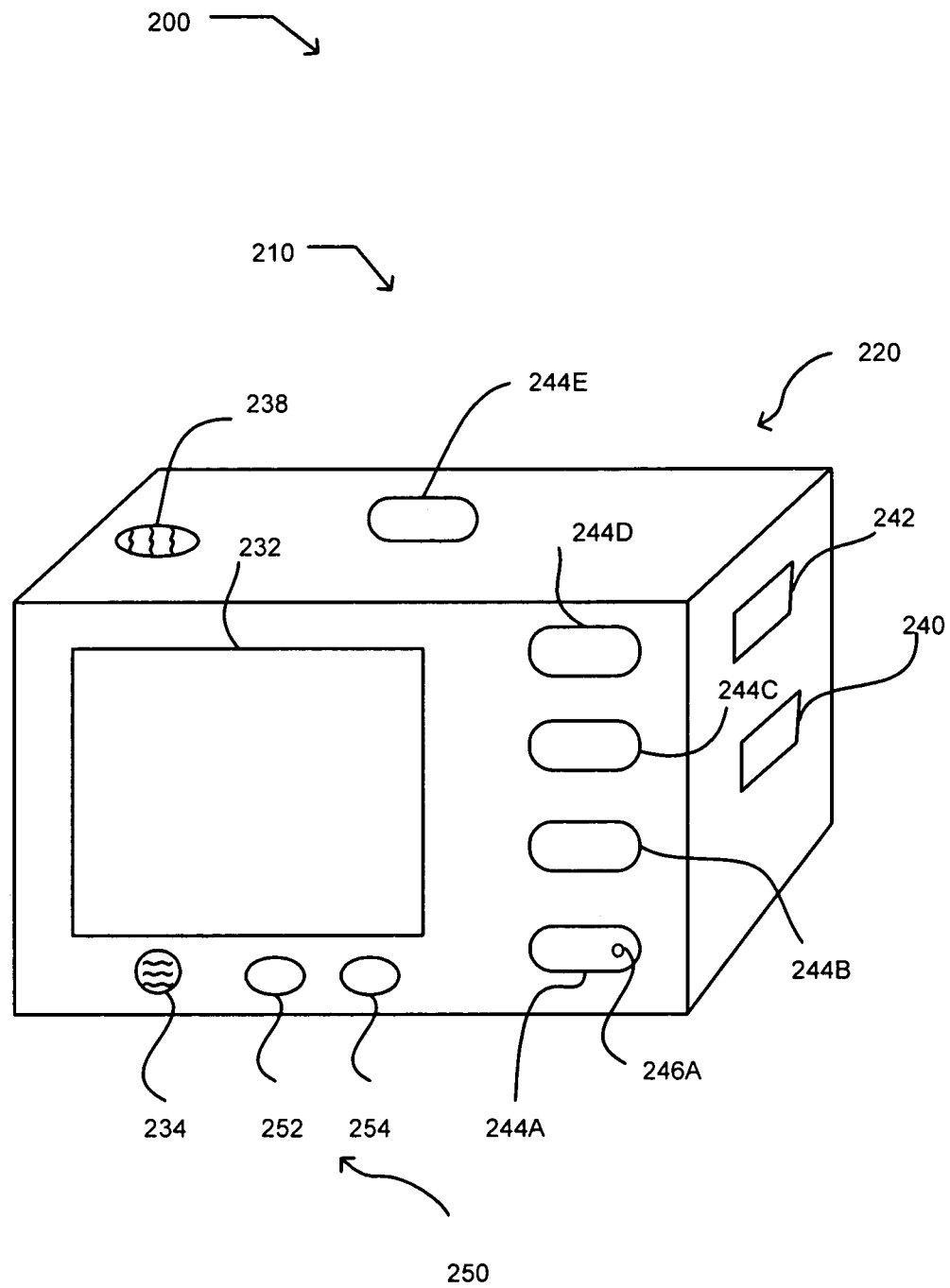
FIG. 2 illustrates an exemplary system in which embodiments may be implemented.

FIG. 2 illustrates an exemplary system 200 in which embodiments may be implemented. The system includes a digital camera 210 having image capture and image storage functionality. The digital camera 210 includes a computing device (not shown), such as the thin computing device 20 described in conjunction with FIG. 1, that is operable to interact with functional elements of the digital camera. The digital camera also includes a plurality of user interfaces 220. The plurality of interfaces 220 includes a display 232. In alternative embodiments, the display may provide a textual, a visual display, and/or a graphical display. In a further embodiment, the display may include touch screen functionality operable to accept a user input. The plurality of user interfaces of the camera also includes a microphone 234, a speaker 238, and a plurality of tangible buttons 244A-244E. One or more of the tangible buttons may include a light emitter, such as a light emitting device 246A. Further, one or more of the tangible buttons 244A-244E may include a vibrator operable to provide a tactile display. The display 232 and the tangible buttons 244A-244E may have any functionality appropriate to the digital camera. For example, the button 244E may be assigned to operate a camera element, such as a shutter function. The button 244A may be assigned an "enter" function, and buttons 244B and 244C may be respectively assigned a scroll up and scroll down function relative to a menu displayed on the display 232. The button 244D may be assigned to operate another camera element, such as a lens zoom function. The digital camera also includes context sensors 250, which may be selected, for example, to produce relevant information about an environment extrinsic to the digital camera. The context sensors are illustrated as an external temperature sensor 252 and a light intensity sensor 254. The digital camera further includes a USB port 240, a network port 242, and/or a wireless port (not shown).

In addition, the digital camera 210 includes a lens (not shown) and an image acquisition module (not shown). The image acquisition module controls the lens, a shutter, an aperture, and/or other elements as necessary to capture an image through the lens. In an embodiment, capturing images using digital cameras or camcorders may be equated with photography as performed by conventional film cameras. A captured image may be processed, stored, viewed, and/or distributed by the digital camera. The digital camera also includes a system memory (not shown), such as the system memory 22 of the thin computing device 20 of FIG. 1. The system memory includes saved operating systems and programs necessary to operate the digital camera. In addition, the digital camera may include a computer readable media (not shown), such as the computer readable medium described in conjunction with FIG. 3 below.

The digital camera 210 includes operability to receive a user input through an interface of the plurality of interfaces 220. For example, in an embodiment, detecting a user touch to the button 244D may be received as an instruction and/or a selection. Another detected user touch to another user interface of the plurality of user interfaces 220 may be received as another instruction and/or a selection. The user touch may be detected by a user interface physically incorporated in the aspect of the digital camera 210 or proximate thereto. In an alternative embodiment, a user input may be received by detecting a signal responsive to a sound or voice received by the microphone 234. For example, a detection and recognition of a signal responsive to a spoken command to the microphone 234 may be received as an instruction to activate a program associated with the digital camera. Further, a detection of a signal responsive to a sound or voice may be received by the microphone 234.

Figure 3:
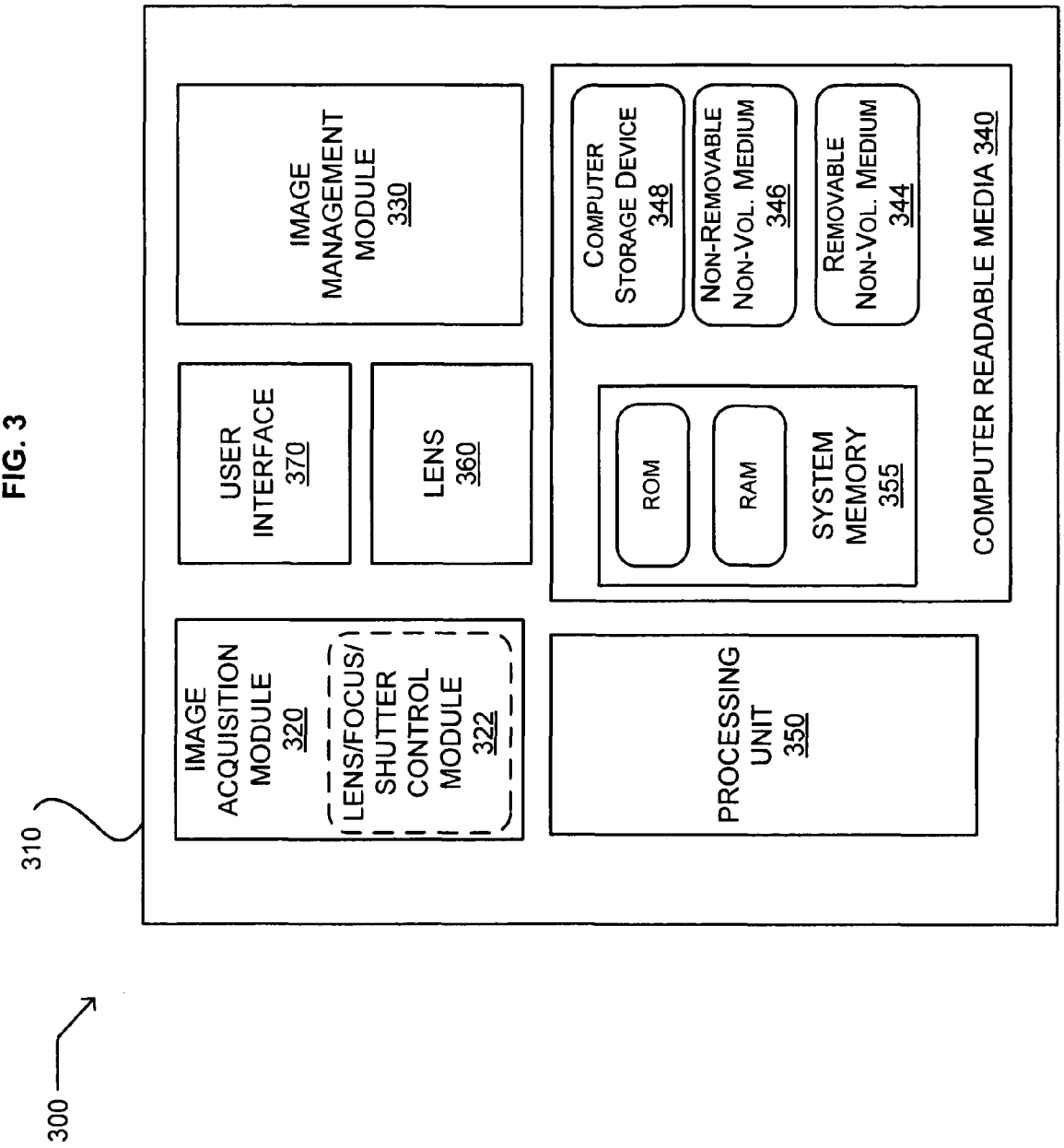
FIG. 3 illustrates an exemplary system in which embodiments may be implemented.

FIG. 3 illustrates an exemplary system 300 in which embodiments may be implemented. The system includes a digital camera 310. The digital camera includes an image acquisition module 320 operable to capture an image, an image management module 330, and a computer readable medium, illustrated as computer readable media 340.

In an embodiment, the digital camera 310 may include a computing device (not expressly shown) that handles any required processing. For example, the computing device may include at least a part of the system described in conjunction with FIG. 1, including the thin computing device 20, that may interface with at least one functional element of the digital camera. In an embodiment, the digital camera may include a processing unit, illustrated as a processing unit 350, and a system memory 355, which may be substantially similar to the processing unit 21 and the system memory 22 respectively of FIG. 1. In another embodiment, the digital camera may include at least a part of the exemplary system 200 and/or the digital camera 210 described in conjunction with FIG. 2.

The image management module 330 includes an operability to save a captured image at a resolution in the computer readable medium 340 and in a user-accessible form. In an embodiment, the operability to save the captured image at a resolution in the computer readable medium and in a user-accessible form includes an operability to save a captured image in a format at least substantially suitable for presentation by a visual display of the digital camera 310, such as a display screen. For example, the operability to save a captured image at a resolution in the computer readable medium and in a user-accessible form may include an operability to save a captured image at a resolution in a JPEG format, a GIF format, a TIFF format, or a PDF format. In another embodiment, the operability to save the captured image at a resolution in the computer readable medium and in a user-accessible form includes an operability to save the captured image at a resolution in the computer readable medium after data representative of the captured image has been decoded and processed from a raw format. Typically, the raw data is decoded and/or processed from a raw format, i.e., raw image data, into a JPEG format, a GIF format, a TIFF format, or a PDF format. In a further embodiment, the operability to save the captured image at a resolution in the computer readable medium and in a user-accessible form includes an operability to save the captured image in a form accessible to a user of the digital camera in the computer readable medium. For example, the form accessible to a user of the digital camera may include a JPEG format, a GIF format, a TIFF format, a PDF format, or a raw format where the digital camera allows a user access to a saved captured image in a raw format.

In an embodiment, an "image" may include a full image. In another embodiment, an "image" may include a portion of an image, a segment of a full image, a thumbnail of an image, and/or an icon that pertains to an image. Another embodiment of an "image" may include a photograph and/or a digital image that can be captured by an image capture device such as, for example, the digital camera 310. Certain embodiments of a streaming image may include a video that may be captured by the digital camera, such as, for example, a digital camcorder camera.

The term "resolution" may include an indication of a measurement of image detail, such as may be expressed as pixels per inch, dots per inch, or samples per inch, etc. In certain embodiments, a file size of an image is a function of its resolution, and in certain embodiments of relatively limited storage-capability cameras, relatively few high-resolution images can be saved.

In another embodiment, a "user-accessible form" may include at least one of a location in the computer readable medium that allows a user to access a file saved therein, a file formatted to allow a user of the digital camera 310 to view and/or manipulate the captured image, a property of the captured image written to the computer readable medium, and/or an organization of the computer readable medium that allows a user to access a file saved therein. For example, data indicative of the captured image written to a hard drive in a JPEG format generally allows a user to view and/or manipulate the captured image. In an embodiment, a user-accessible storage medium may include all or any portion of any computer readable storage medium that allows a user, typically through a user interface, to act with respect to and/or interact with the image, such as viewing the image, manipulating the image, and/or directing the image to another location.

The image management module 330 also includes an operability to decrease the resolution of the saved captured image in the computer readable medium if a condition is met. In an embodiment, the condition may include a condition corresponding in part or whole to a state of the computer readable medium, a presence and/or absence of a predetermined content of the saved captured image, a characteristic of the saved image, an image storage administrative criterion, and/or a temporal criterion. In a further embodiment, a condition does not include an automatic or standing condition that normally occurs upon completion of a processing, for example, completion of decoding raw image data into a more machine usable and/or user viewable format.

Examples of decreasing a resolution of a saved captured image include, but are not limited to, changing a resolution of a saved captured image, resampling a saved captured image, adjusting an exposure of a saved captured image, adjusting some image content of a saved captured image, and/or adjusting image composition of a saved captured image. As described within this document, certain embodiments of the decreasing a resolution of a saved captured image are configurable to decrease the resolution of the image such as by utilizing pixel-combination and/or combination of multiple images. The decreasing a resolution of a saved captured image may include altering image intensity and/or color values. The decreasing a resolution of a saved captured image may in certain embodiments, but not others, be equated to sizing the resolution of an image downward, and may other embodiments be implemented by removing pixels from the saved captured image. The decreasing a resolution of a saved captured image may pertain in certain embodiments, but not others, to altering the color values and/or the color intensities of a particular image. The decreasing a resolution of a saved captured image may pertain to decreasing the density of the pixels forming the image. During a resolution decreasing process, in certain embodiments of a display or projector, a footprint of pixels may be suitably altered to effectively change the resolution of the at least one image.

In an embodiment, the computer readable media 340 may include a variety of computer readable media products. The computer readable media may include any storage media accessible by a computing device, and includes both removable and non-removable media. By way of example, and not of limitation, computer-readable media may include any computer storage media. Computer storage media includes removable and non-removable media implemented in any method or technology for storage of information such as computer-readable instructions, data structures, program modules, or other data. Computer storage media may include, but are not limited to, magnetic devices, such as magnetic disk storage, magnetic cassettes, magnetic tape, or other magnetic storage devices; optical devices, such as CD-ROM, digital versatile disks (DVD), or other optical disk storage; memory cards, such a flash memory card; and/or any other medium which may be used to store the captured information and which can be accessed by a computing device. Combinations of any of the above may also be included within the scope of a computer-readable medium.

FIG. 3 illustrates an embodiment where the computer readable media 340 includes at least one instance of a computer readable medium. Illustrated instances of a computer readable medium include a computer storage device 348, a non-removable non-volatile medium 346, and/or a removable non-volatile medium 344. In an embodiment, the computer storage device may include any device capable of storing data, such as, for example, a mass storage device, a disk drive, and/or a tape drive. In another embodiment, the non-removable non-volatile medium may include a non-volatile magnetic disk or other medium. In a further embodiment, the removable non-volatile medium may include an optical disk such as a CD ROM, magnetic tape cassettes, flash memory cards, DVDs, and/or digital video tape.

In an embodiment, the computer readable medium 340 includes a non-volatile computer storage device. In another embodiment, the computer readable medium includes a non-volatile computer readable medium. In a further embodiment, the computer readable medium includes a removable non-volatile computer readable medium.

In an embodiment, the image acquisition module 320 operable to capture an image includes an image acquisition module operable to capture a still image, an image stream, and/or a combination of a still image and an image stream. In another embodiment, the image acquisition module operable to capture an image includes an image acquisition module operable to capture at least one of a visual image, an audio image, and/or a combination of a visual image and an audio image. In a further embodiment, the image acquisition module operable to capture an image includes an image acquisition module operable to capture an image in response to a received instruction from another digital device. The received instruction from another digital device may include an instruction received from another digital camera. The received instruction may direct capture of the image, or may include data responsive to which the image acquisition module captures the image.

In an embodiment, the image management module 330 operable to save a captured image at a resolution in a computer readable medium and in a user-accessible form includes an image management module operable to save a captured image at a resolution in the computer readable medium and in a user-accessible album of images stored in a computer readable medium. In another embodiment, the image management module operable to save a captured image at a resolution in a computer readable medium includes an image management module operable to save a captured image at a resolution in the computer readable medium and in a user-accessible collection of images stored in a computer readable medium. In a further embodiment, the image management module operable to save a captured image at a resolution in the computer readable medium and in a user-accessible form includes an image management module operable to save a captured image at a resolution in a user-accessible data structure.

In an embodiment, the image management module 330 operable to decrease the resolution of the saved captured image in the computer readable medium if a condition is met includes an image management module operable to decrease the resolution of the saved captured image in the computer readable medium using a lossy compression algorithm if a condition is met. In another embodiment, the image management module operable to decrease the resolution of the saved captured image in the computer readable medium if a condition is met includes an image management module operable to decrease the resolution of the saved captured image in the computer readable medium if a time exceeds a preselected time threshold. The preselected time threshold may exceed five seconds. The preselected time threshold may exceed at least a selected one of ten seconds, thirty seconds, one minute, thirty minutes, ninety minutes, five hours, twelve hours, one day, one week, one month, or one year.

In a further embodiment, the image management module 330 operable to decrease the resolution of the saved captured image in the computer readable medium if a condition is met includes an image management module operable to decrease the resolution of the saved captured image in the computer readable medium if a time value is inside a preselected time window. In an embodiment, the image management module operable to decrease the resolution of the saved captured image in the computer readable medium if a condition is met includes an image management module operable to decrease the resolution of the saved captured image in the computer readable medium if a condition is met where the condition corresponds to at least one of a storage space availability in the computer readable medium, a user established parameter, a preselected content of the image, and/or a parameter established by a storage management algorithm. In another embodiment, the image management module operable to decrease the resolution of the saved captured image in the computer readable medium if a condition is met includes an image management module operable to decrease the resolution of the saved captured image in the computer readable medium if a condition independent of the operation to save a captured image at a resolution in the computer readable medium is met. In a further embodiment, the image management module operable to decrease the resolution of the saved captured image in the computer readable medium if a condition is met includes an image management module operable to decrease the resolution of the saved captured image in the computer readable medium if a condition responsive to an examination of at least one other captured image saved in the computer readable medium is met. For example, a condition responsive to an examination of at least one other captured image saved in the computer readable medium may include examining a content and/or context of the at least one or more other saved captured images for a repetition and/or duplication. If at least one other saved captured image is examined and found to be repetitive and/or duplicative of the saved captured image, the condition would be met and the image management module would operate to reduce the resolution of the saved captured image. In an alternative embodiment, the image management module may include an operability to reduce the resolution of the at least one other saved image in response to the condition being met.

In an embodiment, the image management module 330 may further include an image management module operable to further decrease the resolution of the captured image saved in the computer readable medium if another condition is met.

Figure 4:
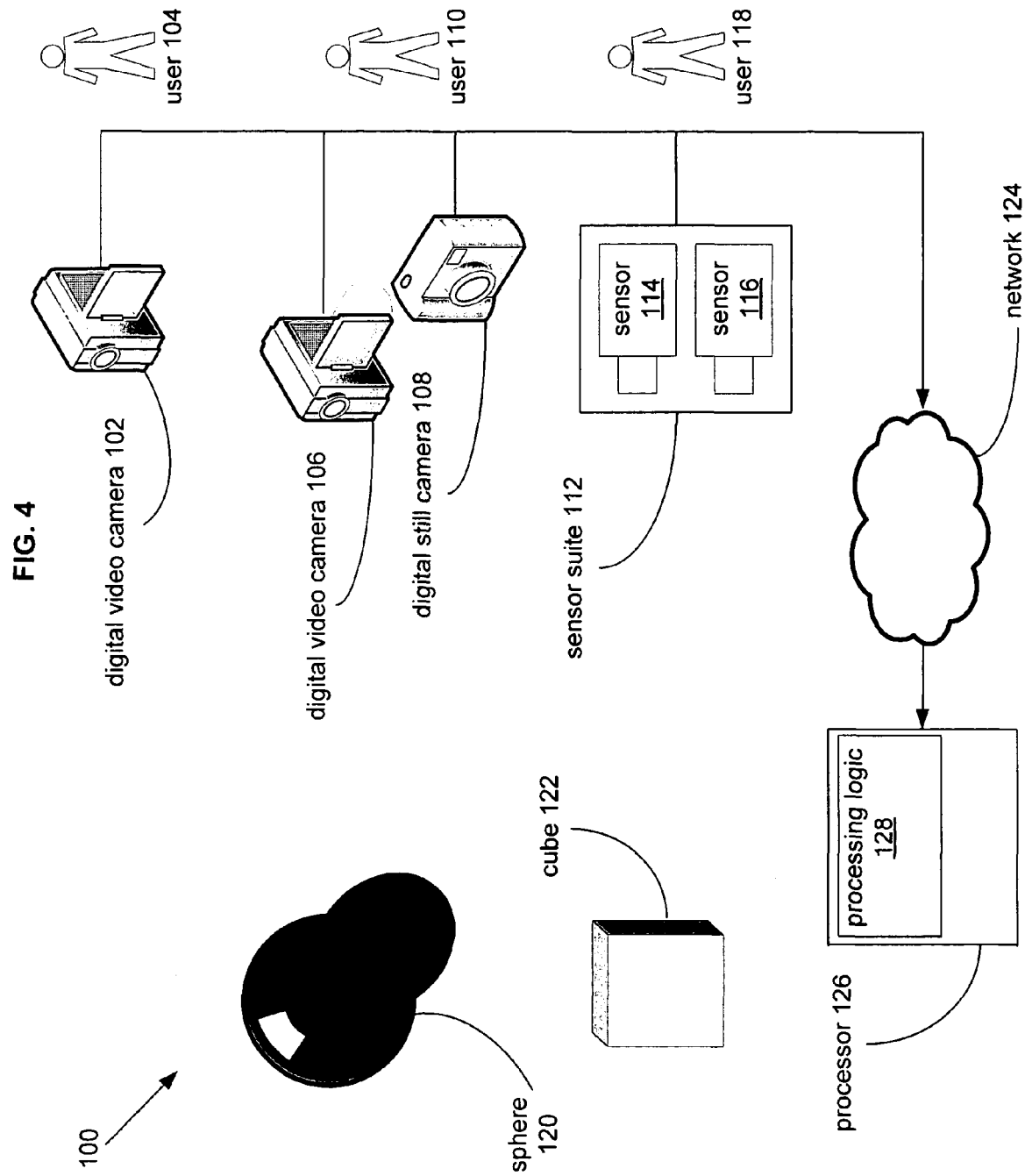
FIG. 4 depicts one implementation of an exemplary environment in which the methods and systems described herein may be represented.

FIG. 4 depicts one implementation of an exemplary environment in which the methods and systems described herein may be represented. In the depicted exemplary environment 100, are illustrated a variety of exemplary sensors: a digital video camera 102 operated by one or more users represented by user 104; a digital video camera 106 used in conjunction with a digital still camera 108, both operated by one or more users represented by user 110; and a sensor suite 112 comprising more than one sensor represented by sensor 114 and sensor 116 (wherein the sensors 114 and 116 may be but need not be physically co-located, and may be but need not be of the same type, e.g., sensor 114 may be an infrared device and sensor 116 may be a radar device), the sensor suite being operated by one or more users represented by user 118. The exemplary sensors represent a variety of devices for the detection and/or the recording and/or the transmission of imagery aspects, e.g., images, including but not limited to digital video cameras, digital still cameras, digital sensor (e.g. CCD or CMOS) arrays, and radar sets. The exemplary users 104, 110, and/or 118 may, for example, operate the exemplary sensors manually or may supervise and/or monitor their automatic operation. The exemplary users 104, 110, and/or 118 may operate the exemplary sensors in physical proximity to the sensors or remotely. The exemplary sensors may also operate autonomously without exemplary users 104, 110, and/or 118.

The exemplary sensors may be used to detect and/or record and/or transmit images of a wide variety of objects, represented in FIG. 4 by exemplary objects, a sphere 120 and a cube 122. The sphere 120 and the cube 122 are representative of any objects or groups of object, images of which may be detectable and/or recordable and/or transmissible by the exemplary sensors, including but not limited to persons, animals, buildings, roads, automobiles, tracks, aircraft, ships, spacecraft, landscape and/or seascape features, vegetation, and/or celestial objects. When used together in any given example herein, the exemplary sphere 120 and the exemplary cube 122 generally represent two distinct objects which may or may not be of the same or of a similar type, except where otherwise required by the context, e.g., a sphere 120 and a cube 122 used together in an example may represent a first particular object and a second particular object, e.g., a particular person and a particular building, or a particular first aircraft and a particular second aircraft, respectively. When used alone in any given example herein, the designated exemplary object, e.g., the sphere 120 or the cube 122, generally represents the same object, except where otherwise required by the context, e.g., a sphere 120 used alone in an example generally represents a single object, e.g., a single building, and a cube 122 used alone generally represents a single object, e.g., a particular person.

Each of the exemplary sensors may detect and/or record and/or transmit images of the exemplary objects in a variety of combinations and sequences. For instance, the digital video camera 102 may detect and/or record and/or transmit an image of the sphere 120 and then an image of the cube 122 sequentially, in either order; and/or, the digital video camera 106 may detect and/or record and/or transmit a single image of the sphere 120 and the cube 122 together.

Similarly, the digital video camera 106 may detect and/or record and/or transmit an image of the sphere 120 and of the cube 122 sequentially, in either order, and/or of the sphere 120 and the cube 122 together, before, after, partially simultaneously with, or simultaneously with an operation of the digital still camera 108. The digital still camera 108 may detect and/or record and/or transmit an image of the sphere 120 and of the cube 122 sequentially, in either order, and/or of the sphere 120 and the cube 122 together, before, after, partially simultaneously with, or simultaneously with an operation of the digital video camera 106.

Similarly, the sensor 114 and the sensor 116 of the sensor suite 112 may detect and/or record and/or transmit an image of the sphere 120 and then of the cube 122 sequentially, in either order, and/or of the sphere 120 and the cube 122 together, before, after, partially simultaneously with, or simultaneously with respect to each other.

Such images may be recorded and/or transmitted via a computer or computers represented by the network 124 and/or directly to a processor 126 and/or processing logic 128, which accept data representing imagery aspects of the exemplary objects. The processor 126 represents one or more processors that may be, for example, one or more computers, including but not limited to one or more laptop computers, desktop computers, and/or other types of computers. The processing logic may be software and/or hardware and/or firmware associated with the processor 126 and capable of accepting and/or processing data representing imagery aspects of the exemplary objects from the exemplary sensors. Such processing may include but is not limited to comparing at least a portion of the data from one sensor with at least a portion of the data from the other sensor, and/or applying a mathematical algorithm to at least a portion of the data from one sensor with at least a portion of the data from the other sensor. Such processing may also include, but is not limited to, deriving third data from the combining at least a portion of the data from one sensor with at least a portion of the data from another sensor.

The exemplary sensors may be capable of detecting and/or recording and/or transmitting one or more imagery aspects of the exemplary objects, the one or more imagery aspects being defined in part, but not exclusively, by exemplary parameters such as focal length, aperture (f-stop being one parameter for denoting aperture), t-stop, shutter speed, sensor sensitivity (such as film sensitivity (e.g., film speed) and/or digital sensor sensitivity), exposure (which may be varied by varying, e.g., shutter speed and/or aperture), frequency and/or wavelength, focus, depth of field, white balance (and/or white point, color temperature, and/or micro reciprocal degree or "mired"), and/or flash. Some or all of the parameters that may define at least in part imagery aspects may have further defining parameters. For example, a frequency and/or wavelength parameter may be associated with one or more bandwidth parameters; and a flash parameter may be associated with one or more parameters for, e.g., duration, intensity, and/or special distribution. Note that although certain examples herein discuss bracketing and/or imagery aspects and/or exemplary parameters in the context of more or less "still" images for sake of clarity, techniques described herein are also applicable to streams of images, such as would typically be produced by digital video cameras 102/106 and thus the use of such, and other, exemplary terms herein are meant to encompass both still and video bracketing/aspects/parameters/etc. unless context dictates otherwise. For instance, the bracketing might include bracketing over, say, 20 frames of video.

Each of the exemplary sensors may detect and/or record and/or transmit one or more imagery aspects of an exemplary object at more than one setting of each of the available parameters, thereby bracketing the exemplary object. Generally, "bracketing" includes the imagery technique of making several images of the same object or objects using different settings, typically with a single imagery device such as digital video camera 106. For example, the digital video camera 106 may detect and/or record and/or transmit a series of imagery aspects of the cube 122 at a number of different f-stops; before, after, partially simultaneously with, and/or simultaneously with that series of imagery aspects, another digital video camera 106 and/or another type of sensor, such as sensor 114 may detect and/or record and/or transmit a series of imagery aspects of the sphere 120 and of the cube 122 at a number of different white balances. The processor 126 and/or the processing logic 128 may then accept, via the network 124 or directly, data representing the imagery aspects detected and/or recorded and/or transmitted by the digital video cameras 106 or by the digital video camera 106 and the sensor 114. The processor 126 and/or the processing logic 128 may then combine at least a portion of the data from one of the sensors with at least a portion of the data from the other sensor, e.g., comparing the data from the two sensors. For example, deriving an identity of color and orientation from the bracketing imagery aspect data of two cubes 122 from digital video camera 106 and sensor 114.

Those skilled in the art will appreciate that the explicitly described examples involving the exemplary sensors (the digital video camera 102, the digital video camera 106, the digital still camera 108, and the sensor suite 112 including sensor 114 and sensor 116), the exemplary users (users 104, 110, and 118), the exemplary objects (the sphere 120 and the cube 122), the network 124, the exemplary processor 126, and the exemplary processing logic 128 constitute only a few of the various aspects illustrated by FIG. 4.

FIGS. 5-8 are a series of flowcharts depicting exemplary implementations of processes. For ease of understanding, the flowcharts are organized such that the initial flowcharts present implementations via an overall "big picture" viewpoint and thereafter the following flowcharts present alternate implementations and/or expansions of the "big picture" flowcharts as either sub-steps or additional steps building on one or more earlier-presented flowcharts. Those having skill in the art will appreciate that the style of presentation utilized herein (e.g., beginning with a presentation of a flowchart(s) presenting an overall view and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
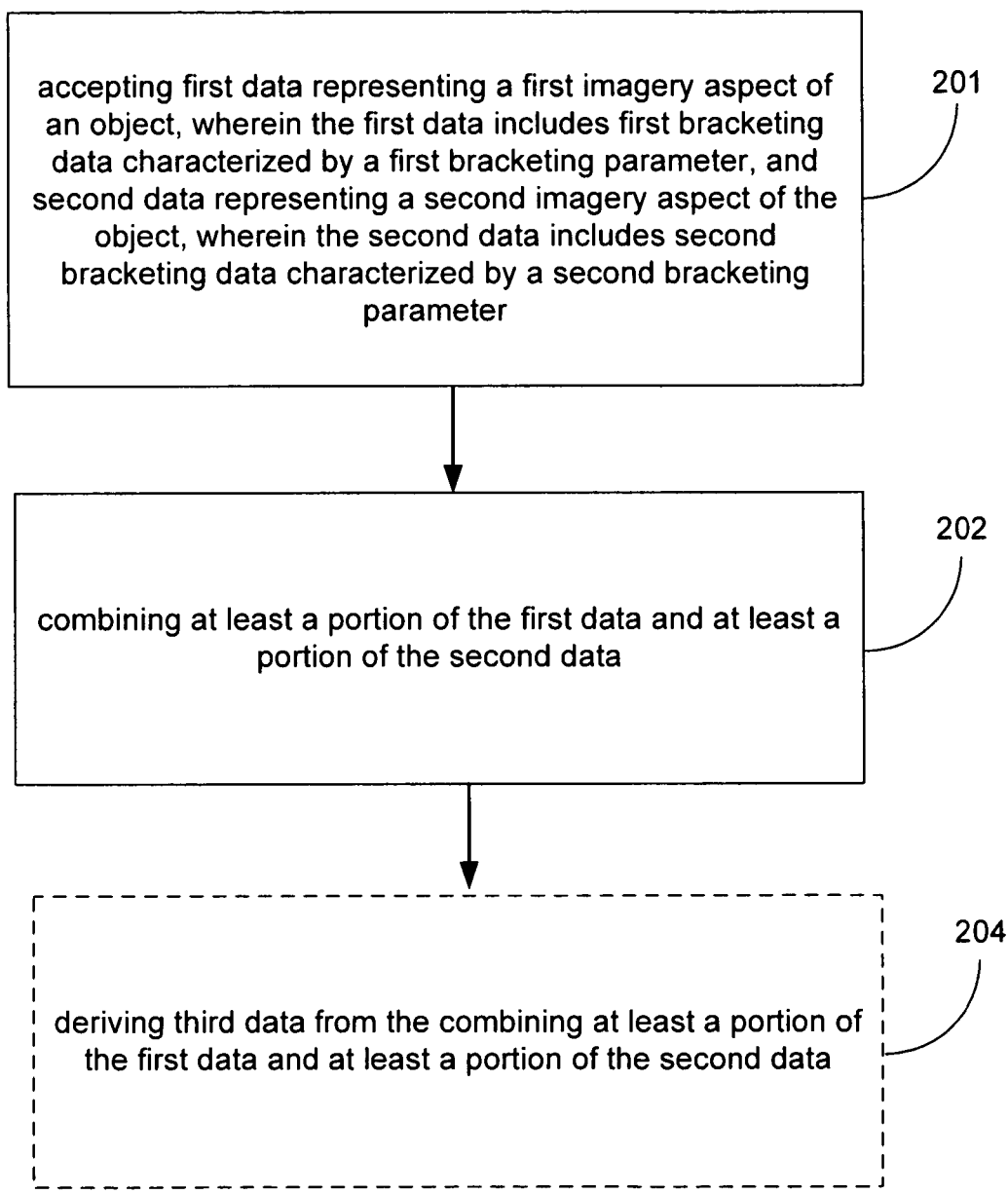
FIG. 5 depicts a high-level flowchart of an exemplary operational process.

FIG. 5 depicts a high-level flowchart of an exemplary operational process. Operation 201 shows accepting first data representing a first imagery aspect of an object, wherein the first data includes first bracketing data characterized by a first bracketing parameter, and second data representing a second imagery aspect of the object, wherein the second data includes second bracketing data characterized by a second bracketing parameter (e.g., accepting, via a processor 126 and hardware/software/firmware of processing logic 128, data representing an imagery aspect of a sphere 120 including a set of bracketing images taken at different f-stops using a digital still camera 108 and data representing an imagery aspect of the sphere 120 including a set of bracketing images taken at different frequencies using digital video camera 106).

Operation 202 depicts combining at least a portion of the first data and at least a portion of the second data (e.g., combining, via a processor 126 and hardware/software/firmware of processing logic 128, the data representing the imagery aspect of the sphere 120 and the data representing the imagery aspect of the sphere 120).

Operation 204 depicts an optional process component that includes deriving third data from the combining at least a portion of the first data and at least a portion of the second data (e.g., deriving, via a processor 126 and hardware/software/firmware of processing logic 128, using character and pattern recognition algorithms, a probable identification of a cube 122 as a specific cube of interest from combining data representing an imagery aspect of a cube 122 including a set of bracketing images taken at different white balances using a digital video camera 106 with data representing an imagery aspect of a cube 122 including a set of bracketing images taken at different flashes using digital still camera 108; or, e.g., deriving, via a processor 126 and hardware/software/firmware of processing logic 128, using parallax, a distance of a sphere 120 by combining data representing an imagery aspect of the sphere 120 including a set of bracketing images taken at different focuses using a sensor 114 of a sensor suite 112 and data representing an imagery aspect of the sphere 120 including a set of bracketing images taken at different focuses using a sensor 116 of a sensor suite 112).

Figure 6:
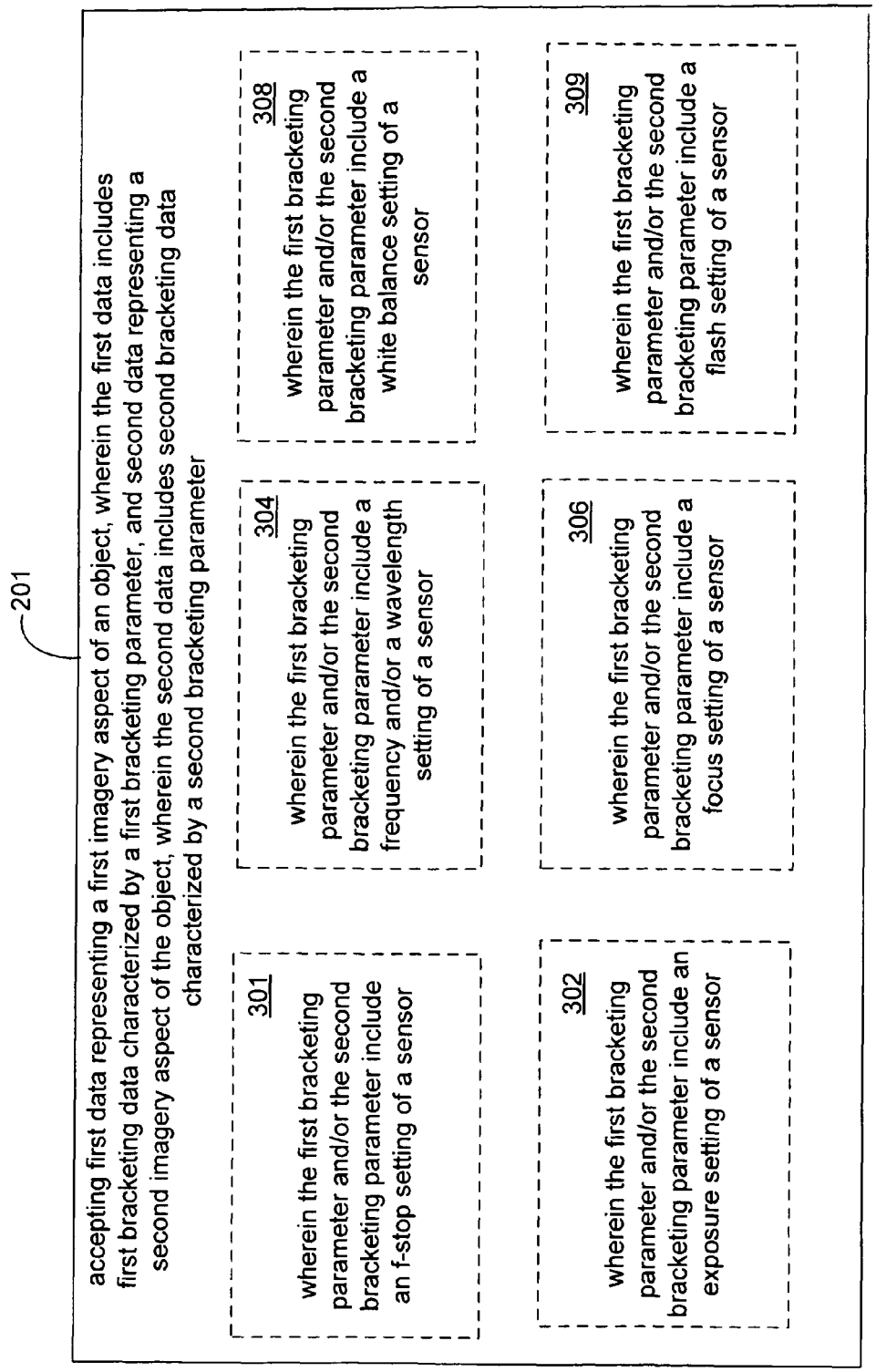
FIG. 6 shows several alternative implementations of the high-level flowchart of FIG. 5.

FIG. 6 shows several alternative implementations of the high-level flowchart of FIG. 5. Previously described operation 201 may include one or more of the following operations: 301, 302, 304, 306, 308, and/or 309.

Operation 301 shows an aspect wherein the first bracketing parameter and/or the second bracketing parameter include an f-stop setting of a sensor (e.g., accepting, via a processor 126 and hardware/software/firmware of processing logic 128, data representing an imagery aspect of a sphere 120 including a set of bracketing images taken at different f-stops using a sensor 114 of a sensor suite 112 and data representing an imagery aspect of a sphere 120 including a set of bracketing images taken at different f-stops using a sensor 116 of the sensor suite 112).

Operation 302 depicts an aspect wherein the first bracketing parameter and/or the second bracketing parameter include an exposure setting of a sensor (e.g., accepting, via a processor 126 and hardware/software/firmware of processing logic 128, data representing an imagery aspect of a cube 122 including a set of bracketing images taken at different exposures using a digital video camera 106 and data representing an imagery aspect of a cube 122 including a set of bracketing images taken at different exposures using a still video camera 108).

Operation 304 illustrates an aspect wherein the first bracketing parameter and/or the second bracketing parameter include a frequency and/or a wavelength setting of a sensor (e.g., accepting, via a processor 126 and hardware/software/firmware of processing logic 128, data representing an imagery aspect of a sphere 120 including a set of bracketing images taken at different wavelengths using a digital video camera 102 and data representing an imagery aspect of a sphere 120 including a set of bracketing images taken at different wavelengths using a digital video camera 102).

Operation 306 shows an aspect wherein the first bracketing parameter and/or the second bracketing parameter include a focus setting of a sensor (e.g., accepting, via a processor 126 and hardware/software/firmware of processing logic 128, data representing an imagery aspect of a cube 122 including a set of bracketing images taken at different focuses of a sensor 114 of a sensor suite 112 and data representing an imagery aspect of a cube 122 including a set of bracketing images taken at different focuses of a sensor 116 of a sensor suite 112).

Operation 308 illustrates an aspect wherein the first bracketing parameter and/or the second bracketing parameter include a white balance setting of a sensor (e.g., accepting, via a processor 126 and hardware/software/firmware of processing logic 128, data representing an imagery aspect of a sphere 120 including a set of bracketing images taken at different white balances using a digital video camera 102 and data representing an imagery aspect of a sphere 120 including a set of bracketing images taken at different white balances using the digital video camera 102).

Operation 309 depicts an aspect wherein the first bracketing parameter and/or the second bracketing parameter include a flash setting of a sensor (e.g., accepting, via a processor 126 and hardware/software/firmware of processing logic 128, data representing an imagery aspect of a cube 122 including a set of bracketing images taken at different flashes using a digital video camera 106 and data representing an imagery aspect of a cube 122 including a set of bracketing images taken at different flashes using a digital still camera 108).

Figure 7:
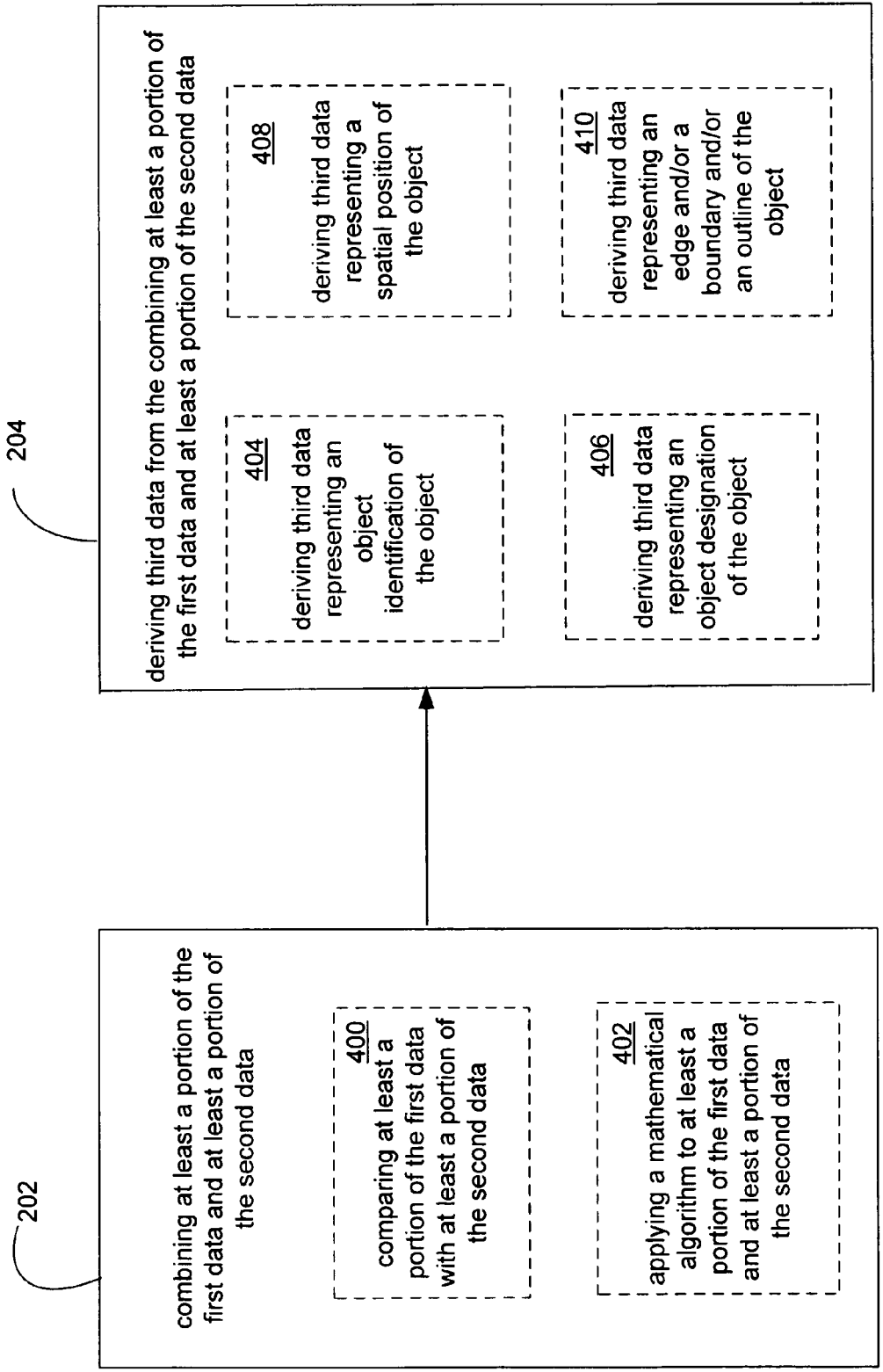
FIG. 7 shows several other alternative implementations of the high-level flowchart of FIG. 5.

FIG. 7 shows several other alternative implementations of the high-level flowchart of FIG. 5. Previously described operation 202 may include one or more of the following operations: 400 and/or 402.

Operation 400 shows an aspect comparing at least a portion of the first data with at least a portion of the second data (e.g., comparing, via a processor 126 and hardware/software/firmware of processing logic 128, data representing an imagery aspect of a cube 122 including a set of bracketing images taken at different f-stops using a digital video camera 106 with data representing an imagery aspect of a cube 122 including a set of bracketing images taken at different exposures using digital still camera 108, as when, e.g., a comparison of apparent spatial orientation or orientations of the cube 122 in f-stop bracketing images to apparent spatial orientation or orientations of the cube 122 in exposure bracketing images may be useful in estimating a single spatial orientation characterization for the cube 122).

Operation 402 depicts an aspect applying a mathematical algorithm to at least a portion of the first data and at least a portion of the second data (e.g., applying an algorithm, via a processor 126 and hardware/software/firmware of processing logic 128, for edge detection, such as a "Laplacian-of-Gaussians" ("LoG") filter and/or a PLUS filter, and/or for registration accomplished by applying known techniques to data representing an imagery aspect of a cube 122 including a set of bracketing images taken at different white balances using a sensor 116 of a sensor suite 112 and to data representing an imagery aspect of a cube 122 including a set of bracketing images taken at different flashes using digital still camera 108).

As further depicted in FIG. 7, previously described operation 204 may include one or more of the following operations: 404, 406, 408 and/or 410.

Operation 404 shows deriving third data representing an object identification of the object (e.g., deriving, via a processor 126 and hardware/software/firmware of processing logic 128, from combining a result of a noise reduction algorithm applied to data representing an imagery aspect of a sphere 120 including a set of bracketing images taken at different f-stops using a sensor 114 of sensor suite 112 and a result of a comparable noise reduction algorithm applied to data representing an imagery aspect of a sphere 120 including a set of bracketing images taken at different exposures using a sensor 116 of sensor suite 112, an identification of the sphere 120 as a specific sphere 120 of interest, as when, e.g., the noise reduction algorithm or algorithms yield resulting images of unique surface features of the sphere 120, permitting identification of the sphere 120 with respect to a reference image or description of the sphere 120 with a characterizable degree of confidence).

Operation 406 depicts deriving third data representing an object designation of the object (e.g., deriving, via a processor 126 and hardware/software/firmware of processing logic 128, from combining data representing an imagery aspect of a cube 122 including a set of bracketing images taken at different white balances using a digital video camera 102 and data representing an imagery aspect of a cube 122 including a set of bracketing images taken at different exposures using a digital video camera 102 and then applying a character-recognition algorithm to the combination, a designation of the cube 122 with a distinguishing label for reference, as when, e.g., the character-recognition algorithm or algorithms recognize a serial number painted on the cube 122, allowing designation of the cube 122 with a unique distinguishing label with a characterizable degree of confidence).

Operation 408 illustrates deriving third data representing a spatial position of the object (e.g., deriving, via a processor 126 and hardware/software/firmware of processing logic 128, from combining a result of applying a range-determination algorithm to data representing an imagery aspect of a sphere 120 including a set of bracketing images taken at different focuses using a sensor 114 of sensor suite 112 (where the spatial position and orientation of the sensor 114 are known or can be derived) and a result of applying a range-determination algorithm to data representing an imagery aspect of a sphere 120 including a set of bracketing images taken at different frequencies using a sensor 116 of sensor suite 112, a distance of the sphere 120 from the sensor suite 112 (where the spatial position and orientation of the sensor 116 are known or can be derived)).

Operation 410 shows (deriving third data representing an edge and/or a boundary and/or an outline of the object (e.g., deriving, via a processor 126 and hardware/software/firmware of processing logic 128, from combining a result of applying an edge detection algorithm, such as a "Laplacian-of-Gaussians" ("LoG") filter and/or a PLUS filter, to data representing an imagery aspect of a cube 122 including a set of bracketing images taken at different f-stops using a digital video camera 102 and a result of applying a comparable edge detection algorithm to data representing an imagery aspect of a cube 122 including a set of bracketing images taken at different focuses using a digital video camera 102, an edge of the cube 122 at which the image of the cube 122 and one or more background items and/or one or more foreground items are contiguous).

Figure 8:
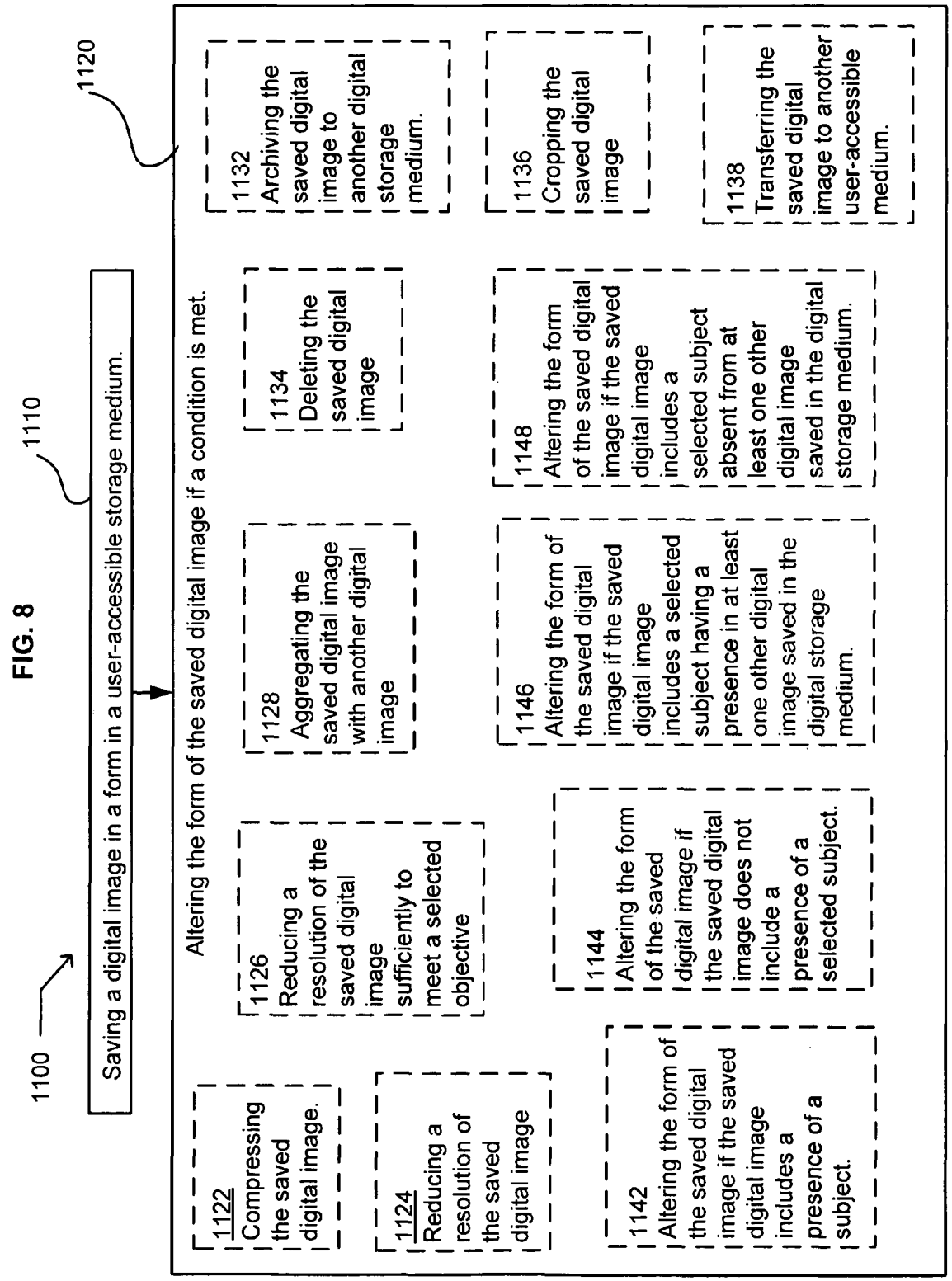
FIG. 8 shows additional alternative implementation features regarding saved digital images.

FIG. 8 illustrates an exemplary operational flow 1100 in which embodiments may be implemented. After a start operation, the exemplary operational flow moves to a hold operation 1110. The hold operation saves a digital image in a form in a user-accessible storage medium. A change operation 1120 alters the form of the saved digital image if a condition is met. The operational flow may then proceed directly or indirectly to an end operation. As shown in FIG. 8, the change operation 1120 may include one or more additional exemplary operations such as operations 1122, 1124, 1126, 1128, 1132, 1134, 1136, 1138, 142, 1144, 1146 and/or operation 1148.

As further depicted in FIG. 8, if a condition is met, the operation 1122 compresses the saved digital image. If a condition is met, the operation 1124 reduces a resolution of the saved digital image. If a condition is met, the operation 1126 reduces a resolution of the saved digital image sufficiently to meet a selected objective. For example, the selected objective may include a preselected objective or a substantially contemporaneously selected objective. By way of another example, a selected objective may include constructing a panorama that includes the digital image, creating a high dynamic range composite that includes the digital image, and/or a selected depth of field. If a condition is met, the operation 1128 aggregates the saved digital image with another digital image.

As additionally illustrated in FIG. 8, if a condition is met, the operation 1132 archives the saved digital image to another user-accessible storage medium. If a condition is met, the operation 1134 deletes the saved digital image. If a condition is met, the operation 1136 crops the saved digital image. If a condition is met, the operation 1138 transfers the saved digital image to another user-accessible storage medium.

As depicted in other illustrated examples, if a condition is met, the operation 1142 alters the form of the saved digital image if the saved digital image includes a presence of a selected subject. If a condition is met, the operation 1144 alters the form of the saved digital image if the saved digital image does not include a presence of a selected subject. If a condition is met, the operation 1146 alters the form of the saved digital image if the saved digital image includes a presence of a selected subject having a presence in at least one other digital image saved in the user-accessible storage medium. For example, a presence of a selected subject may include a selected frequency of a presence of a selected subject. If a condition is met, the operation 1148 alters the form of the saved digital image if the saved digital image includes a selected subject absent from at least one other digital image saved in the user-accessible storage medium.

Figure 9:
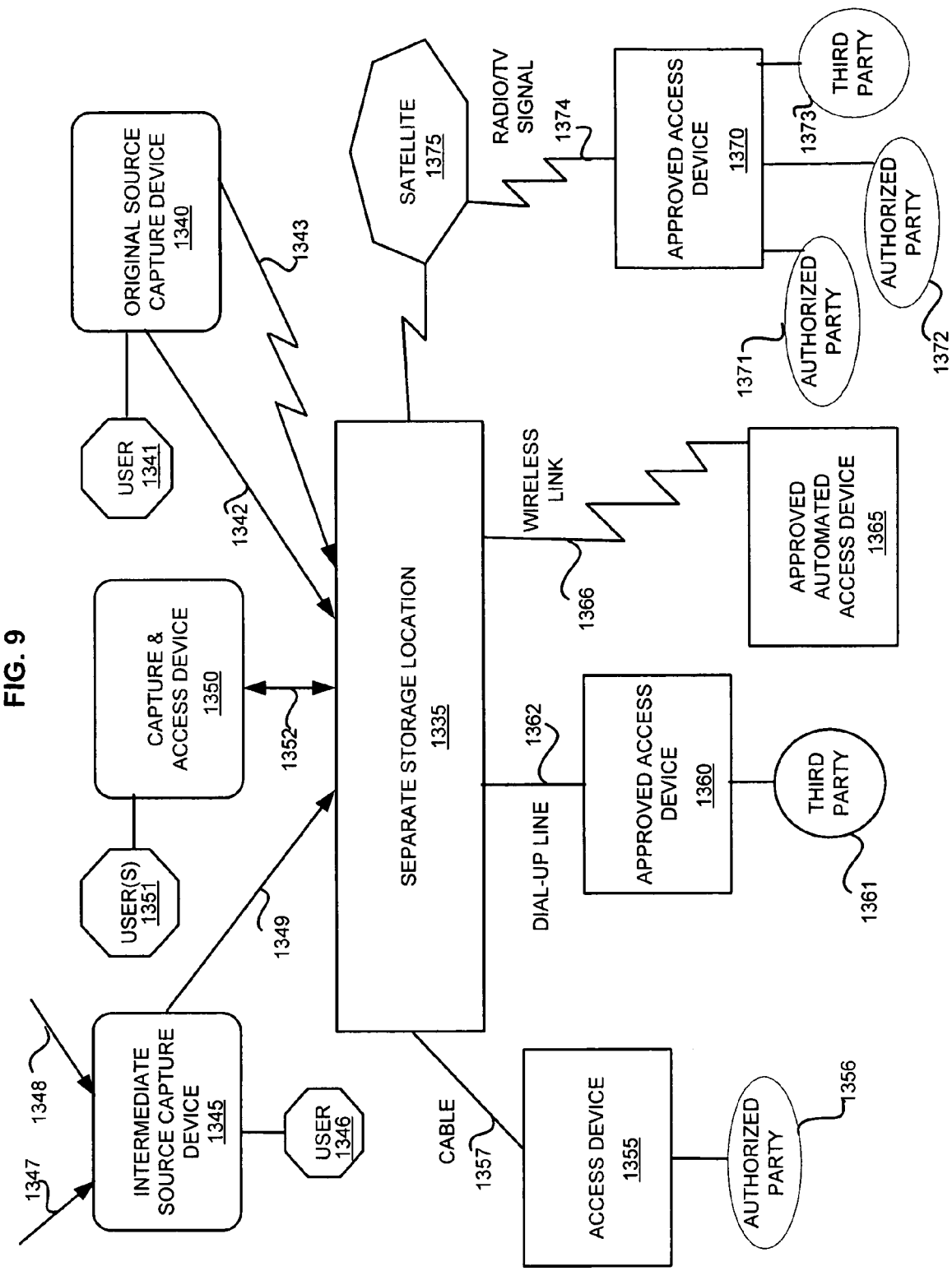
FIG. 9 is a schematic block diagram showing exemplary data storage communication embodiments.

The schematic block diagram of FIG. 9 illustrates various features of exemplary embodiments including separate storage location 1335, original source capture device 1340, intermediate source capture device 1345, and capture & access device 1350. A system implementation may include various combinations of features shown in FIG. 9. For example, original source capture device 1340 associated with user 1341 may have capability for transferring selected captured data via communication link 1342 to separate storage location 1335. A wireless communication link 1343 may also be used for such transfer to separate storage location 1335.

The intermediate source capture device 1345 associated with user 1346 is shown receiving data inputs 1347, 1348 and may have capability for transferring selected captured data via communication link 1349 to separate storage location 1335. The hybrid capture/access device 1350 associated with one or more users 1351 may have capability for both transferring selected captured data to separate storage location 1335 as well as accessing saved versions of the selected captured data available at the separate storage location (see bidirectional communication link 1352).

In some instances a designated device may be approved for implementing a transfer and/or access to the separate storage location 1335. In other instances an authorized party (e.g., user associated with the capture device or with access device, authorized third party, etc.) may be authorized for implementing a transfer and/or access from many types of designated devices to the separate storage location 1335.

The schematic diagram of FIG. 9 shows exemplary system embodiment components that may include access device 1355, approved access device 1360, approved automated access device 1365, and approved access device 1370.

Possible aspects may include an authorized party 1356 associated with access device 1355 having a communication link 1357 via cable to separate storage location 1335. Another possible aspect may include a third party 1361 associated with approved access device 1360 having a communication link 1362 via dial-up line to separate storage location 1335. A further possible aspect may include the approved automated access device 1365 having a wireless communication link 1366 to separate storage location 1335.

Another possible aspect may include multiple entities such as authorized party 1371, authorized party 1372, and third party 1373 associated with approved access device 1370 having a communication link 1374 (e.g., radio signal, television signal, etc.) via satellite 1375 to separate storage location 1335.

Figure 10:
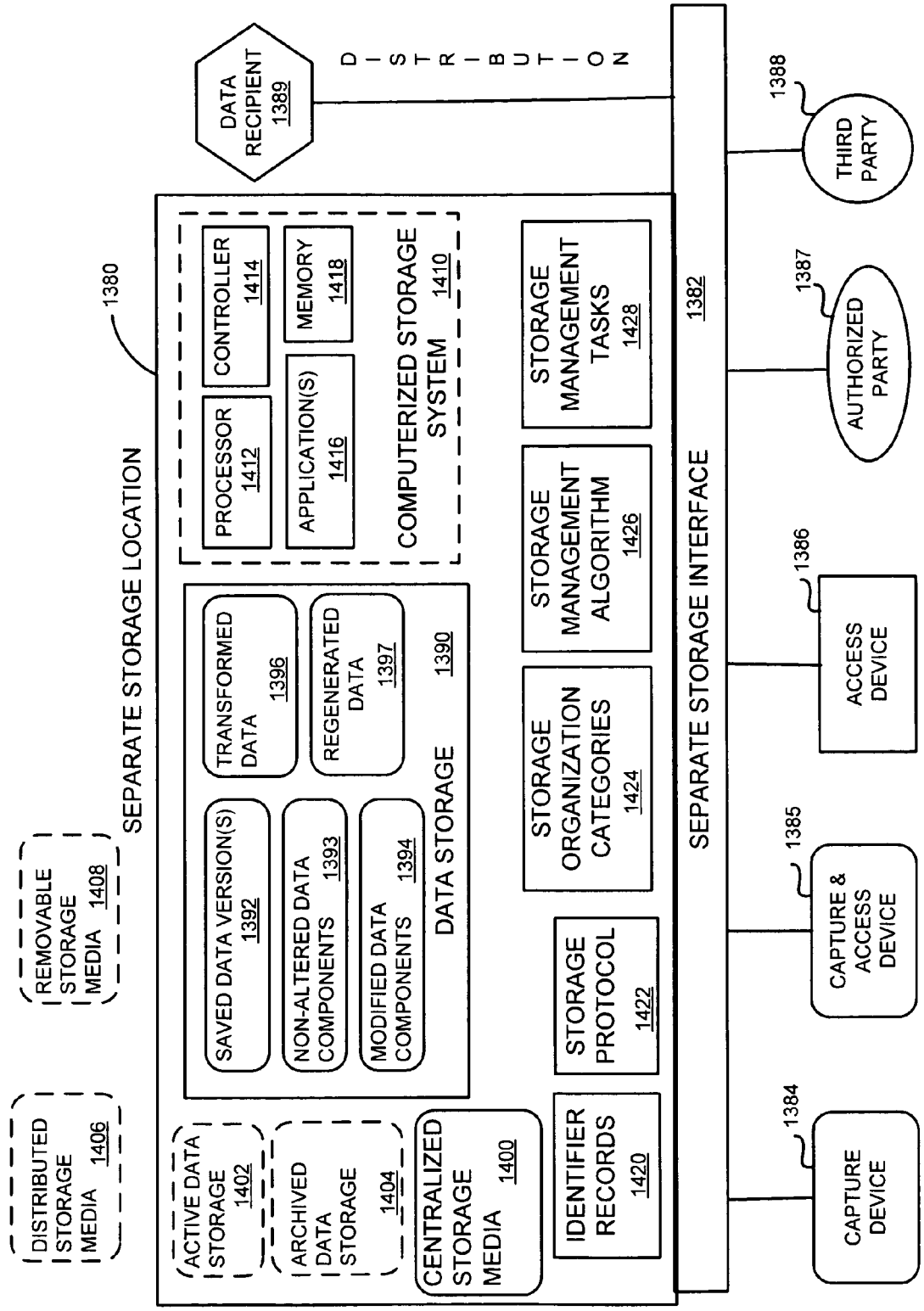
FIG. 10 schematically illustrates other possible features incorporated in an exemplary separate storage facility/location.

Referring to the schematic block diagram of FIG. 10, various exemplary embodiment features related to separate storage location 1380 may include a separate storage interface 1382 that has possible communication links with capture device 1384, capture & access device 1385, access device 1386, authorized party 1387 and third party 1388. In some implementations a data recipient 1389 may be connected via a distribution link to the separate storage interface 1382.

An exemplary data storage module 1390 may include one or more saved data versions 1392, non-altered data components 1393, modified data components 1394, transformed data 1396, and regenerated data 1397. An illustrated possible feature may include centralized storage media 1400, and in some instances active data storage files 1402 and archived data storage files 1404. Further aspects in some implementations may include distributed storage media 1406 and removable storage media 1408.

Processing of data may be accomplished by an exemplary computerized storage system 1410 incorporated as an integral part of the separate storage location 1380 or remotely linked to the separate storage location 1380. The computerized storage system 1410 may include processor 1412, controller 1414, one or more applications 1416, and memory 1418.

Additional types of storage-related modules may include identifier records 1420, storage protocol 1422, storage organization categories 1424, storage management algorithm 1426, and storage management tasks 1428.

Figure 11:
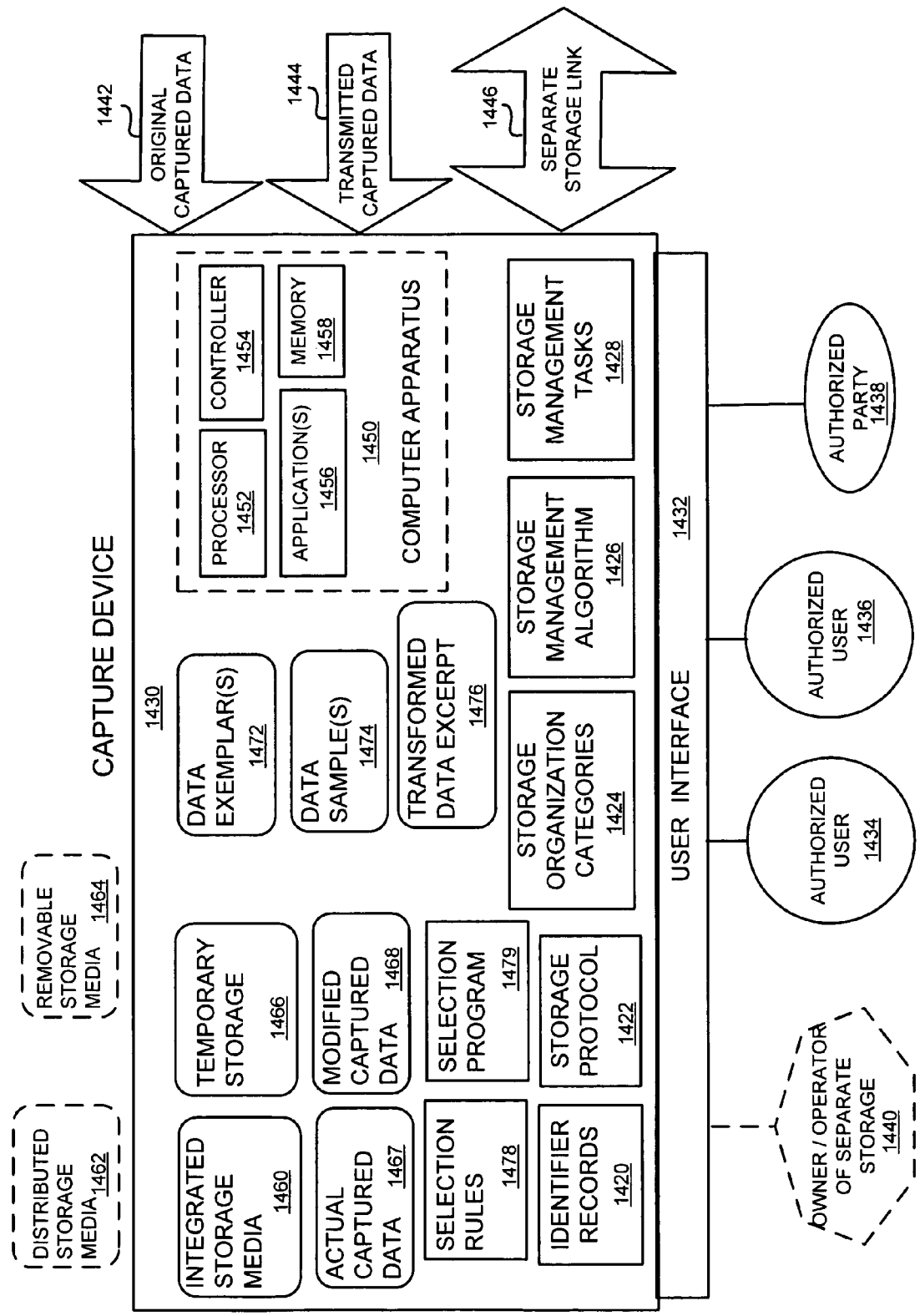
FIG. 11 schematically illustrates other possible features incorporated in an exemplary capture/transmitting device.

Referring to the schematic block diagram of FIG. 11, exemplary embodiment features incorporated in a capture device 1430 include user interface 1432 for authorized users 1434, 1436 as well as for authorized party 1438. In some instances such user interface 1432 may also be available to an owner or operator of a separate storage location 1440 that is linked (see 1446) to the capture device 1430.

Other communication links to the capture device 1430 may include an input channel for original captured data 1442, and another input channel for transmitted captured data 1444.

It will be understood that various functional aspects may be incorporated with the capture device and/or with the separate storage location. Accordingly the illustrated embodiment features of FIG. 11 may include previously described identifier records 1420, storage protocol 1422, storage organization categories 1424, storage management algorithm 1426, and storage management tasks 1428.

Of course it will be understood that the various exemplary type of records and data files are disclosed herein for purposes of illustration only and are not intended to be limiting. Some of the specified file parameters and records may not be included in certain implementations, and additional types of file parameters and records may be desirable additions in other implementations.

A computer apparatus 1450 incorporated in the capture device 1430, or in some instances remotely linked to the capture device 1430, may include processor 1452, controller 1454, one or more applications 1456, and memory 1458. Additional aspects operably coupled with the capture device 1430 may include integrated storage media 1460, temporary storage 1466, distributed storage media 1462, and removable storage media 1464.

Further types of data storage files may include actual captured data 1467, modified captured data 1468, one or more data exemplars 1472, one or more data samples 1474, and in some instances various transformed data excerpts 1476. Depending on the circumstances additional aspects may include data selection rules 1478, and a data selection program 1479 to process the captured data and facilitate a determination of which captured data will be immediately or ultimately transferred to the separate storage location. It will be understood that various records may be maintained at the transmitting device and/or at a destination storage facility to identify which individual or groups of captured data have been transferred, and in some instances providing addition details regarding the nature (e.g., resolution, future access limitations, etc.) of the selected captured data that has been transferred.

It will be further understood that aspects of such data selection rules 1478 or data selection program 1479 may be incorporated at the destination storage facility or at the transmitting device in order to achieve efficient and desirable transfer results. Some embodiments may provide somewhat sophisticated rules, including an ability to detect redundancies and carry out selection policies and goals. For example, a storage algorithm regarding soccer match data may seek to transfer at least one high resolution shot of each goal attempted or made, as well as limiting transferred spectator images to not more than ten per match and limiting transferred action player images to not more than fifty per match. Similarly a policy guideline may provide predetermined limits regarding transferred audiovisual data for each soccer match. Of course, availability of local storage capacity associated with the transmitting device may result in temporary (or perhaps long term) retention policies regarding certain types of captured data (current topical interest, additional time for pre-transfer review, etc.).

As disclosed herein, some exemplary system embodiments and computer program implementations may provide one or more program applications that include encoded process instructions for implementing a storage management algorithm that allows accessibility by a particular device to selected captured data having a quality parameter that is within an operational capability range of the particular device. Another possible implementation may provide one or more program applications that include encoded process instructions for implementing a storage management algorithm that retains for future accessibility the selected captured data having a quality parameter that exceeds an operational capability of a transmitting device.

Additional exemplary system embodiments and computer program implementations may provide one or more program applications that include encoded process instructions for implementing a storage management algorithm that facilitates accessibility to the different storage organization categories based on one or more of the following parameters: creator, participant, originator, source, owner, proprietary, public domain, goal, subject matter, event, established policy, selected policy, custom policy, redundancy, variety, resolution, reproduction, replication, captured quality, device quality, captured fidelity, device fidelity, commercial value, personal value, expected future use, recipient, required access frequency, expected access frequency, potential distribution, taxonomy, common theme, tag, classification, device capability, device attribute, device parameter, storage capability, storage attribute, storage parameter, device setting, user task, device context, user context, device history, and user history.

Other exemplary system embodiments may provide data storage files that include a saved version of selected captured data received from one or more of the following type of transmitting devices: still camera, audio recorder, digital audio recorder, audio-visual recorder, video recorder, digital video recorder, video camera, video/still camera, data recorder, telephone, cell phone, transceiver, PDA, computer, server, printer, fax, multi-function device, scanner, copier, surveillance camera, data sensor, mote, distributed imaging element, ingested sensor, medical sensor, medical imaging, health-monitoring device, traffic management device, media library, media player, vehicle sensor, vehicular device, environmental sensor, implanted device, mobile unit, fixed unit, integral, applied device, worn device, remote, radio, communication unit, scheduler, private, public, shared, residential, business, and office.

Additional possible system features may provide one or more transmitting devices for transferring the selected captured data via a communication link to the data storage files at a separate storage facility. Further possible system aspects may include one or more transmitting devices configured to implement transferring of the selected captured data based on one or more of the following criteria: rule, user input, user state, configuration, commercial, personal, context, space, device memory, device capability, bandwidth, separate storage memory, separate storage capability, separate storage accessibility, cost, task, preference, storage protocol, security, privacy, affiliation, and membership.

In some instances an exemplary implementation may include one or more transmitting devices that are owned or controlled by an entity that is an owner or operator of the separate storage facility.

Further exemplary system embodiments may provide one or more transmitting devices that include a portable transmitting device having one or more of the following storage capabilities: dedicated wireless link to remote storage, non-dedicated wireless link to remote storage, wireless link to multiple remote storage units, volatile memory, permanent memory, rewritable memory, internal memory, removable memory, backup memory, distributed memory, flash memory, and memory card.

Additional process components incorporated in a computer program product may include retaining at a separate storage facility for future availability some selected captured data having a given quality characteristic, which selected captured data is received via a communication link with a capturing device. A related incorporated process component may include retaining for future availability one or more of the following types of selected captured data: real-time, time-delayed, original, copied, scanned, faxed, sensed, detected, derived, computed, modified, composite, enhanced, reduced, filtered, edited, condensed, compressed, compiled, retransmitted, forwarded, stored, cached, prefetched, processed, raw, live, batched, and uploaded.

Other process components incorporated in a computer program product may include enabling future accessibility by an authorized user or approved device or recipient party to the selected captured data pursuant to the storage protocol. A related incorporated process component may include providing one or more of the following parameters associated with or incorporated in an identity record to facilitate the future accessibility: exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded.

A further process component incorporated in a computer program product may include providing an identifier record that is operably coupled to one or more of the different organization categories. In some implementations an incorporated process feature related to the identifier record may include providing the identifier record at the separate storage facility. Another possible incorporated process feature related to the identifier record may include providing the identifier record at the capturing device or other approved device.

Figure 12:
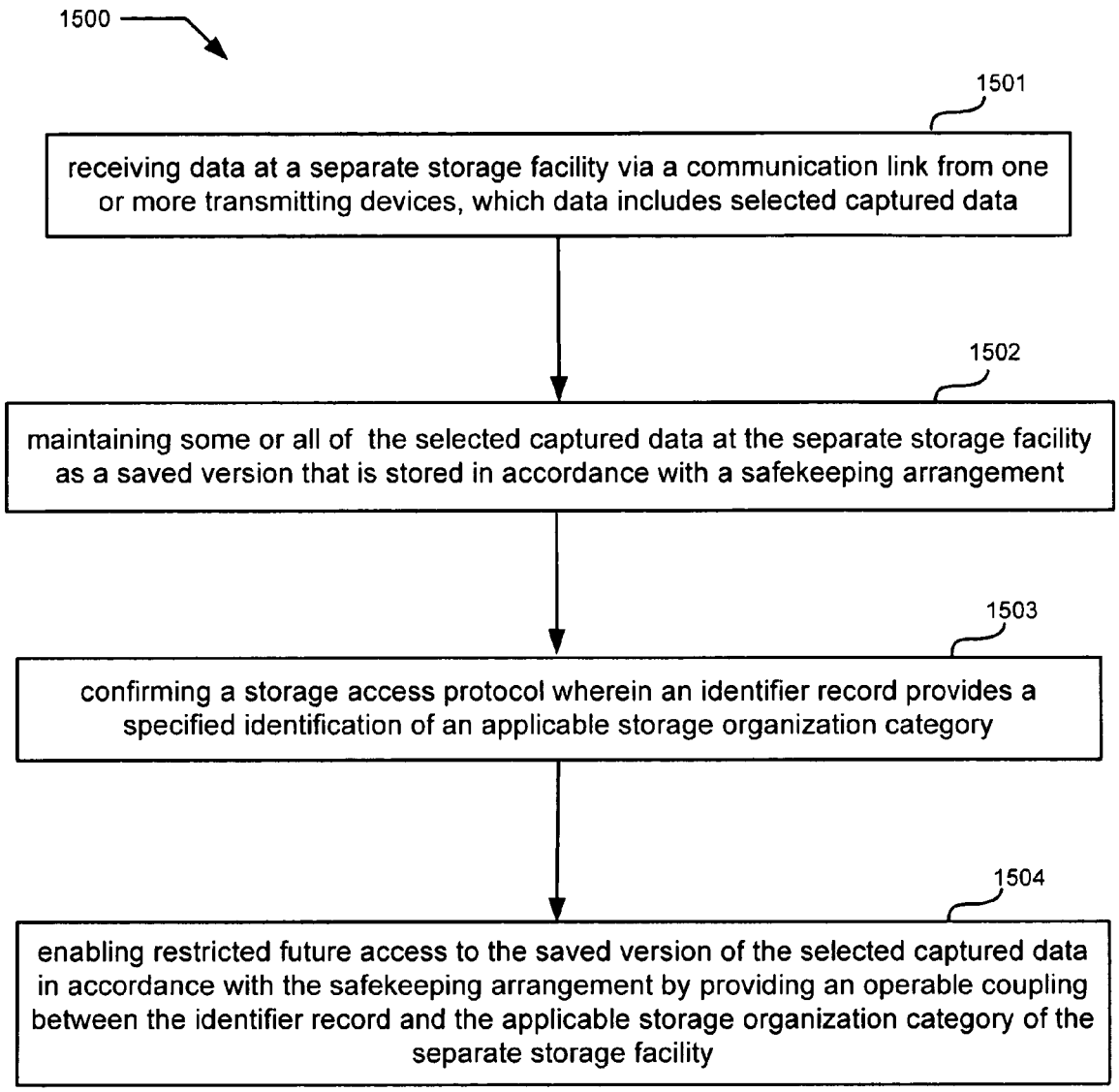
FIG. 12 is a high level flow chart showing another exemplary data storage access embodiment.

Referring to the high level flow chart of FIG. 12, an exemplary process embodiment 1500 for managing data storage may include receiving data at a separate storage facility via a communication link from one or more transmitting devices, which data includes selected captured data (block 1501); maintaining some or all of the selected captured data at the separate storage facility as a saved version that is stored in accordance with a safekeeping arrangement (block 1502); and confirming a storage access protocol wherein an identifier record provides a specified identification of an applicable storage organization category (block 1503). A further possible process feature may include enabling restricted future access to the saved version of the selected captured data in accordance with the safekeeping arrangement by providing an operable coupling between the identifier record and the applicable storage organization category of the separate storage facility (block 1504).

Figure 13:
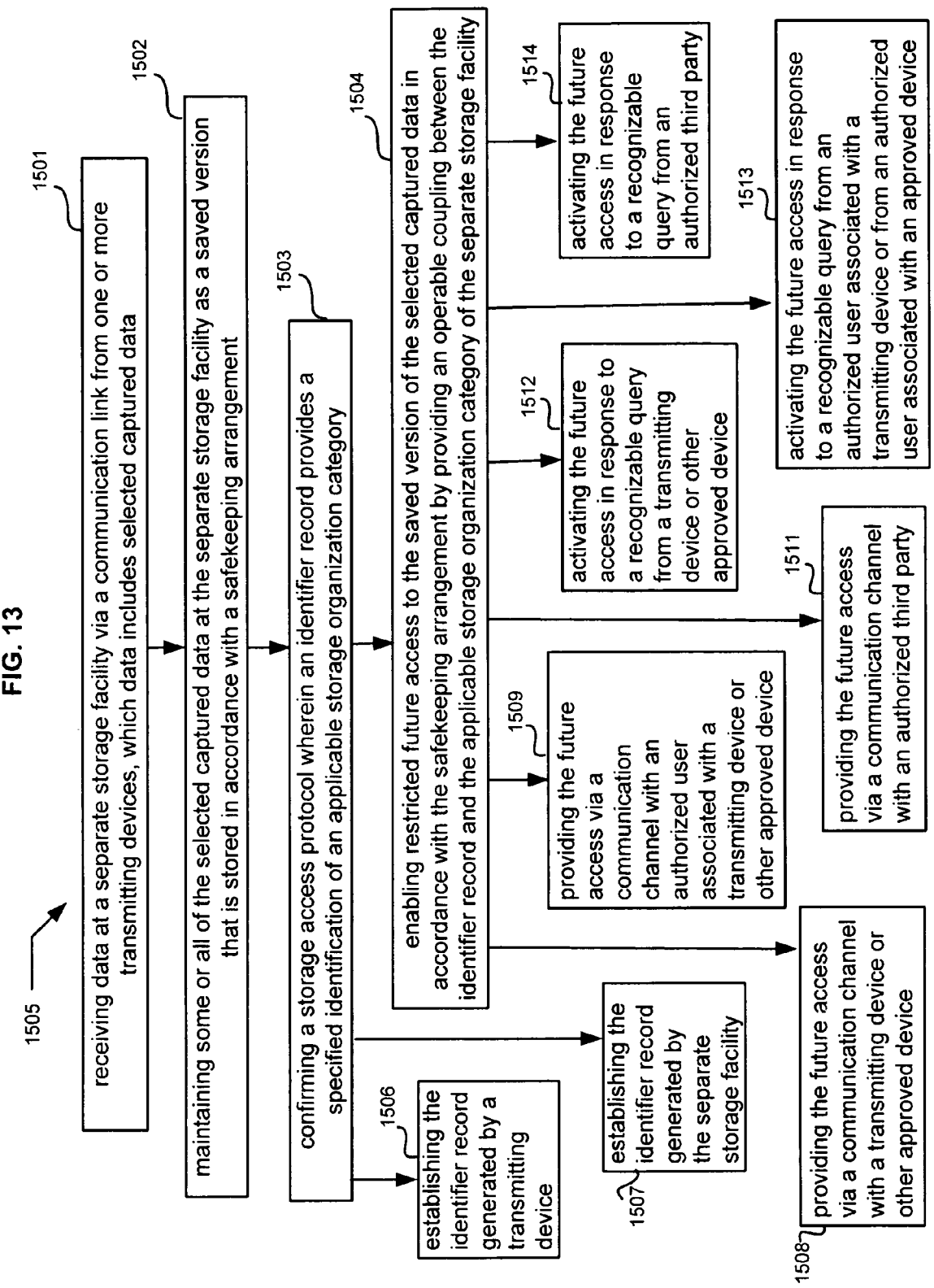
FIGS. 13-17 are detailed flow charts illustrating additional exemplary embodiments.

Additional exemplary process embodiments 1505 are shown in FIG. 13 which illustrates previously described components 1501, 1502, 1503, 1504 along with other possible features such as establishing an identifier record generated by a transmitting device (block 1506), and establishing an identifier record generated by the separate storage facility (block 1507). A further possible aspect related to restricted future access to the saved version of selected captured data may include providing such future access via a communication channel with a transmitting device or other approved device (block 1508).

It will be understood that some implementations may provide an authentication relationship between a collection of identifier records and an approved device (e.g., capture device, transmitting device, personal mobile device, etc.). Data security may then be accomplished by providing limited logon rights, lockout schemes, or other restricted device usage techniques. The pertinent identifier record(s) can be activated pursuant to specified device interaction with the separate storage facility.

Some implementations may include providing the future access via a communication channel with an authorized user associated with a transmitting device or other device (block 1509). Another possible feature may include providing the future access via a communication channel with an authorized third party (block 1511).

It will be understood that some embodiments may provide an authentication relationship between a collection of identifier records and an authorized user or authorized third party. This results in future access to the separate storage facility becoming potentially more global. For example, such an authorized user or authorized third party who moves to any appropriate convenient device can generate or acquire the pertinent identifier record(s) necessary for activating a management task (e.g., retrieval, reorganization, status change, distribution authorization, etc.). In other words, such an appropriate convenient device temporarily becomes an "approved device" so long as its user qualifies as an "authorized user" or authorized third party.

Additional possible aspects illustrated in FIG. 13 include activating the future access in response to a recognizable query from a transmitting device or other approved device (block 1512). A further possible aspect includes activating the future access in response to a recognizable query from an authorized user associated with a transmitting device or from an authorized user associated with an approved device (block 1513). Yet another possible feature may include activating the future access in response to a recognizable query from an authorized third party (block 1514).

Figure 14:
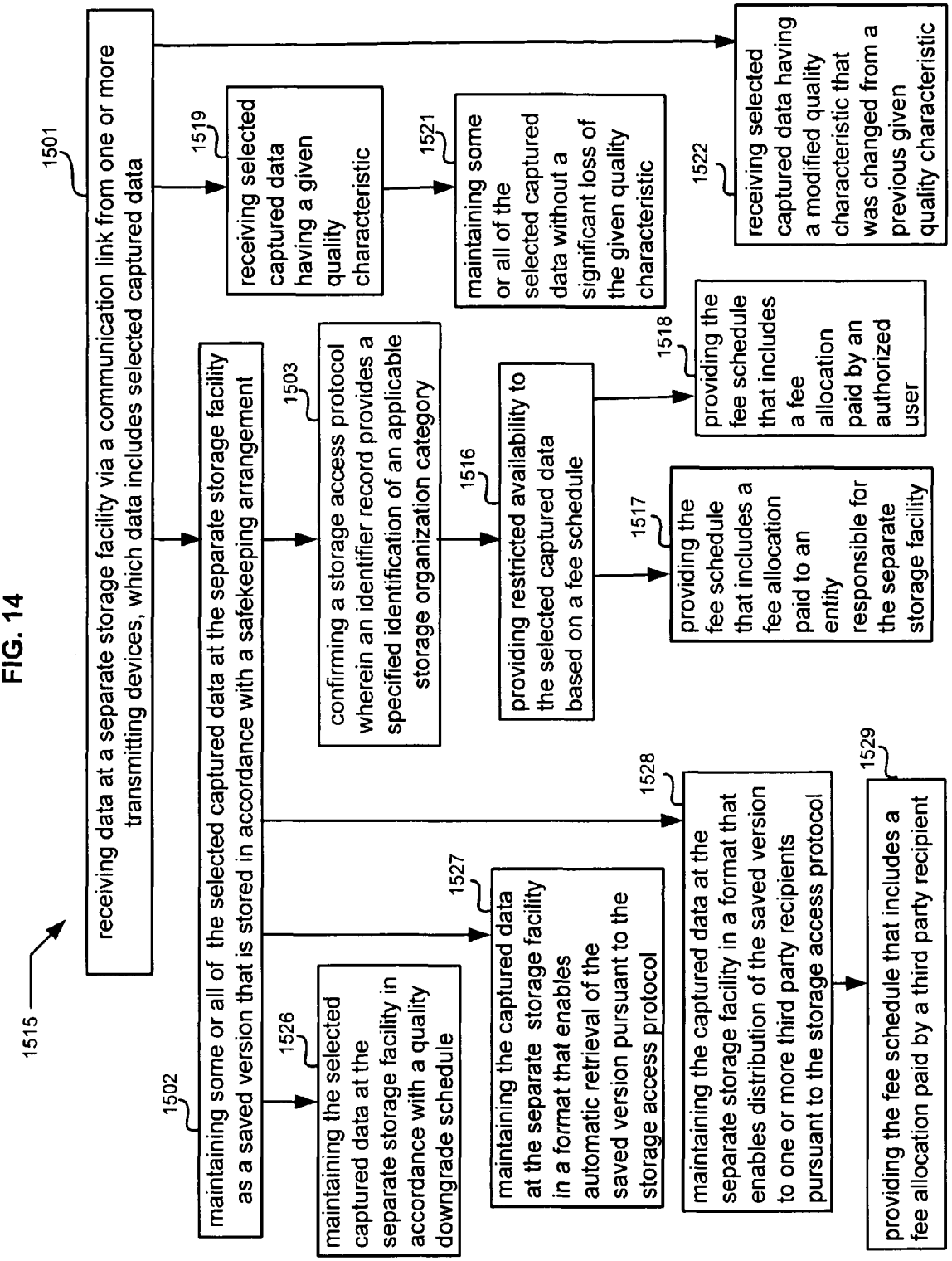

The exemplary embodiments 1515 shown in FIG. 14 show previously disclosed process components 1501, 1502, 1503 along with various possible fee arrangements. For example, some implementations may include providing restricted availability to the selected captured data based on a fee schedule (block 1516), and in some instances providing the fee schedule that includes a fee allocation paid to an entity responsible for the separate storage facility (block 1517). Another possible aspect may include providing the fee schedule that includes a fee allocation paid by an authorized user (block 1518).

Additional process components may include receiving selected captured data having a given quality characteristic (block 1519), maintaining some or all of the selected captured data without a significant loss of the given quality characteristic (block 1521), and receiving selected captured data having a modified quality characteristic that was changed from a previous given quality characteristic (block 1522).

Further illustrated exemplary features in FIG. 14 include maintaining the selected captured data at the separate storage facility in accordance with a quality downgrade schedule (block 1526), and maintaining the captured data at the separate storage facility in a format that enables automatic retrieval of the saved version pursuant to the storage access protocol (block 1527).

Other possible aspects may include maintaining the captured data at the separate storage facility in a format that enables distribution of the saved version to one or more third party recipients pursuant to the storage access protocol (block 1528), and providing restricted availability to the selected captured data based on a fee schedule that includes a fee allocation paid by a third party recipient (block 1529).

Figure 15:
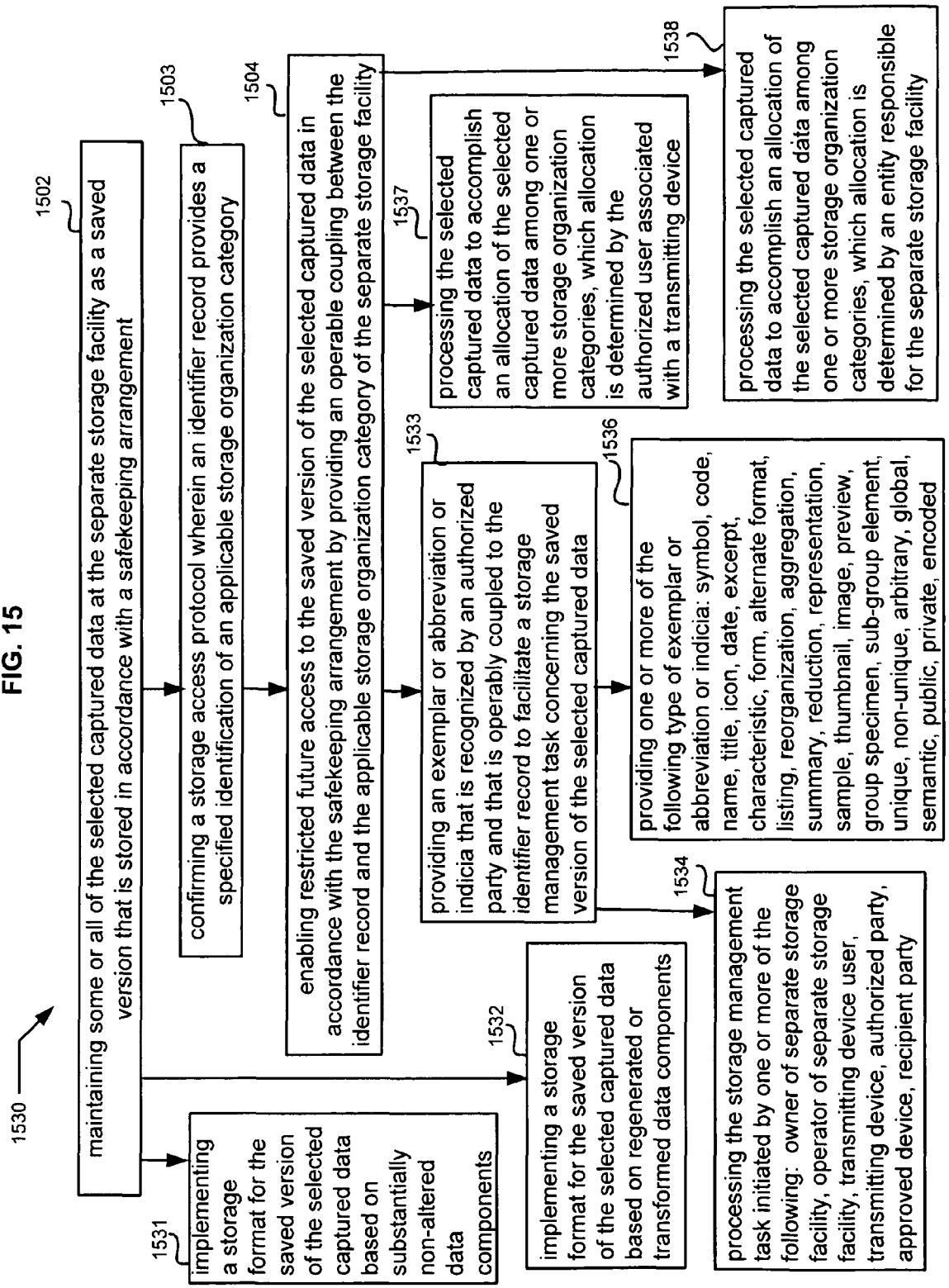

The detailed flow chart of FIG. 15 illustrates various exemplary embodiment features 1530 including previously described components 1502, 1503, 1504 along with various possible aspects relating to the saved version of the selected captured data. For example, some embodiments may include implementing a storage format for the saved version of the selected captured data based on substantially non-altered data components (block 1531). Other embodiments may include implementing a storage format for the saved version of the selected captured data based on regenerated or transformed data components (block 1532).

Additional process components may include providing an exemplar or abbreviation or indicia that is recognized by an authorized party and that is operably coupled to the identifier record to facilitate a storage management task concerning the saved version of the selected captured data (block 1533). A related aspect may include processing a storage management task initiated by one or more of the following: owner of separate storage facility, operator of separate storage facility, transmitting device user, transmitting device, authorized party, approved device, and recipient party (block 1534). Further related aspects may include providing one or more of the following type of exemplar or abbreviation or indicia: symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded (block 1536).

Other possible aspects illustrated in FIG. 15 include processing the selected captured data to accomplish an allocation of the selected captured data among one or more storage organization categories, which allocation is determined by the authorized user associated with a transmitting device (block 1537) or by an entity responsible for the separate storage facility (block 1538).

Figure 16:
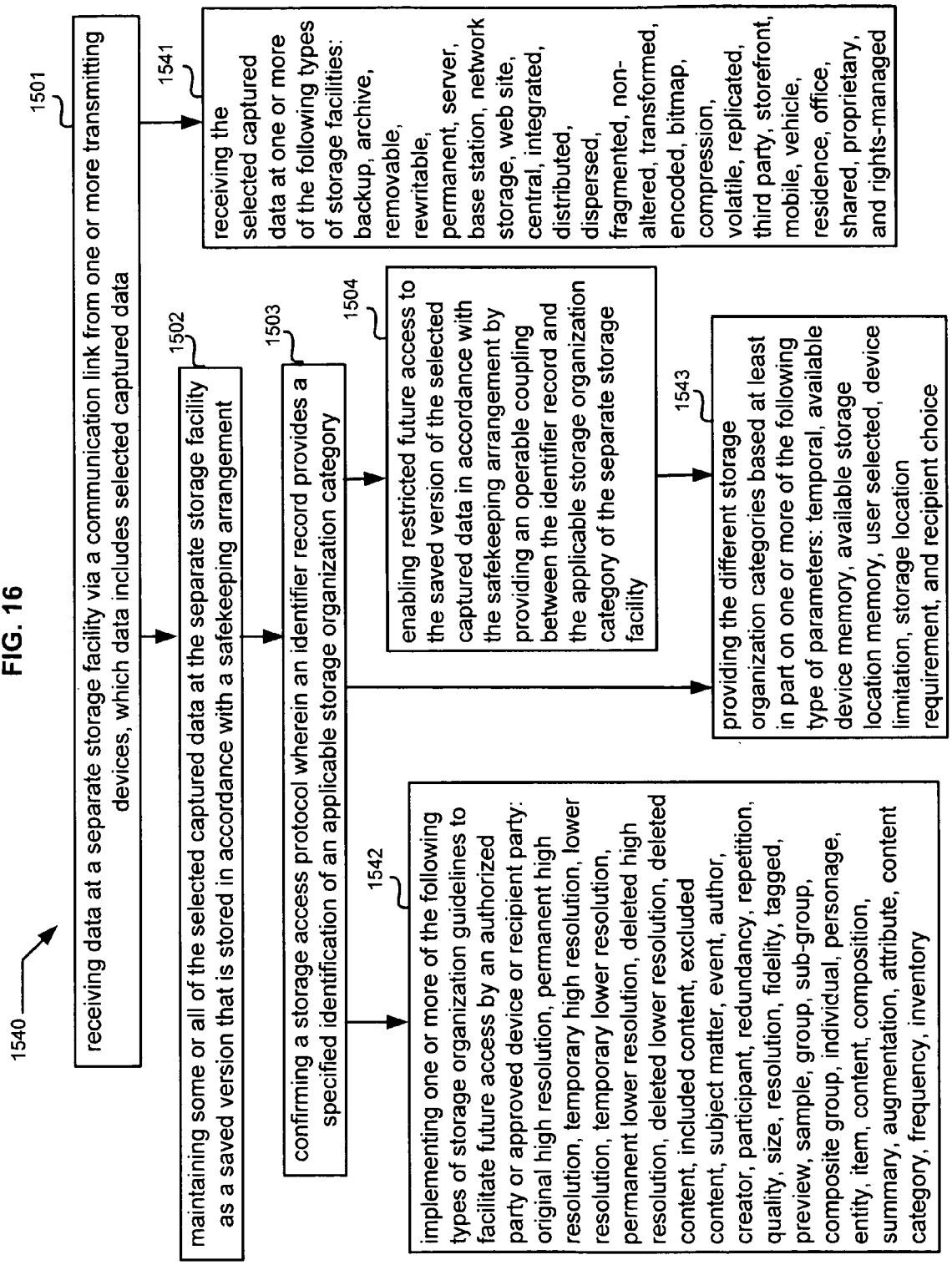

Referring to the exemplary embodiment features 1540 shown FIG. 16, previously described process features 1501, 1502, 1503, 1504 may in some instances also include receiving the selected captured data at one or more of the following types of storage facilities: backup, archive, removable, rewritable, permanent, server, base station, network storage, web site, central, integrated, distributed, dispersed, fragmented, non-altered, transformed, encoded, bitmap, compression, volatile, replicated, third party, storefront, mobile, vehicle, residence, office, shared, proprietary, and rights-managed (block 1541).

Additional possible aspects may include implementing one or more of the following types of storage organization guidelines to facilitate future access by an authorized party or approved device or recipient party: original high resolution, permanent high resolution, temporary high resolution, lower resolution, temporary lower resolution, permanent lower resolution, deleted high resolution, deleted lower resolution, deleted content, included content, excluded content, subject matter, event, author, creator, participant, redundancy, repetition, quality, size, resolution, fidelity, tagged, preview, sample, group, sub-group, composite group, individual, personage, entity, item, content, composition, summary, augmentation, attribute, content category, frequency, and inventory (block 1542).

Another exemplary feature may include providing the different storage organization categories based at least in part on one or more of the following type of parameters: temporal, available device memory, available storage location memory, user selected, device limitation, storage location requirement, and recipient choice (block 1543).

Figure 17:
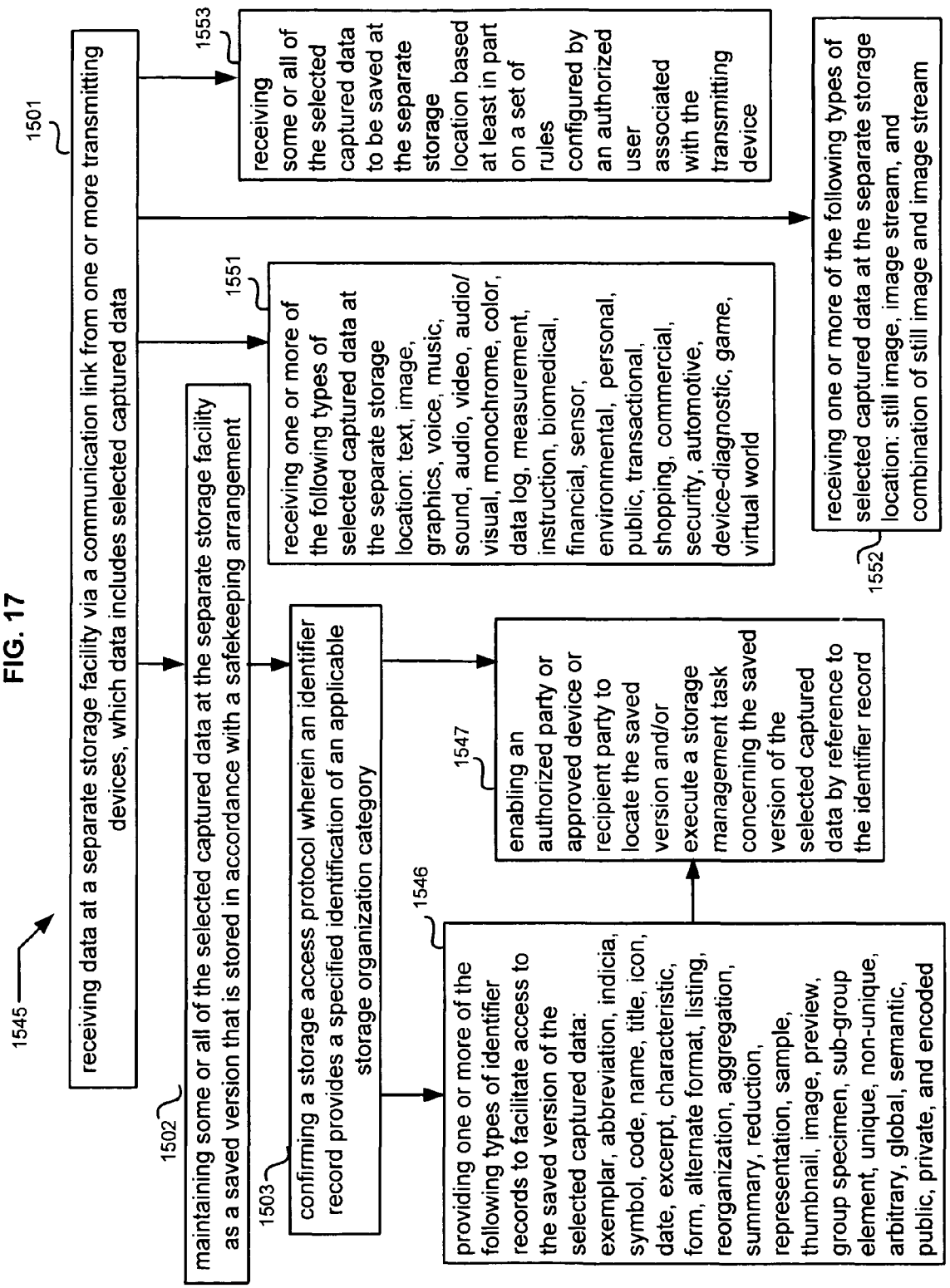

The exemplary detailed embodiments 1545 shown in FIG. 17 include previously described process features 1501, 1502, 1503 along with other possible aspects. For example, some implementations may provide one or more of the following types of identifier records to facilitate access to the saved version of the selected captured data: exemplar, abbreviation, indicia, symbol, code, name, title, icon, date, excerpt, characteristic, form, alternate format, listing, reorganization, aggregation, summary, reduction, representation, sample, thumbnail, image, preview, group specimen, sub-group element, unique, non-unique, arbitrary, global, semantic, public, private, and encoded (block 1546).

Another possible aspect relating to an identifier record may include enabling an authorized party or approved device or recipient party to locate the saved version and/or execute a storage management task concerning the saved version of the selected captured data by reference to the identifier record (block 1547). It will be understood that in some embodiments the identifier record is operably coupled with a recognizable element that an authorized user can "look at" or authorized device can detect (e.g., identify) in order to locate selected captured data and/or execute a storage management task. However in other embodiments such a recognizable element (e.g., representative sample, thumbnail, exemplar, topical pointer, etc.) may directly function as the identifier record that is operably coupled to the separate storage facility.

Further possible features may include receiving one or more of the following types of selected captured data at the separate storage location: text, image, graphics, voice, music, sound, audio, video, audio/visual, monochrome, color, data log, measurement, instruction, biomedical, financial, sensor, environmental, personal, public, transactional, shopping, commercial, security, automotive, device-diagnostic, game, and virtual world (block 1551).

FIG. 17 also illustrates other possible aspects including receiving one or more of the following types of selected captured data at the separate storage location: still image, image stream, and combination of still image and image stream (block 1552). Yet another possible aspect may include receiving some or all of the selected captured data to be saved at the separate storage location based at least in part on a set of rules configured by an authorized user associated with the transmitting device (block 1553).

Figure 18:
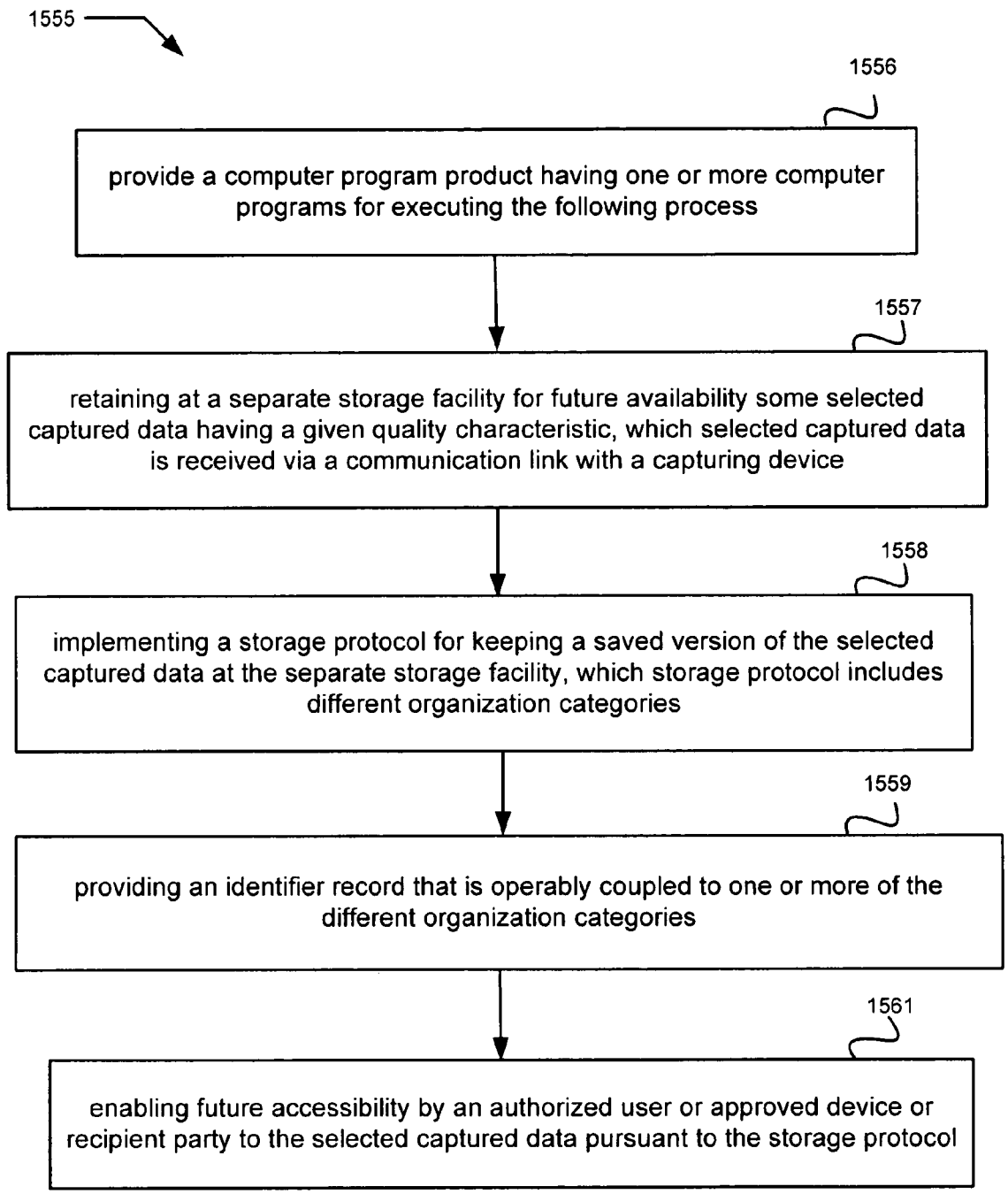
FIG. 18 illustrates another exemplary computer program product embodiment.

The exemplary embodiment 1555 shown in FIG. 18 illustrates a computer program product having one or more computer programs for executing a process (block 1556). Such a process may include retaining at a separate storage facility for future availability some selected captured data having a given quality characteristic, which selected captured data is received via a communication link with a capturing device (block 1557); and implementing a storage protocol for keeping a saved version of the selected captured data at the separate storage facility, which storage protocol includes different organization categories (block 1558).

Further possible programmed process components may include providing an identifier record that is operably coupled to one or more of the different organization categories (block 1559), and enabling future accessibility by an authorized user or approved device or recipient party to the selected captured data pursuant to the storage protocol (block 1561).

Figure 19:
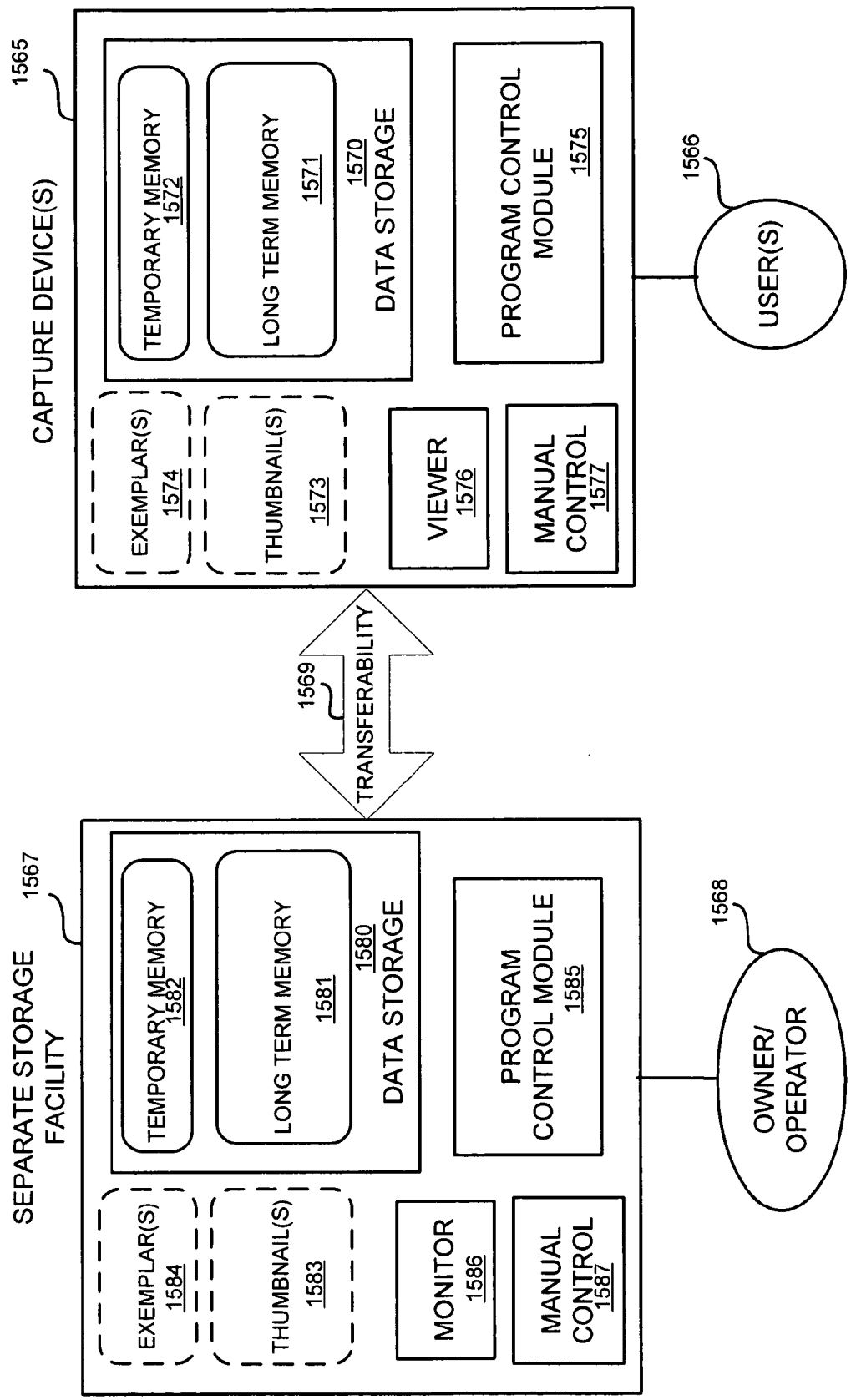
FIG. 19 is a schematic block diagram showing exemplary embodiments for a capture device and a separate data storage facility.

Referring to the schematic block diagram of FIG. 19, one or more exemplary capture devices 1565 may provide data storage files 1570 that store captured data in both long term memory 1571 and temporary memory 1572. An exemplary data management technique may include representative thumbnails 1573 and other exemplars 1574 that serve as an identifier link (e.g., directly and/or through an identifier record) to different categories of captured data. Visual access to the captured data as well as to the thumbnails 1573 and exemplars 1574 may be provided to a device user in various ways such as by viewer 1576.

As disclosed herein, a particular process for choosing selected captured data to be transferred to a separate storage facility 1567 may be accomplished by a program control module 1575 and/or by manual control 1577. Various types of transferability communication channels 1569 may be used that incorporate short and long distance communication media connections (e.g., Internet, wireless, cable, LAN, WAN, etc.) in order to provide periodic back and forth transfers between an approved external unit such as capture device 1565 and one or more separate storage facilities such as 1567.

In some exemplary implementations, various storage management functions may be performed at the separate storage facility 1567 under control of an owner/operator 1568 or in some instances under remote control by an approved device or authorized user 1566. Accordingly the illustrated separate storage facility embodiment 1567 includes data storage files 1580 with long term memory 1581 and temporary memory 1582 that store inventory data versions of the selected captured data received from a transmitting capture device 1565.

An exemplary data management technique at the separate storage facility 1567 may include representative thumbnails 1583 and other exemplars 1584 that serve as an identifier link (e.g., directly and/or through an identifier record) to different categories of stored inventory data versions (e.g., replicated, enhanced quality, downgraded quality, transformed, regenerated, etc.). Visual access to the inventory data versions as well as to thumbnails 1583 and exemplars 1584 may be provided in various ways such as by monitor 1586. Transferability management is shown to be subject to instructions from program control module 1585 as well as by manual control 1587.

It will be understood that a particular separate data storage facility may have numerous authorized users and designated devices providing selected captured data under different safekeeping arrangements and related fee schedules. These same authorized users and designated devices as well as other patrons may be subject to additional accessibility guidelines and related fee schedules. Accordingly the illustrated examples are not intended to be limiting, and it is understood that changes may be made to accommodate the needs and desires of all different types of users and patrons.

Figure 20:
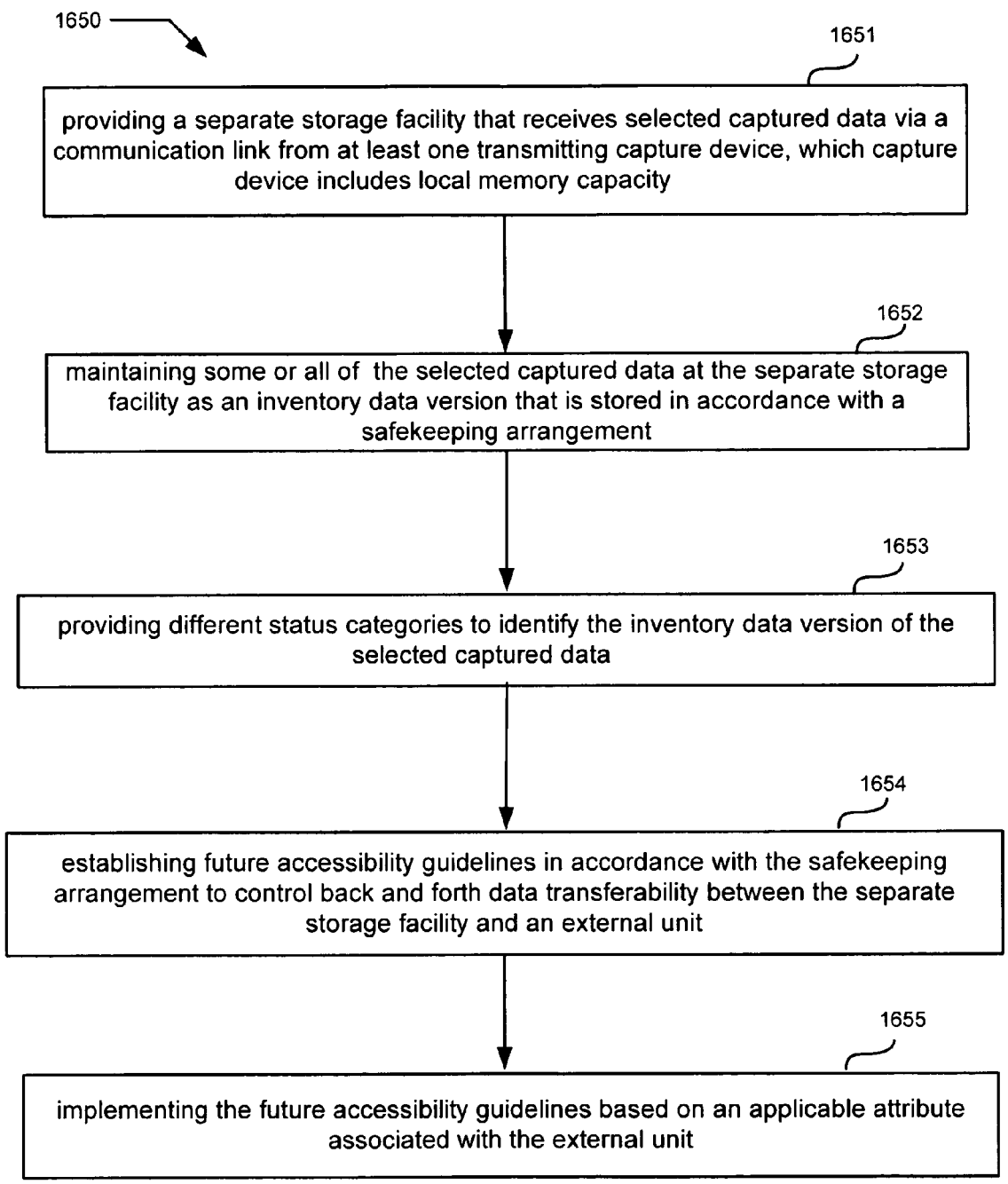
FIG. 20 is a high level flow chart showing a further exemplary process embodiment.

The high level flow chart of FIG. 20 illustrates an exemplary process embodiment 1650 for a data storage protocol technique that includes providing a separate storage facility that receives selected captured data via a communication link from at least one transmitting capture device, which capture device includes local memory capacity (block 1651); maintaining some or all of the selected captured data at the separate storage facility as an inventory data version that is stored in accordance with a safekeeping arrangement (block 1652); and providing different status categories to identify the inventory data version of the selected captured data (block 1653). Additional possible process features may include establishing future accessibility guidelines in accordance with the safekeeping arrangement to control back and forth data transferability between the separate storage facility and an external unit (block 1654), and implementing the future accessibility guidelines based on an applicable attribute associated with the external unit (block 1655).

Figure 21:
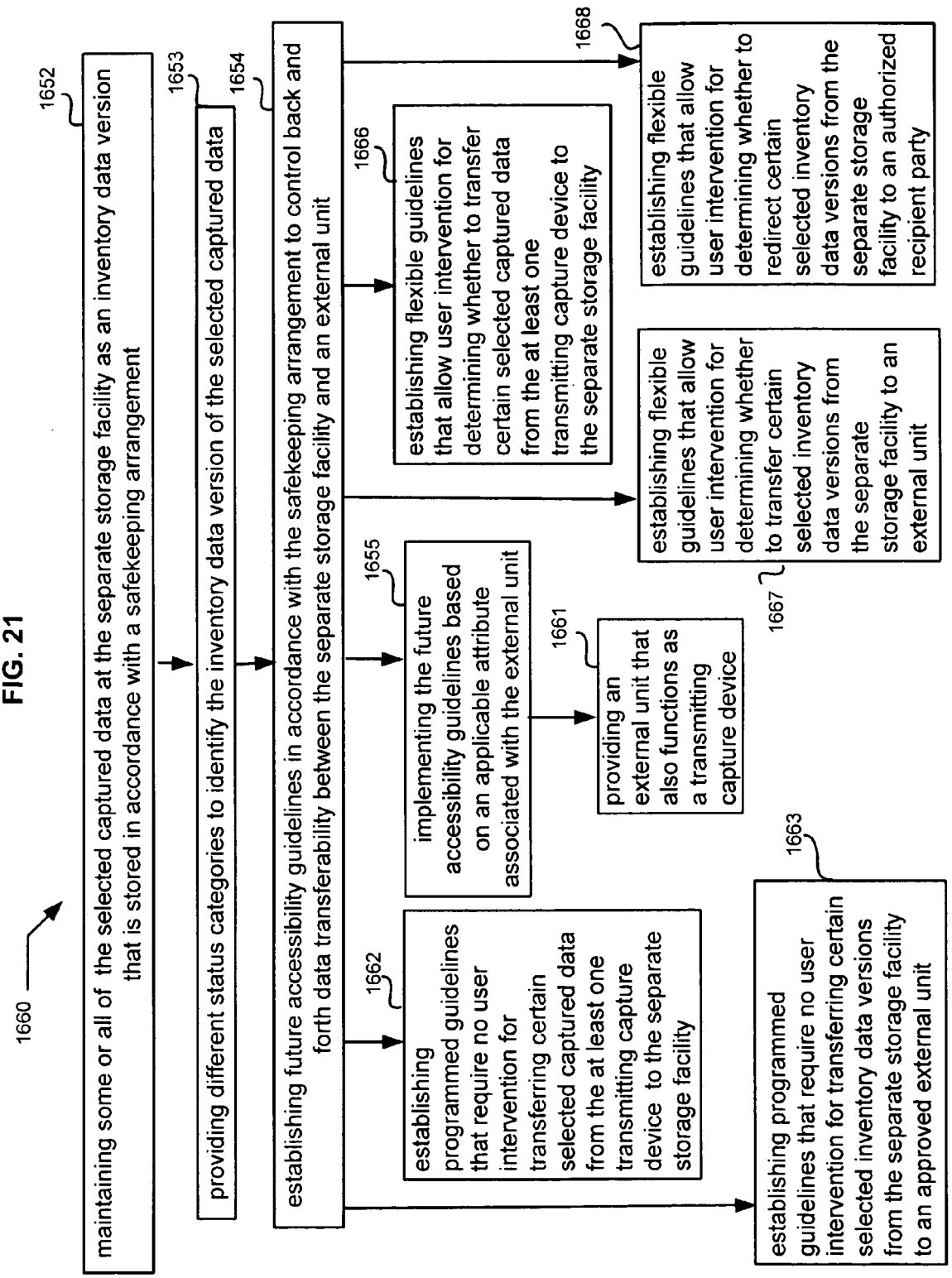
FIGS. 21-26 are detailed flow charts illustrating other exemplary embodiments.

Additional exemplary embodiment features 1660 are disclosed in FIG. 21 including previously described process components 1652, 1653, 1654, 1655 in combination with providing an external unit that also functions as a transmitting capture device (block 1661). Other possible aspect may include establishing programmed guidelines that require no user intervention for transferring certain selected captured data from the at least one transmitting capture device to the separate storage facility (block 1662), and establishing programmed guidelines that require no user intervention for transferring certain selected inventory data versions from the separate storage facility to an approved external unit (block 1663).

Further possible implementations may include establishing flexible guidelines that allow user intervention for determining whether to transfer certain selected captured data from the at least one transmitting capture device to the separate storage facility (block 1666), establishing flexible guidelines that allow user intervention for determining whether to transfer certain selected inventory data versions from the separate storage facility to an external unit (block 1667), and establishing flexible guidelines that allow user intervention for determining whether to redirect certain selected inventory data versions from the separate storage facility to an authorized recipient party (block 1668).

Figure 22:
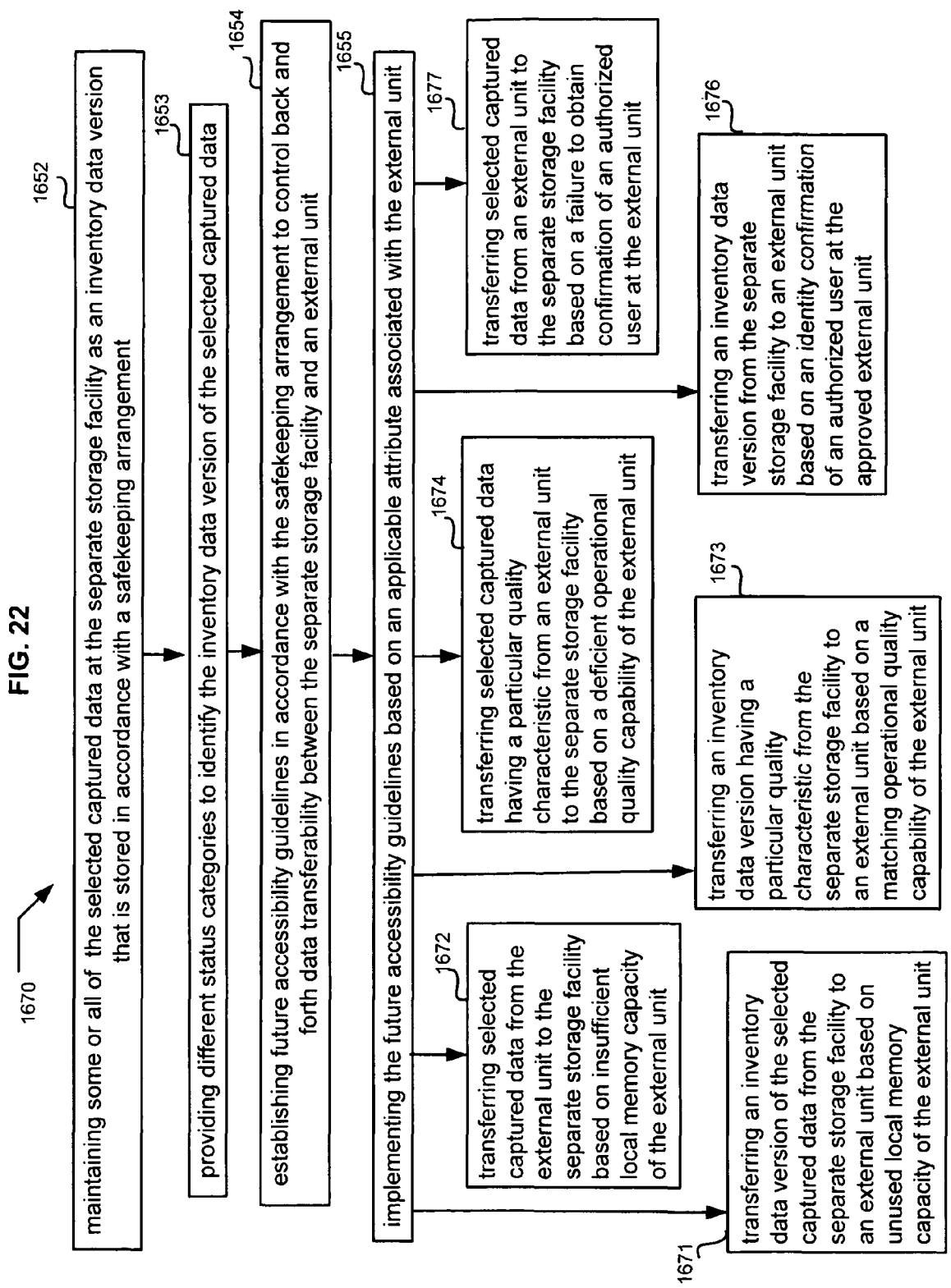

The more detailed flow chart of FIG. 22 discloses various exemplary embodiment components 1670 including previously described process features 1652, 1653, 1654, 1655 in combination with other possible features including transferring an inventory data version of the selected captured data from the separate storage facility to an external unit based on unused local memory capacity of the external unit (block 1671), transferring selected captured data from the external unit to the separate storage facility based on insufficient local memory capacity of the external unit (block 1672).

Other exemplary implementation features may include transferring an inventory data version having a particular quality characteristic from the separate storage facility to an external unit based on a matching operational quality capability of the external unit (block 1673), and transferring selected captured data having a particular quality characteristic from an external unit to the separate storage facility based on a deficient operational quality capability of the external unit (block 1674).

Additional aspects may include transferring an inventory data version from the separate storage facility to an external unit based on an identity confirmation of an authorized user at the approved external unit (block 1676), transferring selected captured data from an external unit to the separate storage facility based on a failure to obtain confirmation of an authorized user at the external unit (block 1677).

Figure 23:
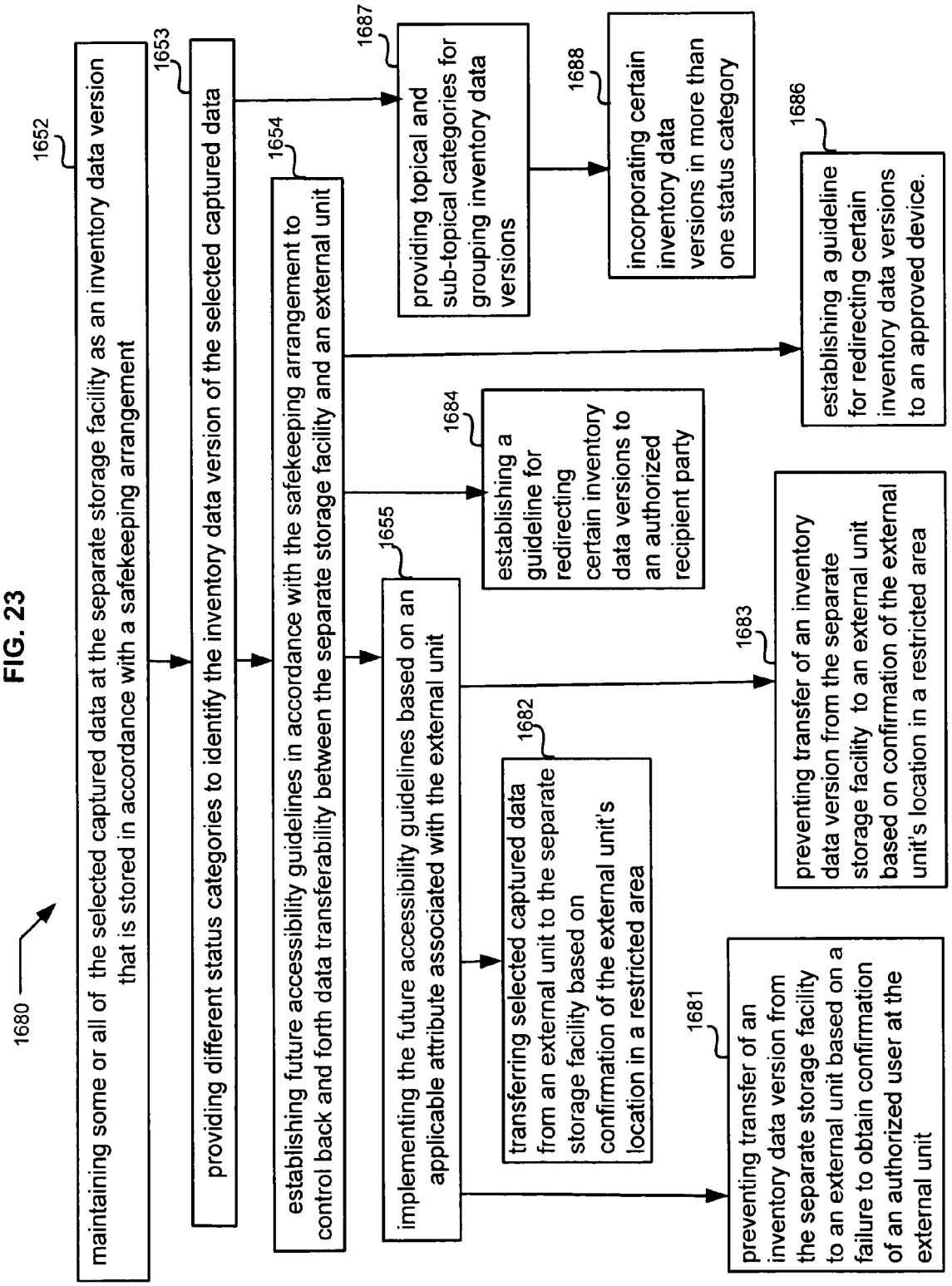

The illustrative features 1680 shown in FIG. 23 include previously discussed process components 1652, 1653, 1654, 1655 along with other possible data transfer options. For example, some implementations may include preventing transfer of an inventory data version from the separate storage facility to an external unit based on a failure to obtain confirmation of an authorized user at the external unit (block 1681), transferring selected captured data from an external unit to the separate storage facility based on confirmation of the external unit's location in a restricted area (block 1682).

Further exemplary features may include preventing transfer of an inventory data version from the separate storage facility to an external unit based on confirmation of the external unit's location in a restricted area (block 1683), establishing a guideline for redirecting certain inventory data versions to an authorized recipient party (block 1684), and establishing a guideline for redirecting certain inventory data versions to an approved device (block 1686).

FIG. 23 also discloses other possible aspects including providing topical and sub-topical categories for grouping inventory data versions (block 1687), and incorporating certain inventory data versions in more than one status category (block 1688).

Figure 24:
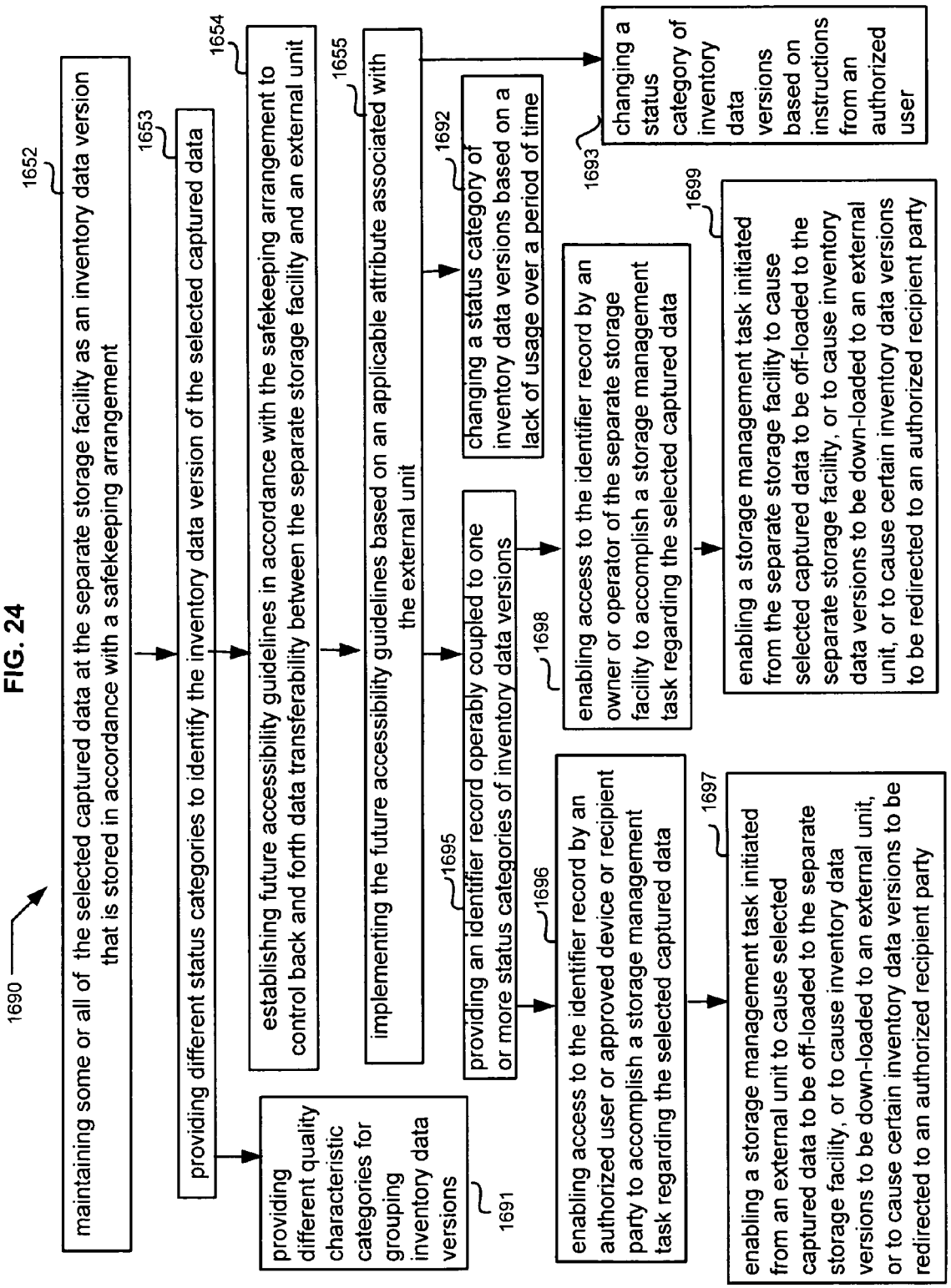

Referring to the detailed exemplary embodiments 1690 shown in FIG. 24, the previous discussed process components 1652, 1653, 1654, 1655 may further include providing different quality characteristic categories for grouping inventory data versions (block 1691). Other possible process components may include changing a status category of inventory data versions based on a lack of usage over a period of time (block 1692), and changing a status category of inventory data versions based on instructions from an authorized user (block 1693).

Another possible aspect may include providing an identifier record operably coupled to one or more status categories of inventory data versions (block 1695). A further related aspect may include enabling access to the identifier record by an authorized user or approved device or recipient party to accomplish a storage management task regarding the selected captured data (block 1696). Other possible implementation features may include enabling a storage management task initiated from an external unit to cause selected captured data to be off-loaded to the separate storage facility, or to cause inventory data versions to be down-loaded to an external unit, or to cause certain inventory data versions to be redirected to an authorized recipient party (block 1697).

FIG. 24 also shows an exemplary aspect that includes enabling access to the identifier record by an owner or operator of the separate storage facility to accomplish a storage management task regarding the selected captured data (block 1698). Further possible aspects may include enabling a storage management task initiated from the separate storage facility to cause selected captured data to be off-loaded to the separate storage facility, or to cause inventory data versions to be down-loaded to an external unit, or to cause certain inventory data versions to be redirected to an authorized recipient party (block 1699).

Figure 25:
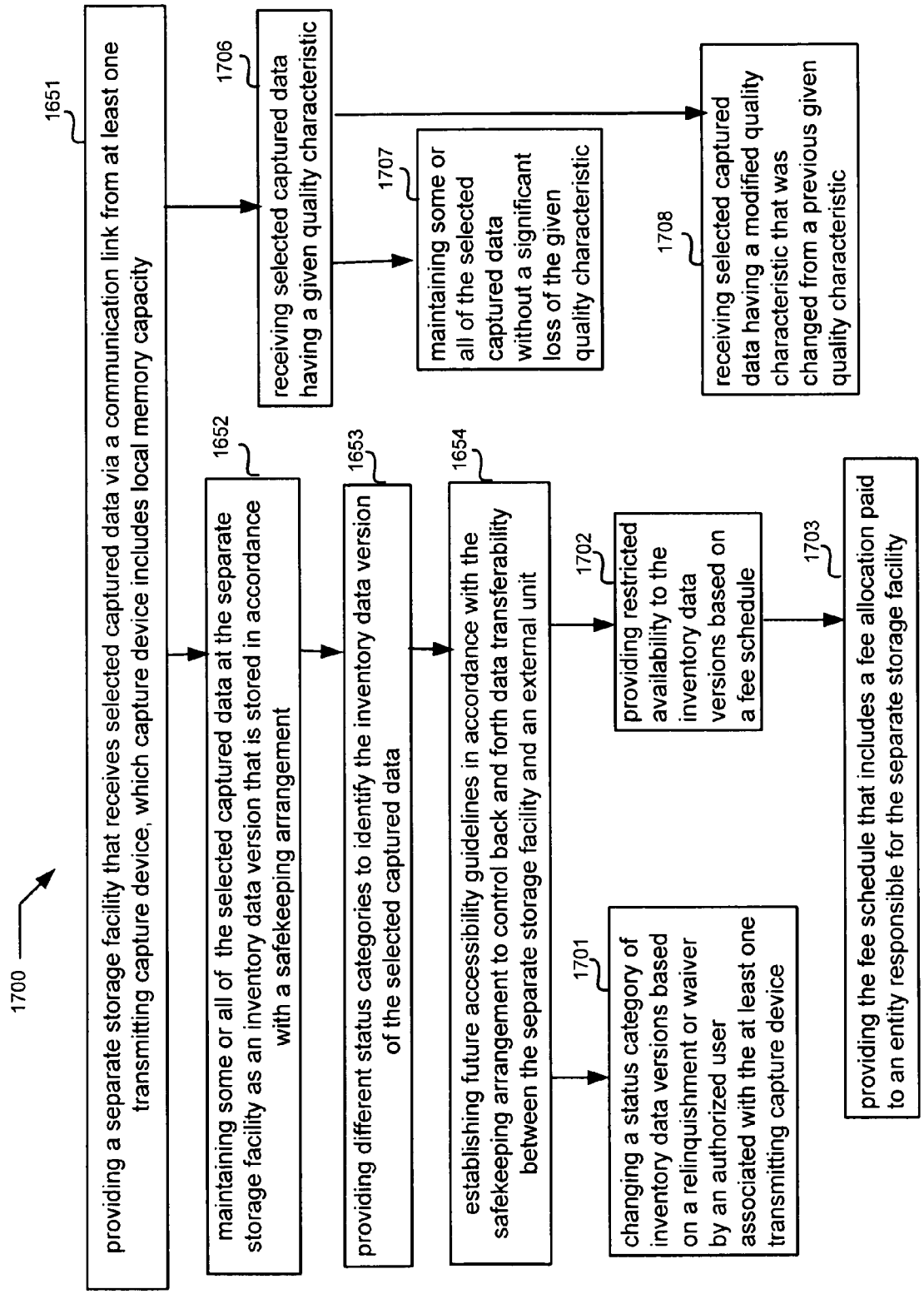

The detailed exemplary embodiment features 1700 shown in FIG. 25 include previously discussed process components 1651, 1652, 1653, 1654 along with another aspect that may include changing a status category of inventory data versions based on a relinquishment or waiver by an authorized user associated with the at least one transmitting capture device (block 1701). Further possible implementation features may include providing restricted availability to the inventory data versions based on a fee schedule (block 1702), and providing the fee schedule that includes a fee allocation paid to an entity responsible for the separate storage facility (block 1703).

FIG. 25 also shows additional exemplary aspects including receiving selected captured data having a given quality characteristic (block 1706), maintaining some or all of the selected captured data without a significant loss of the given quality characteristic (block 1707), and receiving selected captured data having a modified quality characteristic that was changed from a previous given quality characteristic (block 1708).

Figure 26:
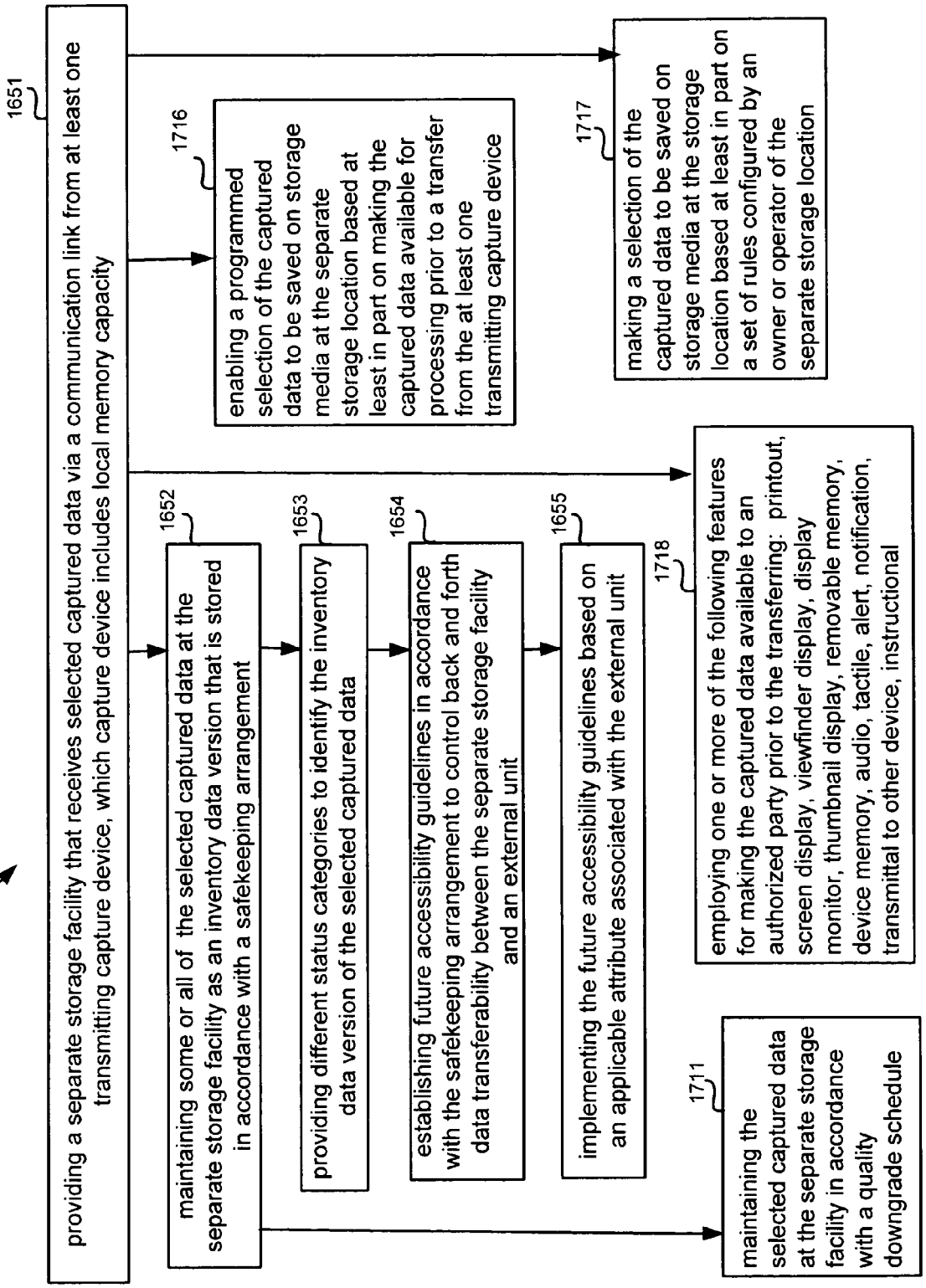

The various exemplary embodiment features 1710 of FIG. 26 may include previously discussed process components 1651, 1652, 1653, 1654, 1655 as well as maintaining the selected captured data at the separate storage facility in accordance with a quality downgrade schedule (block 1711). A further possible aspect may include enabling a programmed selection of the captured data to be saved on storage media at the separate storage location based at least in part on making the captured data available for processing prior to a transfer from the at least one transmitting capture device (block 1716).

Further possible implementation features may include making a selection of the captured data to be saved on storage media at the storage location based at least in part on a set of rules configured by an owner or operator of the separate storage location (block 1717). Other possible features may include employing one or more of the following features for making the captured data available to an authorized party prior to the transferring: printout, screen display, viewfinder display, display monitor, thumbnail display, removable memory, device memory, audio, tactile, alert, notification, transmittal to other device, and instructional (block 1718).

Figure 27:
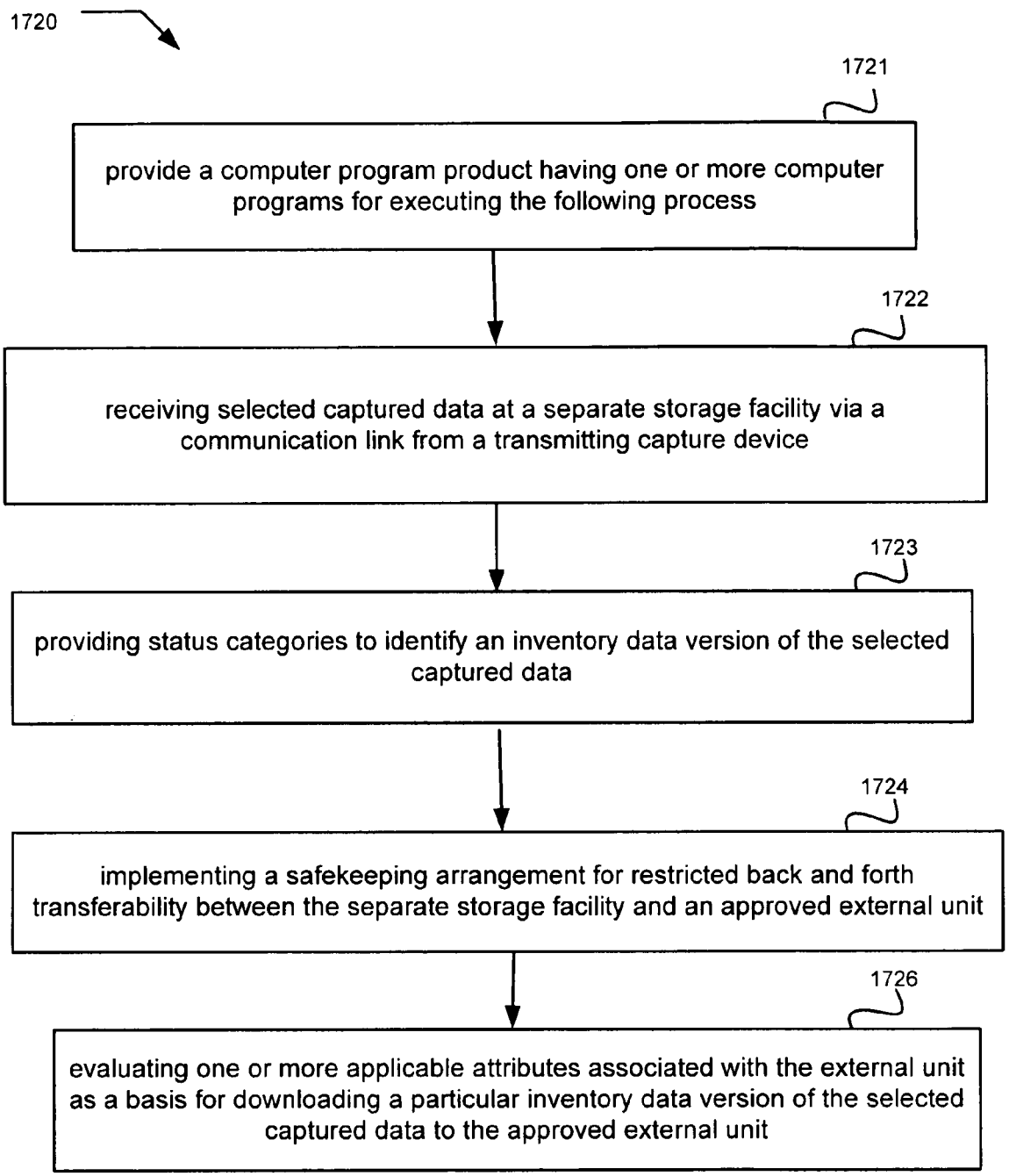
FIG. 27 illustrates a further exemplary computer program product embodiment.

Referring to FIG. 27, an exemplary computer program product embodiment 1720 provides a computer program product having one or more computer programs for executing a process (block 1721). An exemplary process may include receiving selected captured data at a separate storage facility via a communication link from a transmitting capture device (block 1722), providing status categories to identify an inventory data version of the selected captured data (block 1723), implementing a safekeeping arrangement for restricted back and forth transferability between the separate storage facility and an approved external unit (block 1724), and evaluating one or more applicable attributes associated with the external unit as a basis for downloading a particular inventory data version of the selected captured data to the approved external unit (block 1726).

Examples of back and forth transferability may involve replacing a thumbnail representation on a capture/access device with high resolution quality photographs retrieved from the separate storage facility. Another example may involve replacing an entire collection of recent photographs held in local memory of a user's capture/access device that are organized by a "date categorization" scheme with topical thumbnails organized by topics that are pertinent to a currently active project. As part of the replacement, the remaining non-topical recent photos may be transferred to the remote storage location for safekeeping and future accessibility.

Another possible example may involve prefetching from the separate storage facility previously archived high quality resolution images in anticipation of an upcoming event. A further example may involve using an external unit such as a mobile telephone to select certain individual or collective archived image data in remote archived storage, and initiate a redirection (e.g., distribution) of an enhanced transformed high quality resolution version that is matched to a high quality capability external unit of an approved recipient.

Figure 28:
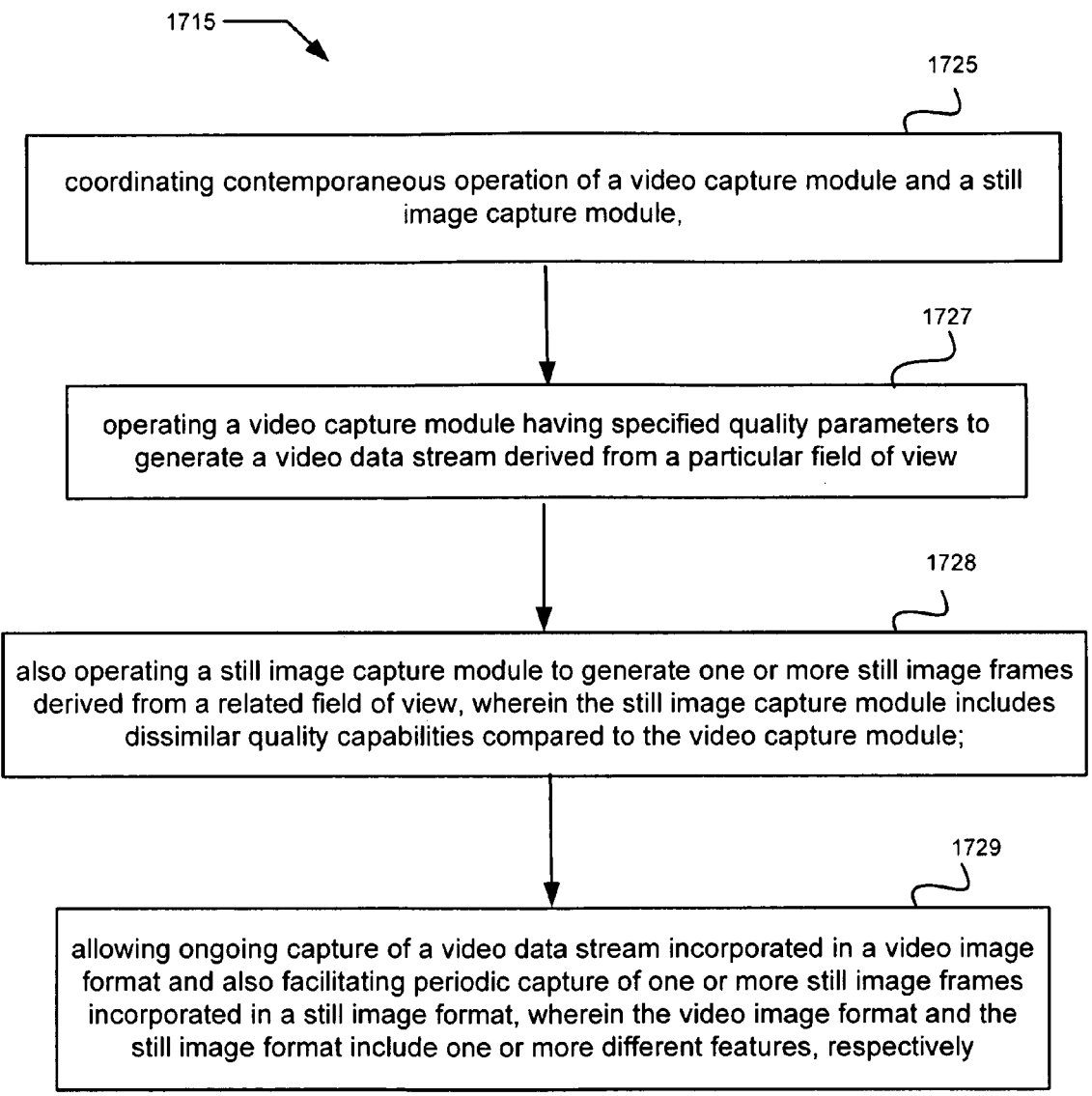
FIGS. 28-29 are high level flow charts showing additional exemplary process embodiments.

Referring to the exemplary dual mode capture embodiment 1715 of FIG. 28, process components may include coordinating contemporaneous operation of a video capture module and a still image capture module (block 1725); operating a video capture module having specified quality parameters to generate a video data stream derived from a particular field of view (block 1727); and also operating a still image capture module to generate one or more still image frames derived from a related field of view, wherein the still image capture module includes dissimilar quality capabilities compared to the video capture module (block 1728). A further related process component may include allowing ongoing capture of a video data stream incorporated in a video image format and also facilitating periodic capture of one or more still image frames incorporated in a still image format, wherein the video image format and the still image format include one or more different features, respectively (block 1729).

Figure 29:
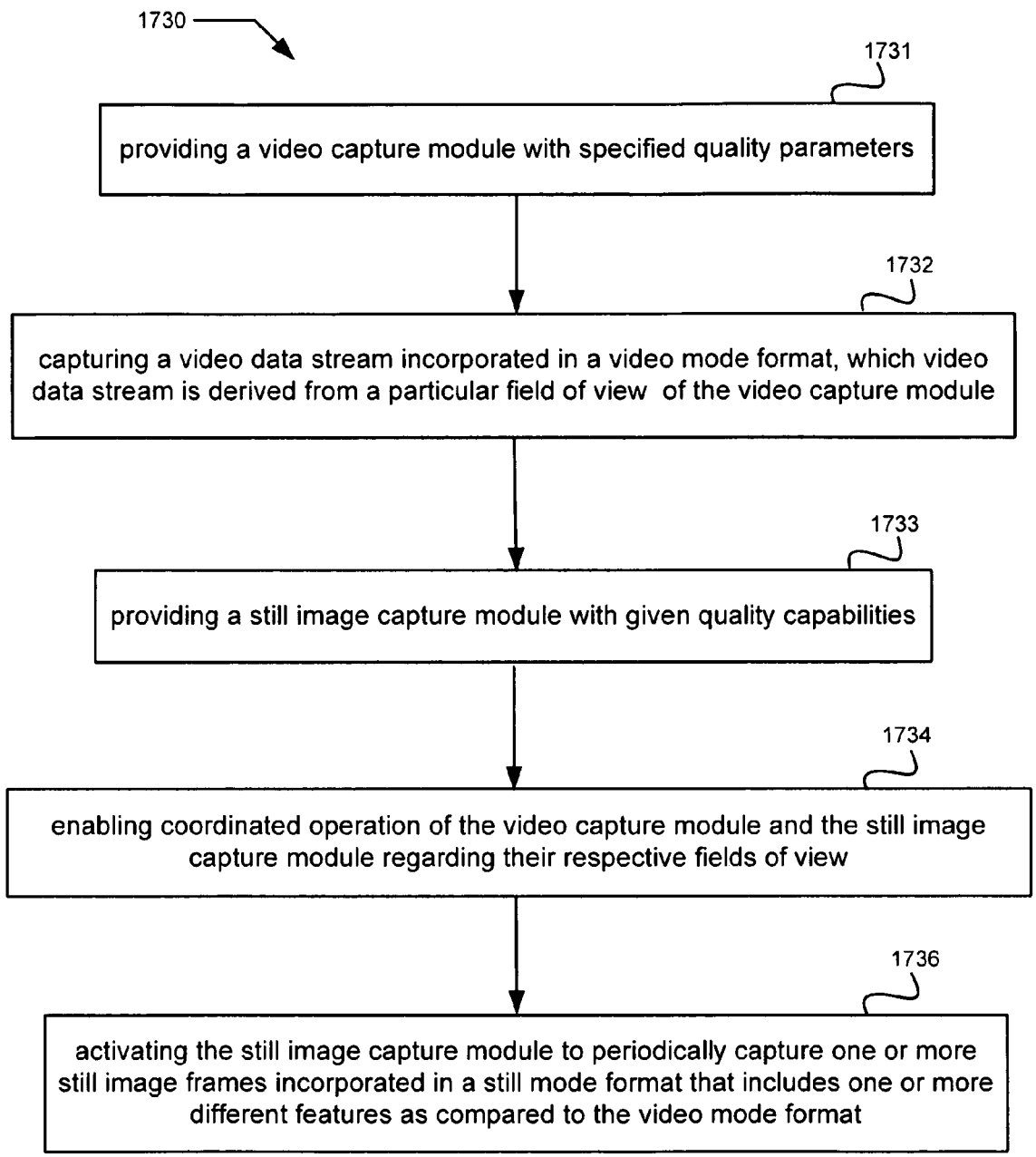

FIG. 29 illustrates another exemplary image capture technique embodiment 1730 that may include providing a video capture module with specified quality parameters (block 1731), capturing a video data stream incorporated in a video mode format, which video data stream is derived from a particular field of view of the video capture module (block 1732), providing a still image capture module with given quality capabilities (block 1733), and enabling coordinated operation of the video capture module and the still image capture module regarding their respective fields of view (block 1734). A further possible aspect may include activating the still image capture module to periodically capture one or more still image frames incorporated in a still mode format that includes one or more different features as compared to the video mode format (block 1736).

Figure 30:
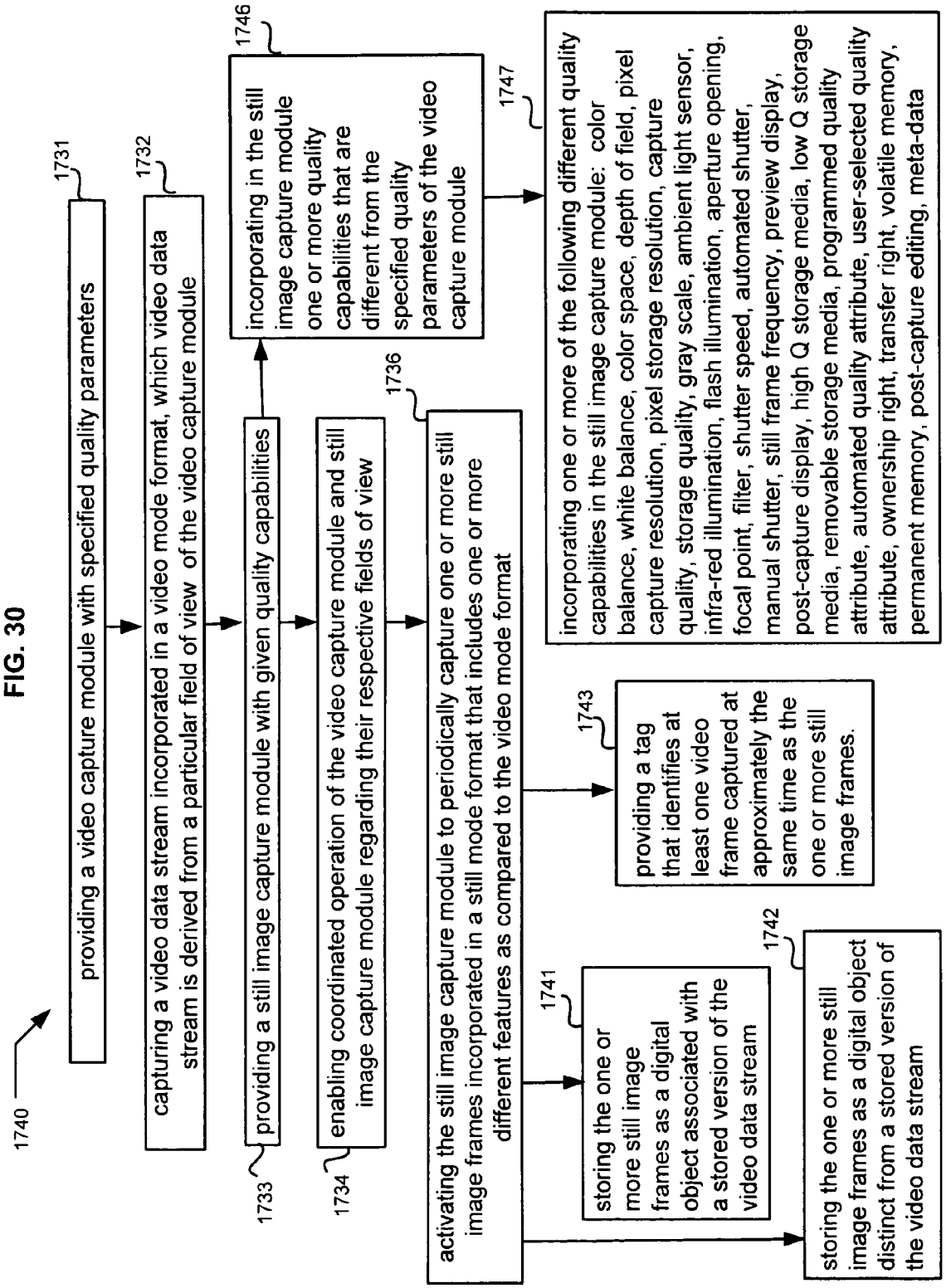
FIGS. 30-36 are detailed flow charts illustrating further exemplary embodiments.

Referring to the exemplary embodiments 1740 illustrated in FIG. 30, a possible technique may include previously described process features 1731, 1732, 1733, 1734, 1736 along with providing a tag that identifies at least one video frame captured at approximately the same time as the one or more still image frames (block 1743). Other possible implementation features may include storing the one or more still image frames as a digital object associated with a stored version of the video data stream (block 1741) or a digital object distinct from a stored version of the video data stream (block 1741).

Further exemplary aspects may include incorporating in the still image capture module one or more quality capabilities that are different from the specified quality parameters of the video capture module (block 1746). Other related aspects may include incorporating one or more of the following different quality capabilities in the still image capture module: color balance, white balance, color space, depth of field, pixel capture resolution, pixel storage resolution, capture quality, storage quality, gray scale, ambient light sensor, infra-red illumination, flash illumination, aperture opening, focal point, filter, shutter speed, automated shutter, manual shutter, still frame frequency, preview display, post-capture display, high quality storage media, low quality storage media, removable storage media, programmed quality attribute, automated quality attribute, user-selected quality attribute, ownership right, transfer right, volatile memory, permanent memory, post-capture editing, and meta-data (block 1747).

Figure 31:
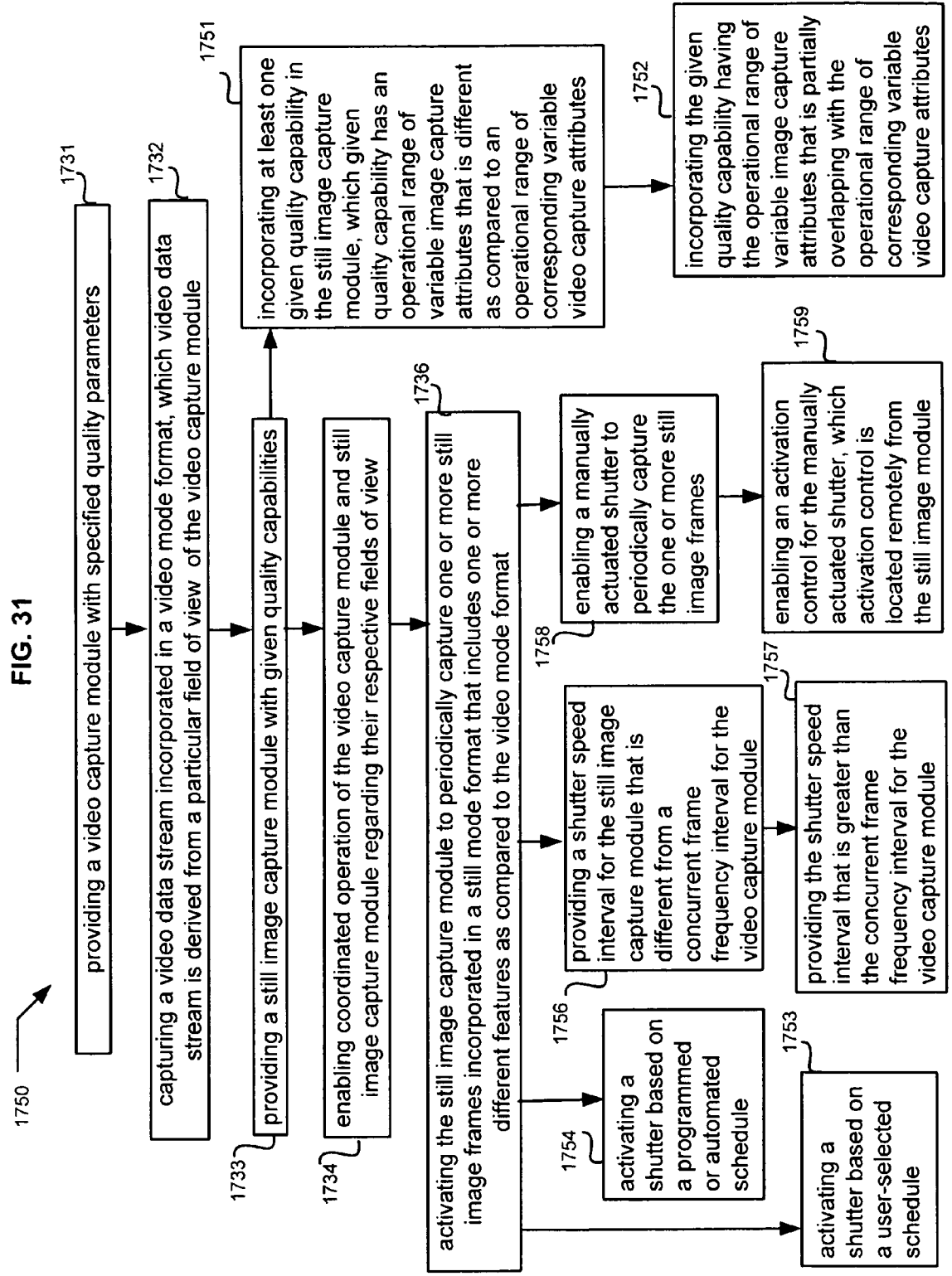

The various exemplary embodiments 1750 of FIG. 31 may include previously described features 1731, 1732, 1733, 1734, 1736 along with aspects related to quality capabilities of the still image capture module. For example some implementations may include incorporating at least one given still image quality capability having an operational range of variable image capture attributes that is different as compared to an operational range of corresponding variable video capture attributes (block 1751). Other implementations may include incorporating the given still image quality capability having the operational range of variable image capture attributes that is partially overlapping with the operational range of corresponding variable video capture attributes (block 1752).

Additional possible implementation features may include activating a shutter based on a user-selected schedule (block 1753), and activating a shutter based on a programmed or automated schedule (block 1754). Other possible features may include providing a shutter speed interval for the still image capture module that is different from a concurrent frame frequency interval for the video capture module (block 1756), and providing the shutter speed interval that is greater than the concurrent frame frequency interval for the video capture module (block 1757).

As shown in FIG. 31, other related aspects may include enabling a manually actuated shutter to periodically capture the one or more still image frames (block 1758); and enabling an activation control for the manually actuated shutter, which activation control is located remotely from the still image module (block 1759).

Figure 32:
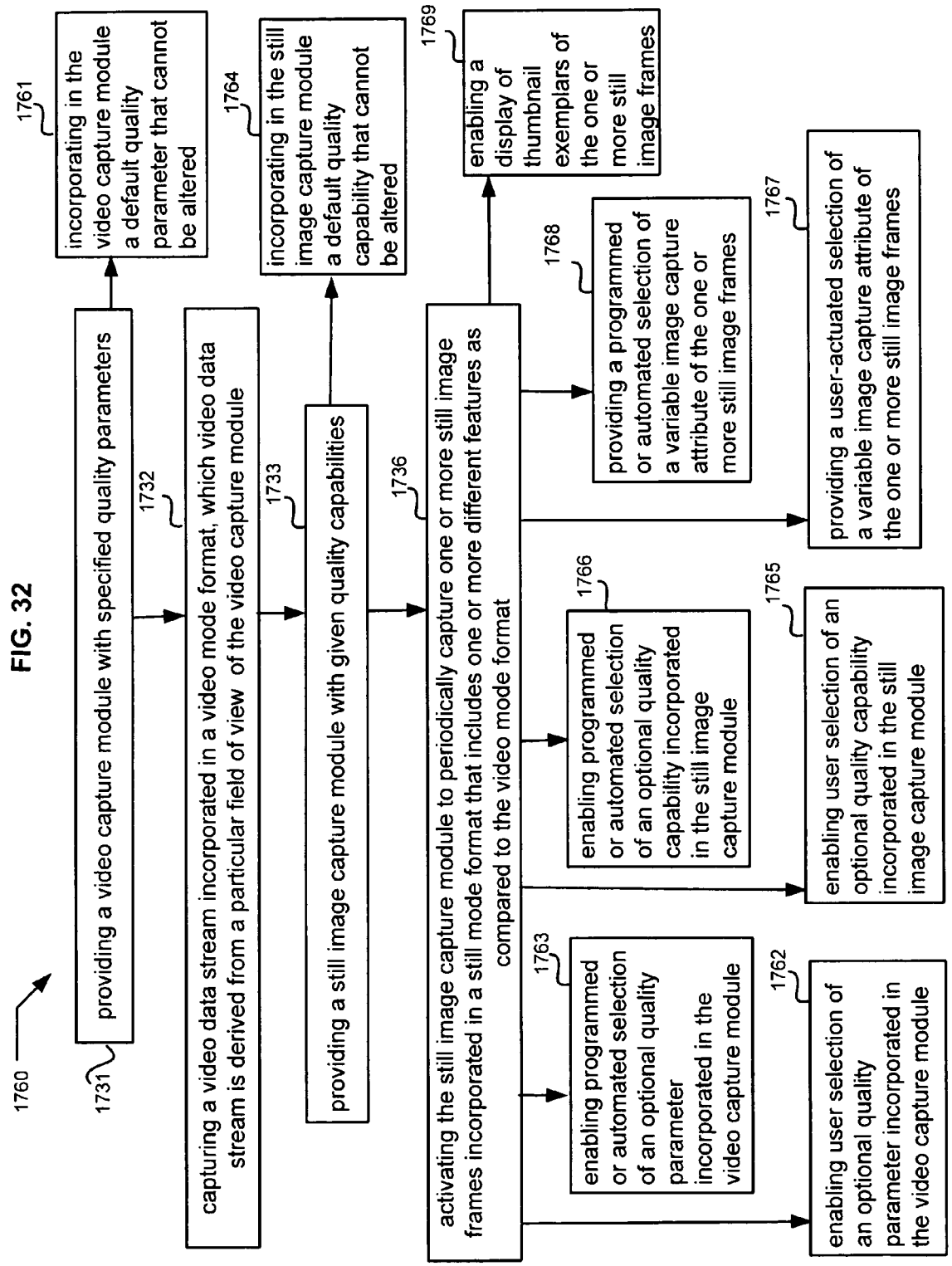

The various exemplary embodiments 1760 illustrated in FIG. 32 include previously described process components 1731, 1732, 1733, 1736 along with possible aspect of incorporating in the video capture module a default quality parameter that cannot be altered (block 1761), and incorporating in the image capture module a default quality capability that cannot be altered (block 1764).

Further exemplary aspects may include enabling user selection of an optional quality parameter incorporated in the video capture module (block 1762), and enabling programmed or automated selection of an optional quality parameter incorporated in the video capture module (block 1763). Additional process features may include enabling user selection of an optional quality capability incorporated in the still image capture module (block 1765), and enabling programmed or automated selection of an optional quality capability incorporated in the still image capture module (block 1766).

Other possible implementation features shown in FIG. 32 include providing a user-actuated selection of a variable image capture attribute of the one or more still image frames (block 1767), and providing a programmed or automated selection of a variable image capture attribute of the one or more still image frames (block 1768). An additional possible feature may include enabling a display of thumbnail exemplars of the one or more still image frames (block 1769).

Figure 33:
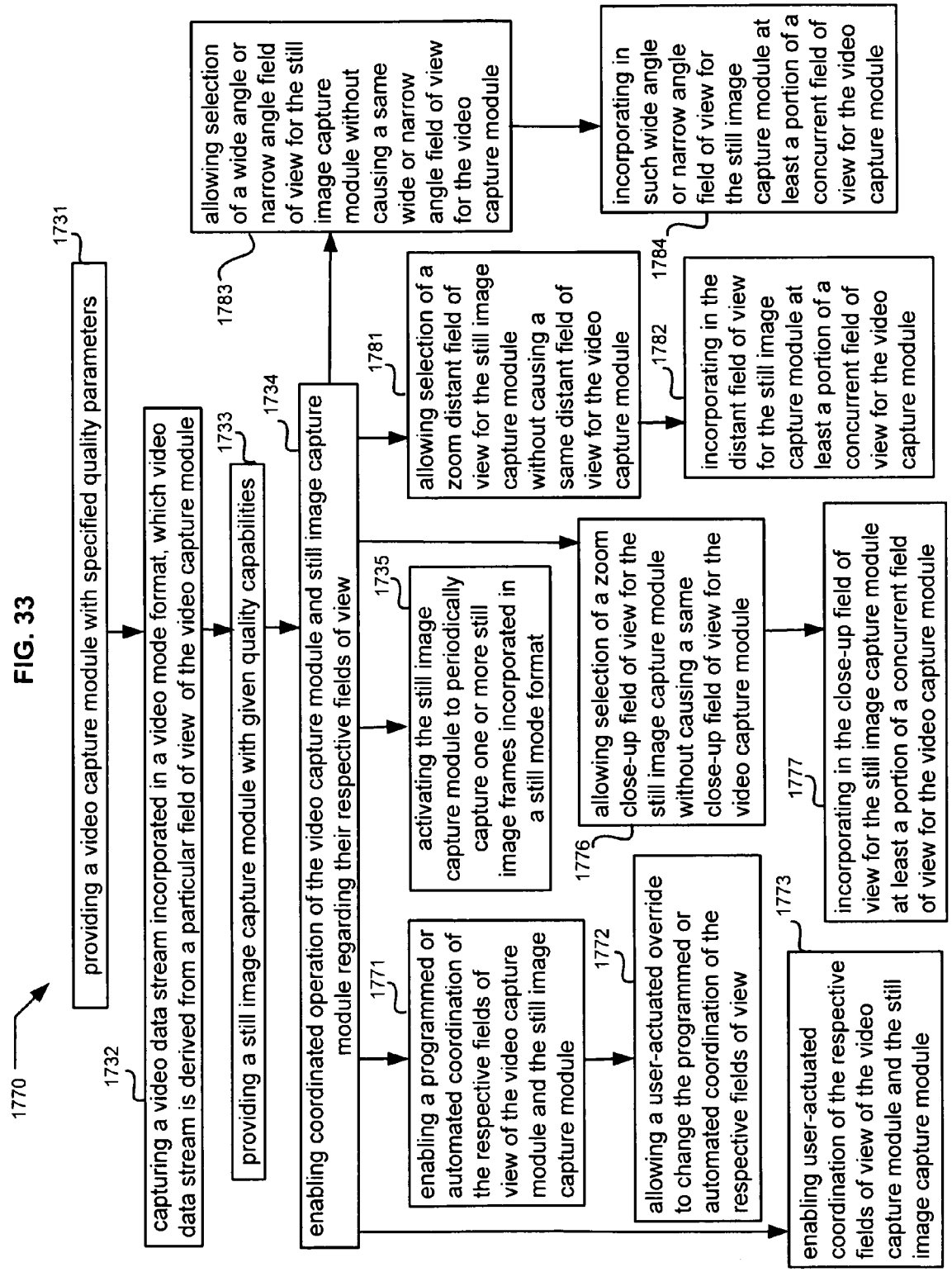

The exemplary embodiments 1770 shown in FIG. 33 include previously described process features 1731, 1732, 1733, 1734 along with a possibility of activating the still image capture module to periodically capture one or more still image frames incorporated in a still mode format (block 1735).

Other possible process features may include enabling a programmed or automated coordination of the respective fields of view of the video capture module and the still image capture module (block 1771), allowing a user-actuated override to change the programmed or automated coordination of the respective fields of view (block 1772), and enabling user-actuated coordination of the respective fields of view of the video capture module and the still image capture module (block 1773).

Further exemplary implementation features may include allowing selection of a zoom close-up field of view for the still image capture module without causing a same close-up field of view for the video capture module (block 1776), and incorporating in the close-up field of view for the still image capture module at least a portion of a concurrent field of view for the video capture module (block 1777).

Other possible aspects illustrated in FIG. 33 include allowing selection of a zoom distant field of view for the still image capture module without causing a same distant field of view for the video capture module (block 1781), and incorporating in the distant field of view for the still image capture module at least a portion of a concurrent field of view for the video capture module (block 1782).

Additional possible aspects may include allowing selection of a wide angle or narrow angle field of view for the still image capture module without causing a same wide angle or narrow angle field of view for the video capture module (block 1783), and incorporating in such field of view for the still image capture module at least a portion of a concurrent field of view for the video capture module (block 1784).

Figure 34:
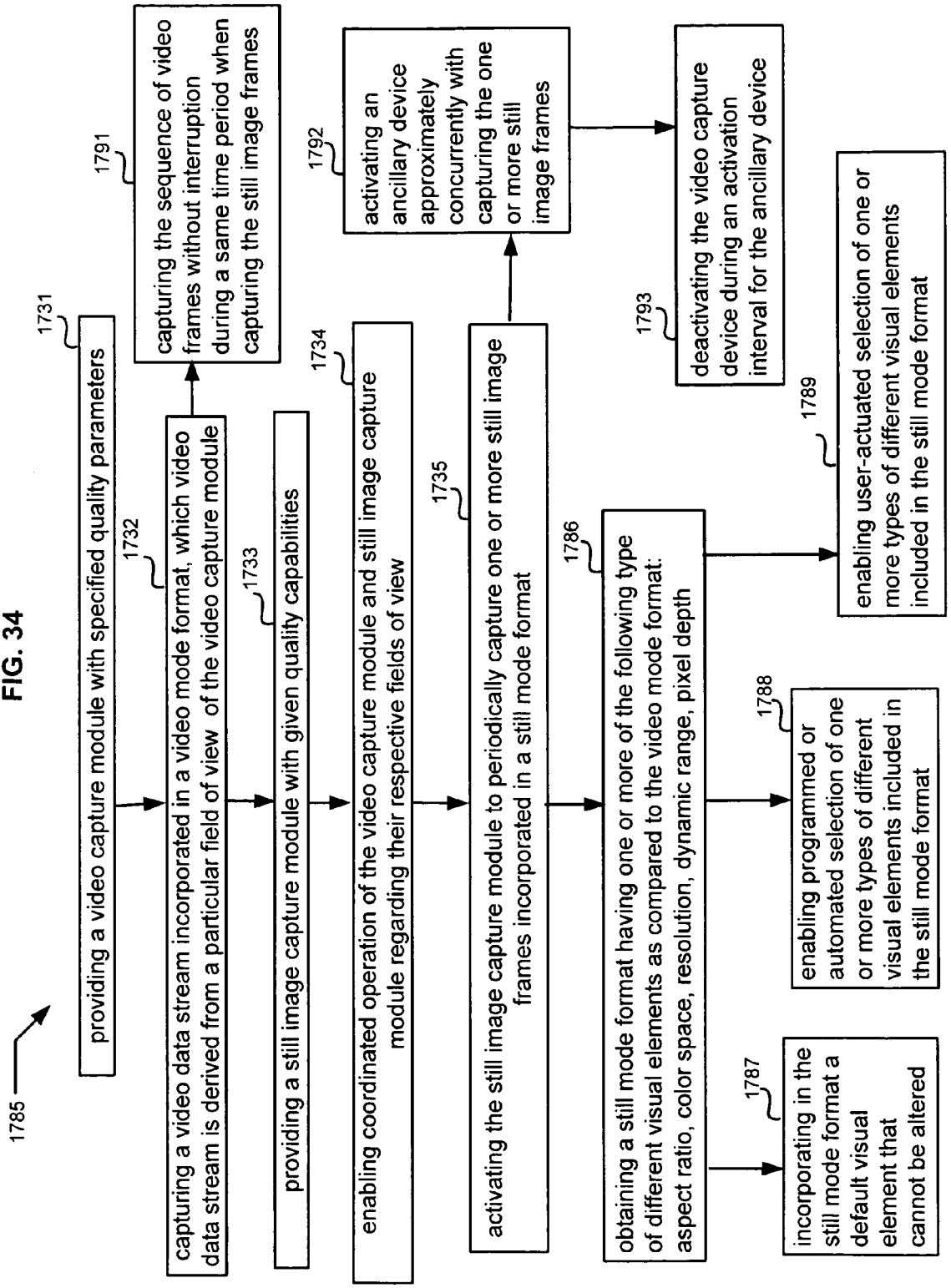

The various process embodiments 1785 illustrated in FIG. 34 include previously described features 1731, 1732, 1733, 1734, 1735 along with possible aspects pertaining to coordination between capturing the video data stream and capturing the still image frames. For example, a possible aspect may include capturing the sequence of video frames without interruption during a same time period when capturing the still image frames (block 1791). Other possible aspects may include activating an ancillary device approximately concurrently with capturing the one or more still image frames (block 1792), and deactivating the video capture device during an activation interval for the ancillary device (block 1793).

Additional implementation features may include obtaining a still mode format having one or more of the following type of different visual elements as compared to the video mode format: aspect ratio, color space, resolution, dynamic range, and pixel depth (block 1786). Another possible feature includes incorporating in the still mode format a default visual element that cannot be altered (block 1787).

Further possible features may include enabling programmed or automated selection of one or more types of different visual elements included in the still mode format (block 1788). Another possible feature may include enabling user-actuated selection of one or more types of different visual elements included in the still mode format (block 1789).

Figure 35:
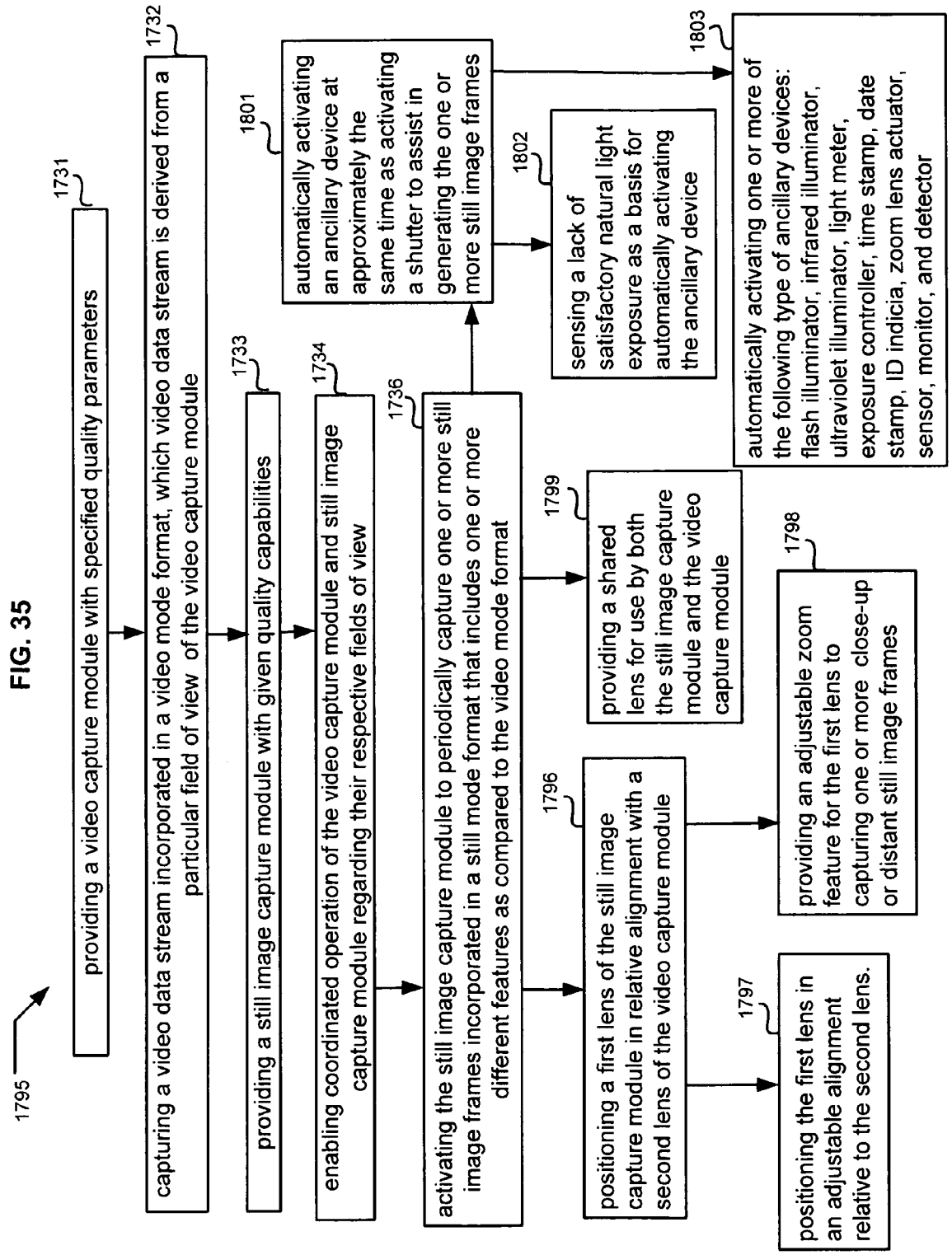

As shown in FIG. 35, exemplary process embodiments 1795 may include previously described features 1731, 1732, 1733, 1734, 1736 along with various possible aspects relating to capturing the video data stream or the still image frames. For example, a possible aspect may include positioning a first lens of the still image capture module in relative alignment with a second lens of the video capture module (block 1796).

Other possible aspects may include positioning the first lens in an adjustable alignment relative to the second lens (block 1797), and providing an adjustable zoom feature for the first lens to capturing one or more close-up or distant still image frames (block 1798). Yet another possible aspect may include providing a shared lens for use by both the still image capture module and the video capture module (block 1799).

Further possible features shown in FIG. 35 include automatically activating an ancillary device at approximately the same time as activating a shutter to assist in generating the one or more still image frames (block 1801), and sensing a lack of satisfactory natural light exposure as a basis for automatically activating the ancillary device (block 1802). An additional possible feature may include automatically activating one or more of the following type of ancillary devices: flash illuminator, infrared illuminator, ultraviolet illuminator, light meter, exposure controller, time stamp, date stamp, ID indicia, zoom lens actuator, sensor, monitor, and detector (block 1803).

Figure 36:
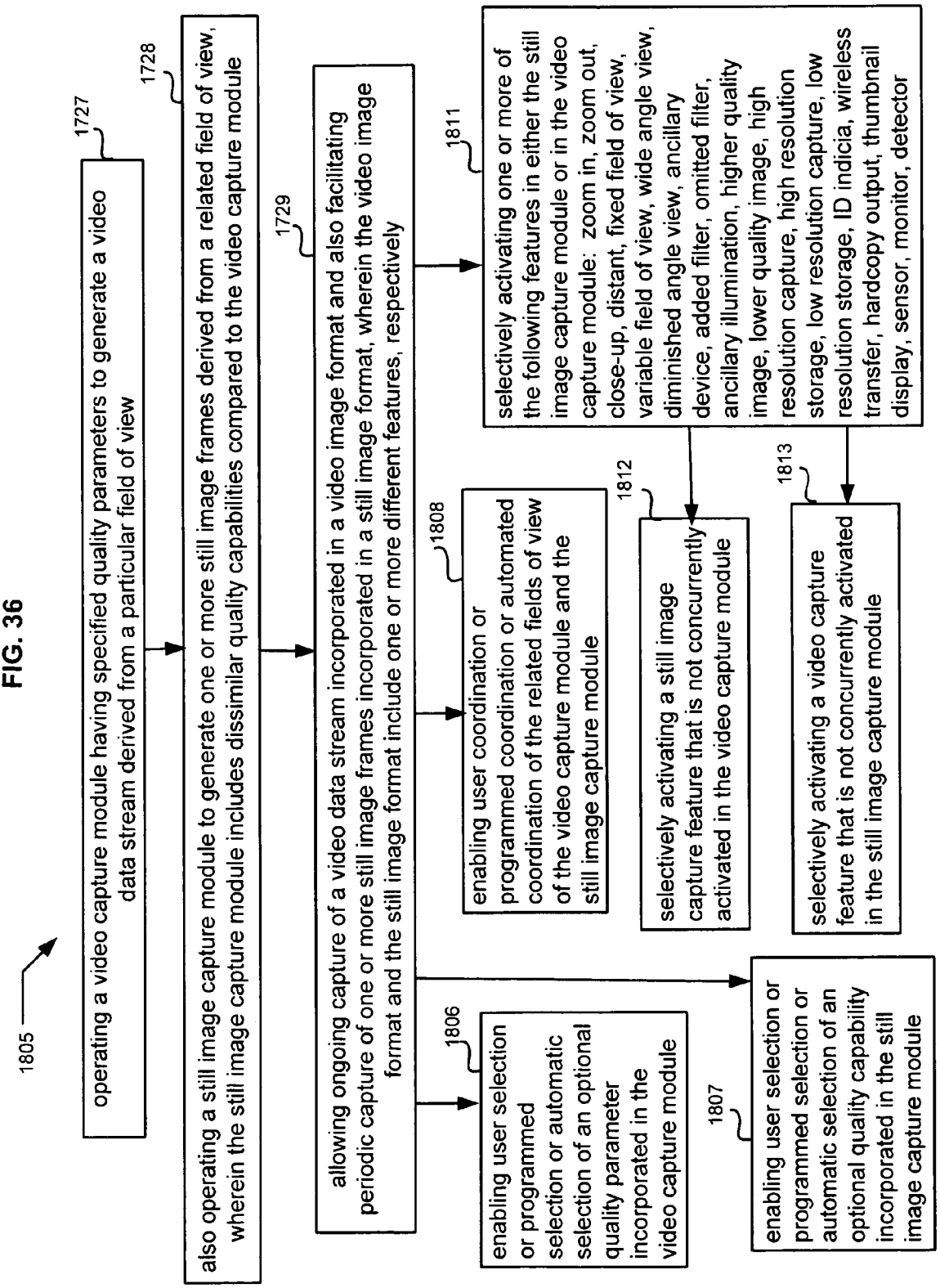

The various exemplary data capture embodiments 1805 of FIG. 36 include previously described process components 1727, 1728, 1729 in combination with other possible features including enabling user selection or programmed selection or automatic selection of an optional quality parameter incorporated in the video capture module (block 1806) and in the still image capture module (block 1807). Other possible implementation features may include enabling user coordination or programmed coordination or automated coordination of the related fields of view of the video capture module and the still image capture module (block 1808).

FIG. 36 illustrates additional possible aspects including selectively activating a still image capture feature that is not concurrently activated in the video capture module (block 1812), and selectively activating a video capture feature that is not concurrently activated in the still image module (block 1813).

Other possible aspects may include selectively activating one or more of the following features in either the still image capture module or in the video capture module: zoom in, zoom out, close-up, distant, fixed field of view, variable field of view, wide angle view, diminished angle view, ancillary device, added filter, omitted filter, ancillary illumination, higher quality image, lower quality image, high resolution capture, high resolution storage, low resolution capture, low resolution storage, ID indicia, wireless transfer, hardcopy output, thumbnail display, sensor, monitor, and detector (block 1811).

Figure 37:
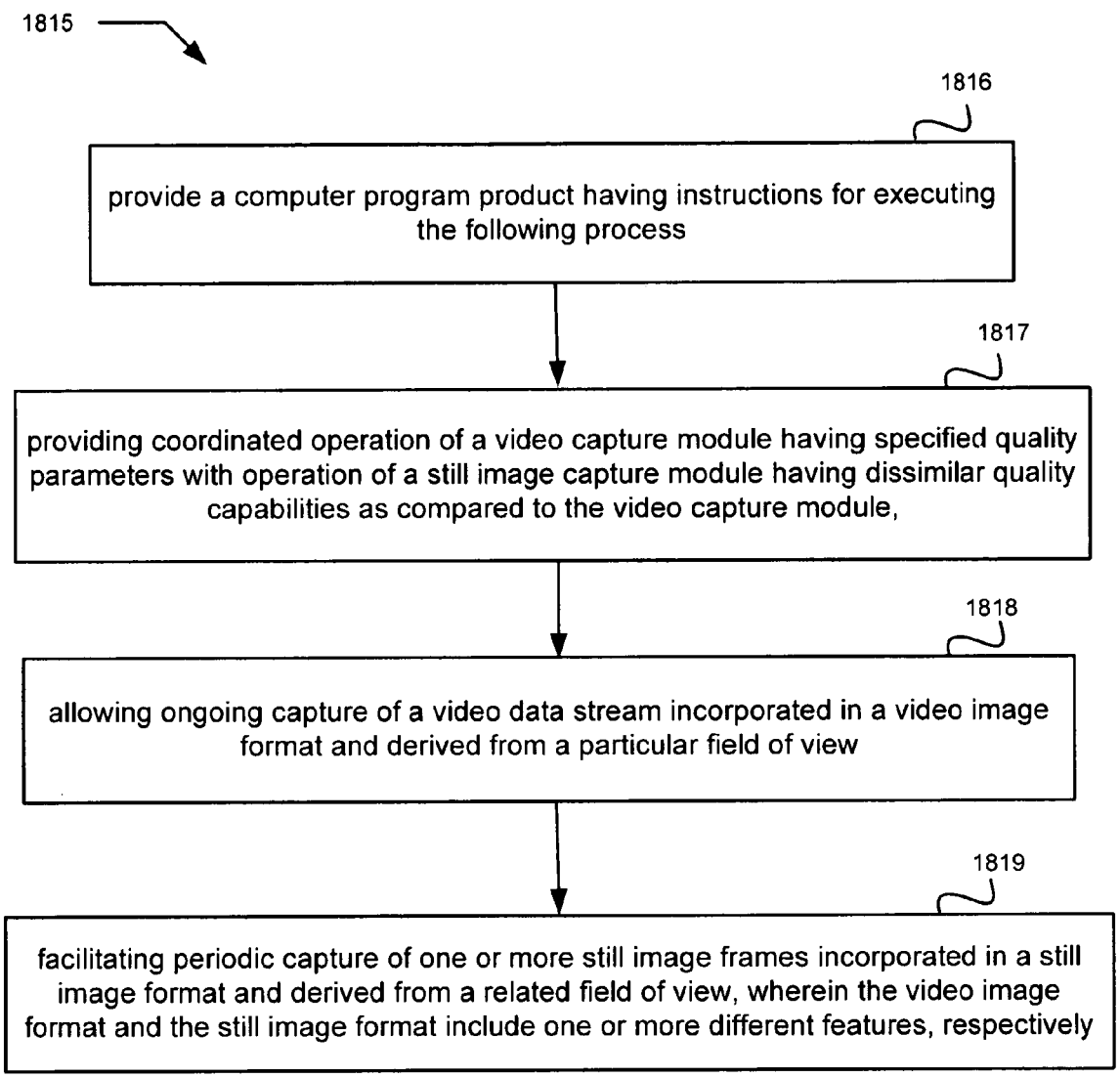
FIG. 37 illustrates another exemplary computer program product embodiment.

Referring to the exemplary embodiment 1815 of FIG. 37, a computer program product implementation may have instructions for executing a process that includes providing coordinated operation of a video capture module having specified quality parameters with operation of a still image capture module having dissimilar quality capabilities as compared to the video capture module (block 1817); allowing ongoing capture of a video data stream incorporated in a video image format and derived from a particular field of view (block 1818); and facilitating periodic capture of one or more still image frames incorporated in a still image format and derived from a related field of view, wherein the video image format and the still image format include one or more different features, respectively (block 1819).

It will be understood that various process aspects as disclosed herein may be incorporated as instructions in one or more computer programs. For example, such exemplary instructions may include implementation of one or more of the following dissimilar quality capabilities of the still image capture module: color balance, white balance, color space, depth of field, pixel capture resolution, pixel storage resolution, capture quality, storage quality, gray scale, ambient light sensor, infra-red illumination, flash illumination, aperture opening, focal point, filter, shutter speed, automated shutter, manual shutter, still frame frequency, preview display, post-capture display, high quality storage media, low quality storage media, removable storage media, programmed quality attribute, automated quality attribute, user-selected quality attribute, ownership right, transfer right, volatile memory, permanent memory, post-capture editing, and meta-data.

Additional exemplary instructions may include implementation of one or more of the following different features of the still image format: aspect ratio, color space, resolution, dynamic range, and pixel depth.

Figure 38:
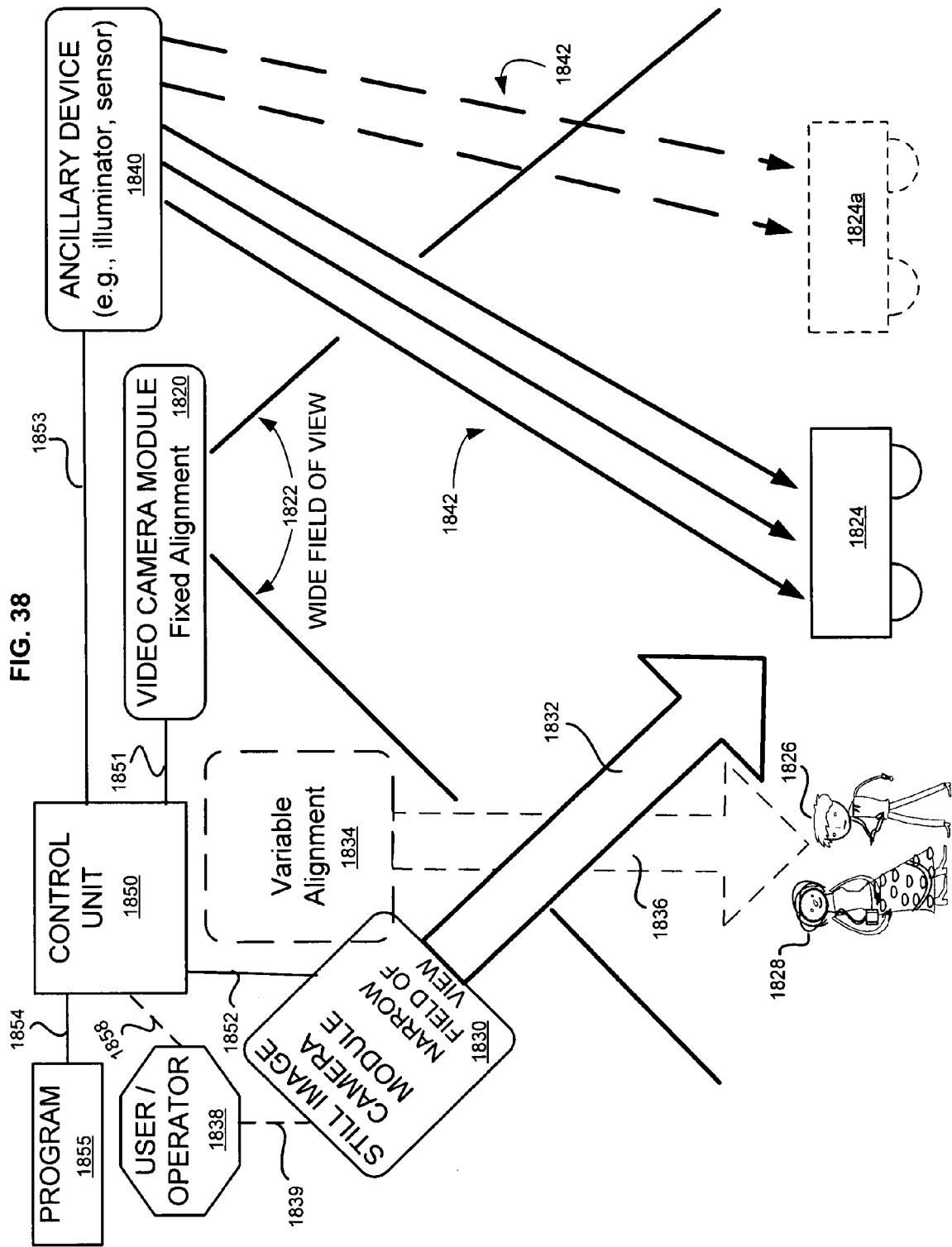
FIG. 38 shows a schematic diagram for an exemplary system embodiment incorporating video and still image modules.

Referring to the schematic diagram of FIG. 38, an exemplary data capture system embodiment may include a fixed alignment video camera module 1820 having a wide field of view 1822 that encompasses vehicle 1824 at different locations (see phantom position 1824*a*), and that also encompasses personages 1826, 1828 at varied locations. The system may further include an adjustable alignment still image camera module 1830 having a narrow field of view 1832 shown directed at vehicle 1824. An alignment change of still image camera module 1830 (see variable phantom alignment 1834) enables the still image camera module to have an adjusted field of view directed at personages 1826, 1828.

It will be understood that various possible control implementations may be used to coordinate operation of video camera module 1820 with operation of still image camera module 1830, and the illustrated implementation of FIG. 38 is by way of example only and is not intended to be limiting. A user/operator 1838 in some instances may have selective operational control 1839 of the still image camera module. In some instances selective operation control of the video camera module 1820 may be provided by user/operator 1838 or another user operator (not shown). Similar type of user selected operational control of ancillary device 1840 may also be provided.

The exemplary system embodiment of FIG. 38 may also include ancillary device 1840, control unit 1850 and program 1855. The control unit may be operably coupled to video camera module 1820 via 1851, and to still image camera module via 1852, and to ancillary device 1840 via 1853, and to program via 1854, and to user/operator 1838 via 1858. Accordingly it will be understood that automated or programmed control may be available for operation of video camera module 1820, still camera module 1830, and ancillary device 1840.

It will be understood that ancillary device 1840 may include various auxiliary features related to capturing the video data stream as well as capturing the still image frames. As shown schematically in FIG. 38, the ancillary device 1840 may in some exemplary implementations provide supplemental illumination (see directional arrows 1842) of vehicle 1824 to facilitate a desirable quality capture of individual still image frames as well as in some instances a desirable quality capture of a video data stream. In other exemplary implementations the ancillary device 1840 may be used to detect movement (see directional arrows 1842) of vehicle 1824 to a new location 1824*a*, which movement may have a possible causal effect on operation of the still image camera module 1830 as well as a possible causal effect on operation of the video camera module 1820. Such examples are by way of illustration and are not intended to be limiting.

Figure 39:
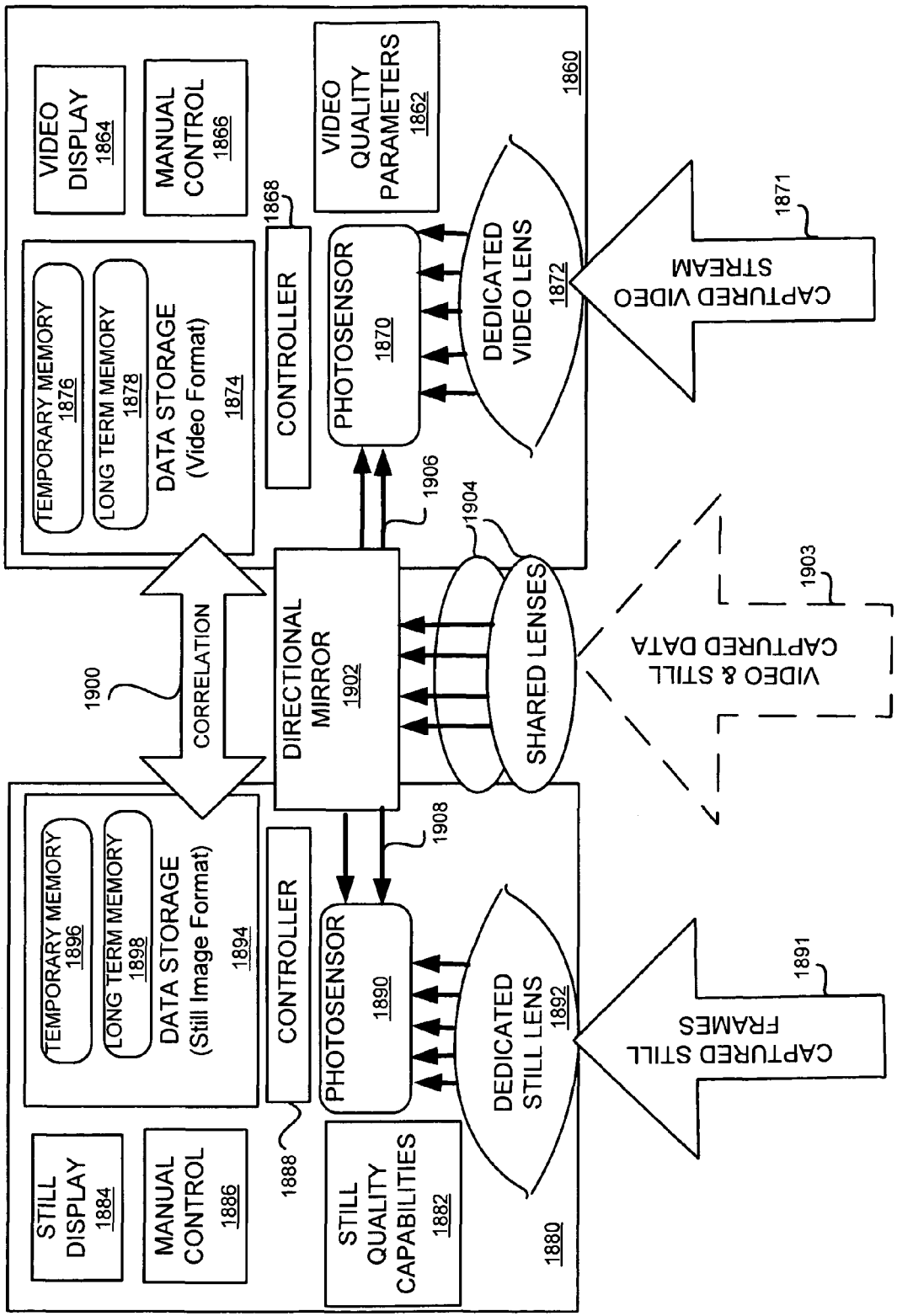
FIG. 39 is a schematic block diagram for an exemplary system for capturing both still image frames and video data streams.

Referring to the schematic block diagram of FIG. 39, another possible data capture system embodiment may include video capture module 1860 having specified video quality parameters 1862, video display 1864, manual control 1866, and controller 1868. A photosensor 1870 may be configured to receive a captured video stream 1871 through dedicated video lens 1872. In some implementations the video capture module may be configured to receive video data elements from a captured video/still data stream 1903 passing through shared lenses 1904 and directional mirror 1902 via communication link 1906 to photosensor 1870.

The captured video data stream may be incorporated in a particular video format that is saved by data storage media 1874 in temporary memory 1876 or long term memory 1878 for future availability and processing.

The exemplary data capture system embodiment of FIG. 39 may also include still image capture module 1880 having given quality capabilities 1882, still display 1884, manual control 1886, and controller 1888. A photosensor 1890 may be configured to receive captured still image frames 1891 through dedicated still lens 1892. In some implementations the still image capture module may be configured to receive still image data elements from a captured video/still data stream 1903 passing through shared lenses 1904 and directional mirror 1902 via communication link 1908 to photosensor 1890.

The captured still image frames may be incorporated in a particular still image format that is saved by data storage media 1894 in temporary memory 1896 or long term memory 1898 for future availability and processing.

It will be understood that in addition to coordination of the disclosed capturing techniques for generating video and still data from related fields of view, the various system and process components may also facilitate initial and ongoing correlation 1900 between captured versions (e.g., stored, edited, regenerated, combined, collated, etc.) of the video data stream and captured versions (e.g., stored, edited, regenerated, collated, etc.) of the still image frames.

It will be understood from the disclosures herein that an exemplary embodiments for implementing a dual mode data capture system may include various lens arrangements, including one or more shared lenses for capturing both the video data stream and the still image frames. Other embodiments may provide a first lens for capturing the video data stream and a second lens for capturing the still image frames.

Other system aspects that may be incorporated in a dual mode data capture system may include one or more given quality capabilities of the still image capture module that are different from the specified quality parameters of the video capture module.

Figure 40:
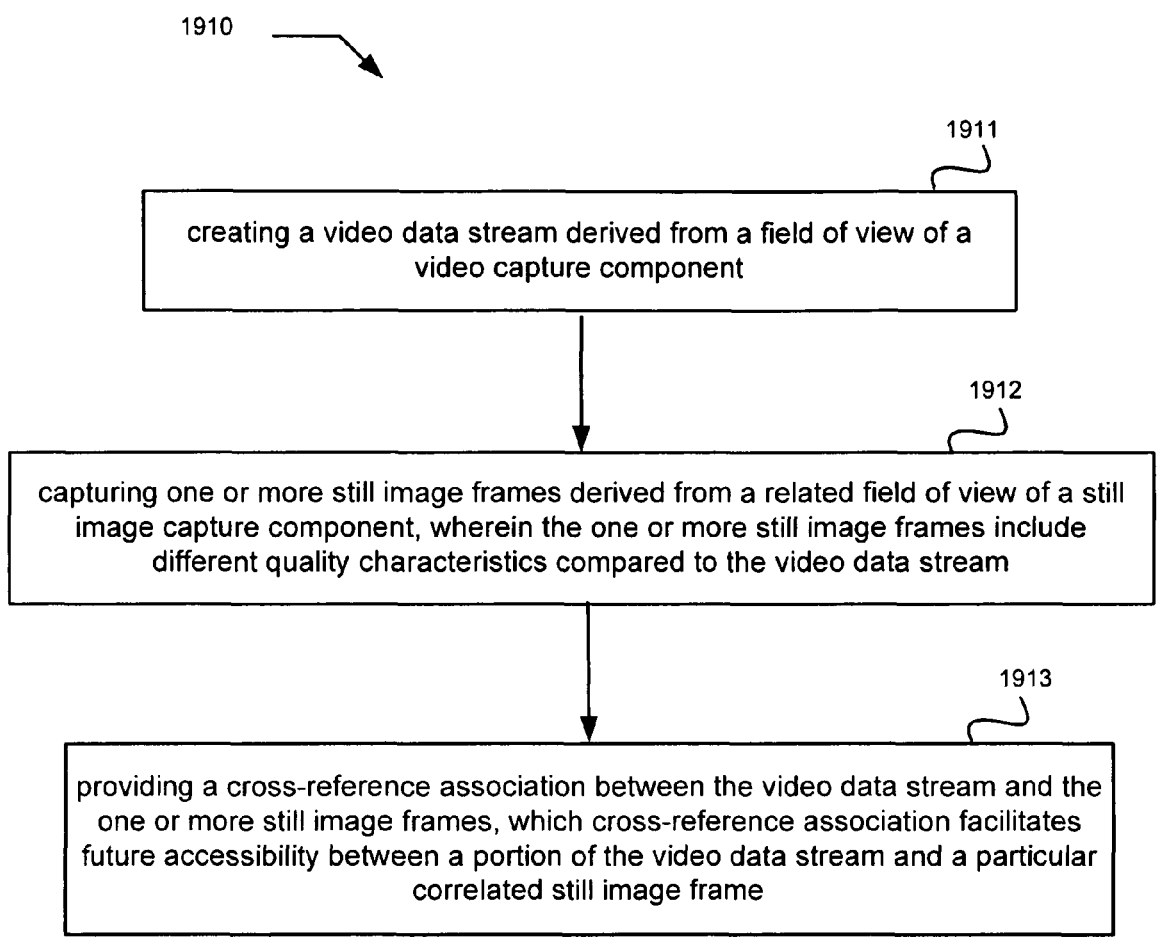
FIGS. 40-41 are high level flow charts showing further exemplary process embodiments.

The exemplary embodiment 1910 shown in the high level flow chart of FIG. 40 discloses a method of image capture correlation including creating a video data stream derived from a field of view of a video capture component (block 1911); capturing one or more still image frames derived from a related field of view of a still image capture component, wherein the one or more still image frames include different quality characteristics compared to the video data stream (block 1912); and providing a cross-reference association between the video data stream and the one or more still image frames, which cross-reference association facilitates future accessibility between a portion of the video data stream and a particular correlated still image frame (block 1913).

Figure 41:
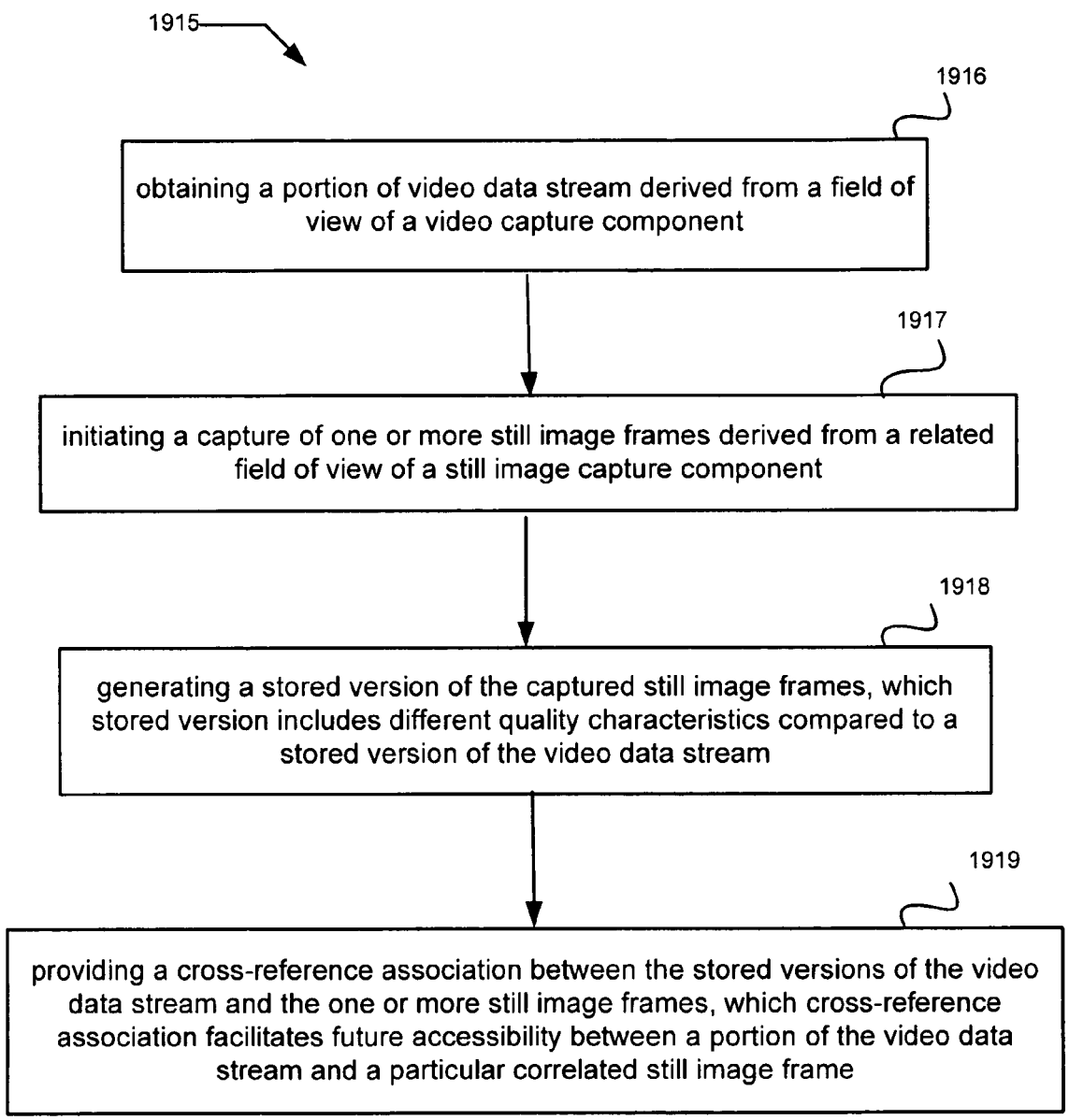

Another exemplary process embodiment 1915 illustrated in FIG. 41 discloses an image capture correlation method that includes obtaining a portion of video data stream derived from a field of view of a video capture component (block 1916); initiating a capture of one or more still image frames derived from a related field of view of a still image capture component (block 1917); generating a stored version of the captured still image frames, which stored version includes different quality characteristics compared to a stored version of the video data stream (block 1918); and providing a cross-reference association between the stored versions of the video data stream and the one or more still image frames, which cross-reference association facilitates future accessibility between a portion of the video data stream and a particular correlated still image frame (block 1919).

Figure 42:
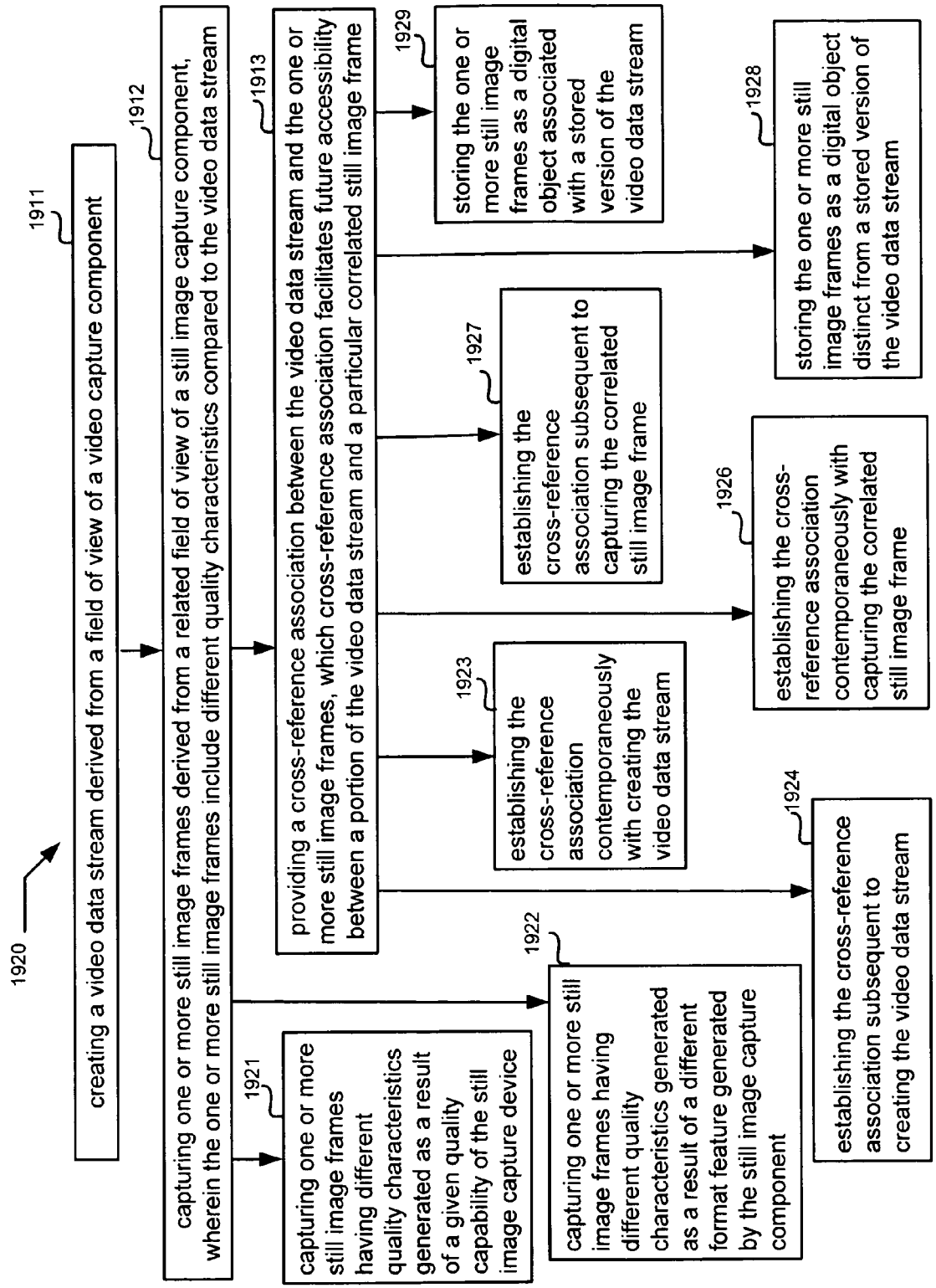
FIGS. 42-49 are detailed flow charts illustrating other exemplary embodiments.

Referring to the various exemplary embodiments 1920 of FIG. 42, previously described process components 1911, 1912, 1913 may be combined with other features relating to quality characteristics and cross-reference associations. For example, a possible aspect may include capturing one or more still image frames having different quality characteristics generated as a result of a given quality capability of the still image capture device (block 1921). Another possible aspect may include capturing one or more still image frames having different quality characteristics generated as a result of a different format feature generated by the still image capture component (block 1922).

Further possible features may include establishing the cross-reference association contemporaneously with creating the video data stream (block 1923), and in some instances subsequent to creating the video data stream (block 1924). Some implementation features may include establishing the cross-reference association contemporaneously with capturing the correlated still image frame (block 1926), and in other instances subsequent to capturing the correlated still image frame (block 1927).

Other possible process features may include storing the one or more still image frames as a digital object distinct from a stored version of the video data stream (block 1928), and storing the one or more still image frames as a digital object associated with a stored version of the video data stream (block 1929).

Figure 43:
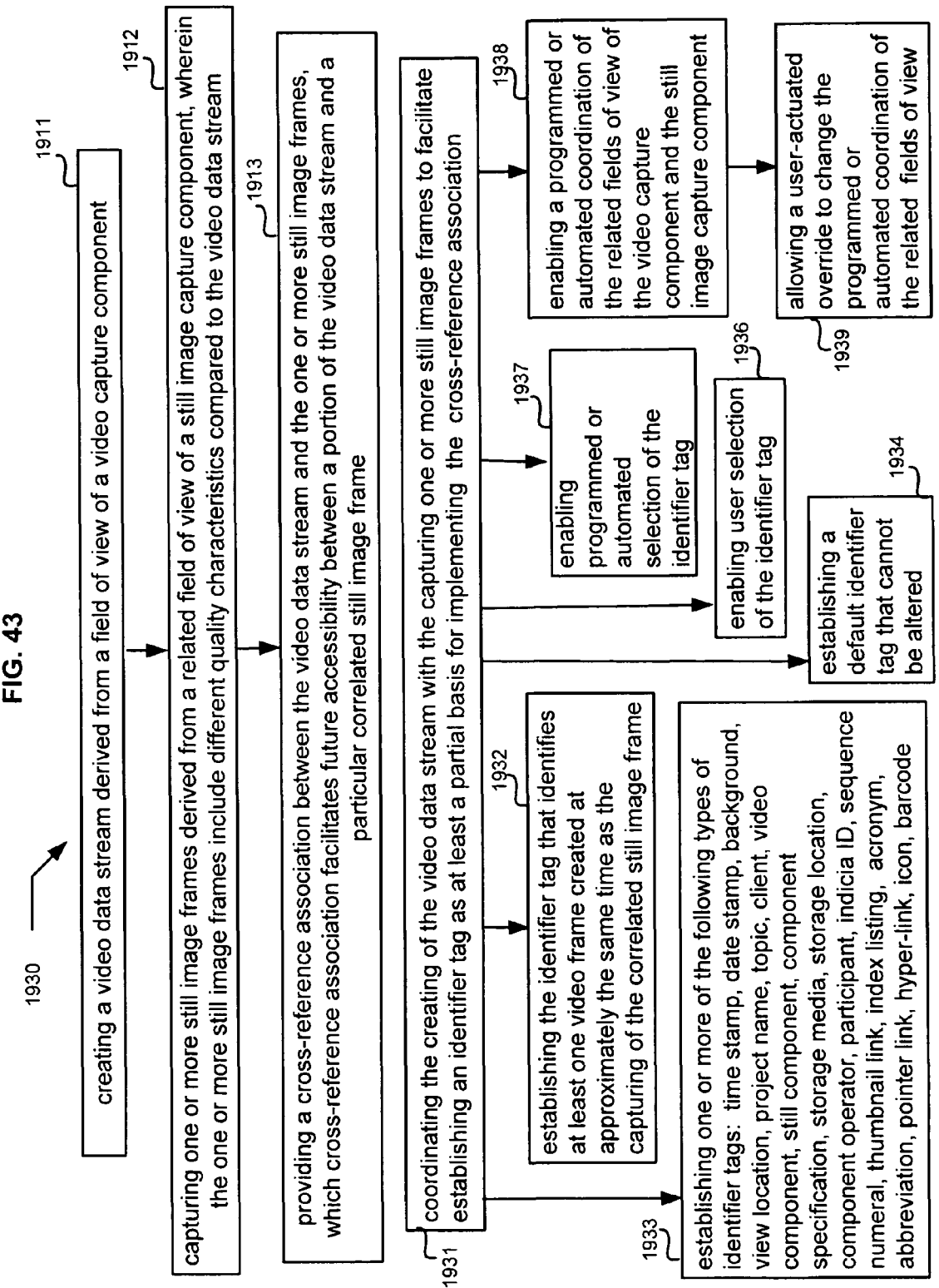

The additional exemplary embodiments 1930 shown in FIG. 43 may include previously described process components 1911, 1912, 1913 along with possible aspects relating to an identifier tag. For example, a possible aspect may include coordinating the creating of the video data stream with the capturing one or more still image frames to facilitate establishing an identifier tag as at least a partial basis for implementing the cross-reference association (block 1931). A further possible aspect may include establishing an identifier tag that identifies at least one video frame created at approximately the same time as the capturing of the correlated still image frame (block 1932).

Additional implementation features may include establishing one or more of the following types of identifier tags: time stamp, date stamp, background, view location, project name, topic, client, video component, still component, component specification, storage media, storage location, component operator, participant, indicia ID, sequence numeral, thumbnail link, index listing, acronym, abbreviation, pointer link, hyper-link, icon, and barcode (block 1933).

Further possible features shown in FIG. 43 include establishing a default identifier tag that cannot be altered (block 1934), enabling user selection of the identifier tag (block 1936), and enabling programmed or automated selection of the identifier tag (block 1937).

Other exemplary features may include enabling a programmed or automated coordination of the related fields of view of the video capture component and the still image capture component (block 1938), and allowing a user-actuated override to change the programmed or automated coordination of the related fields of view (block 1939).

Figure 44:
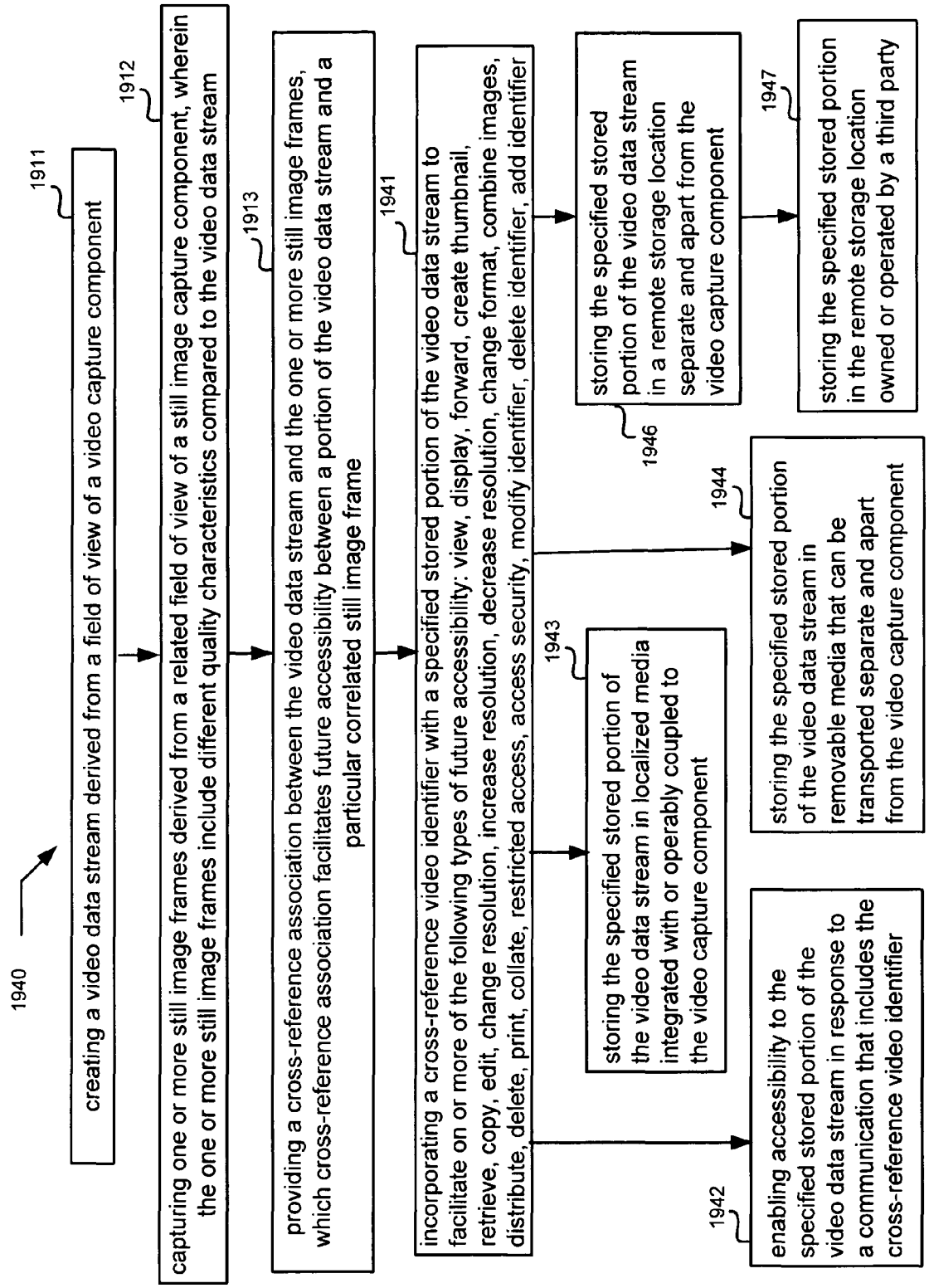

The various exemplary process embodiments 1940 of FIG. 44 may include previously described process features 1911, 1912, 1913 along with further possible accessibility aspects including incorporating a cross-reference video identifier with a specified stored portion of the video data stream to facilitate one or more of the following types of future accessibility: view, display, forward, create thumbnail, retrieve, copy, edit, change resolution, increase resolution, decrease resolution, change format, combine images, distribute, delete, print, collate, restricted access, access security, modify identifier, delete identifier, and add identifier (block 1941).

Additional possible aspects may include enabling accessibility to the specified stored portion of the video data stream in response to a communication that includes the cross-reference video identifier (block 1942), and storing the specified stored portion of the video data stream in localized media integrated with or operably coupled to the video capture component (block 1943). Another exemplary implementation feature may include storing the specified stored portion of the video data stream in removable media that can be transported separate and apart from the video capture component (block 1944).

Further possible features may include storing the specified stored portion of the video data stream in a remote storage location separate and apart from the video capture component (block 1946), and storing the specified stored portion in the remote storage location owned or operated by a third party (block 1947).

Figure 45:
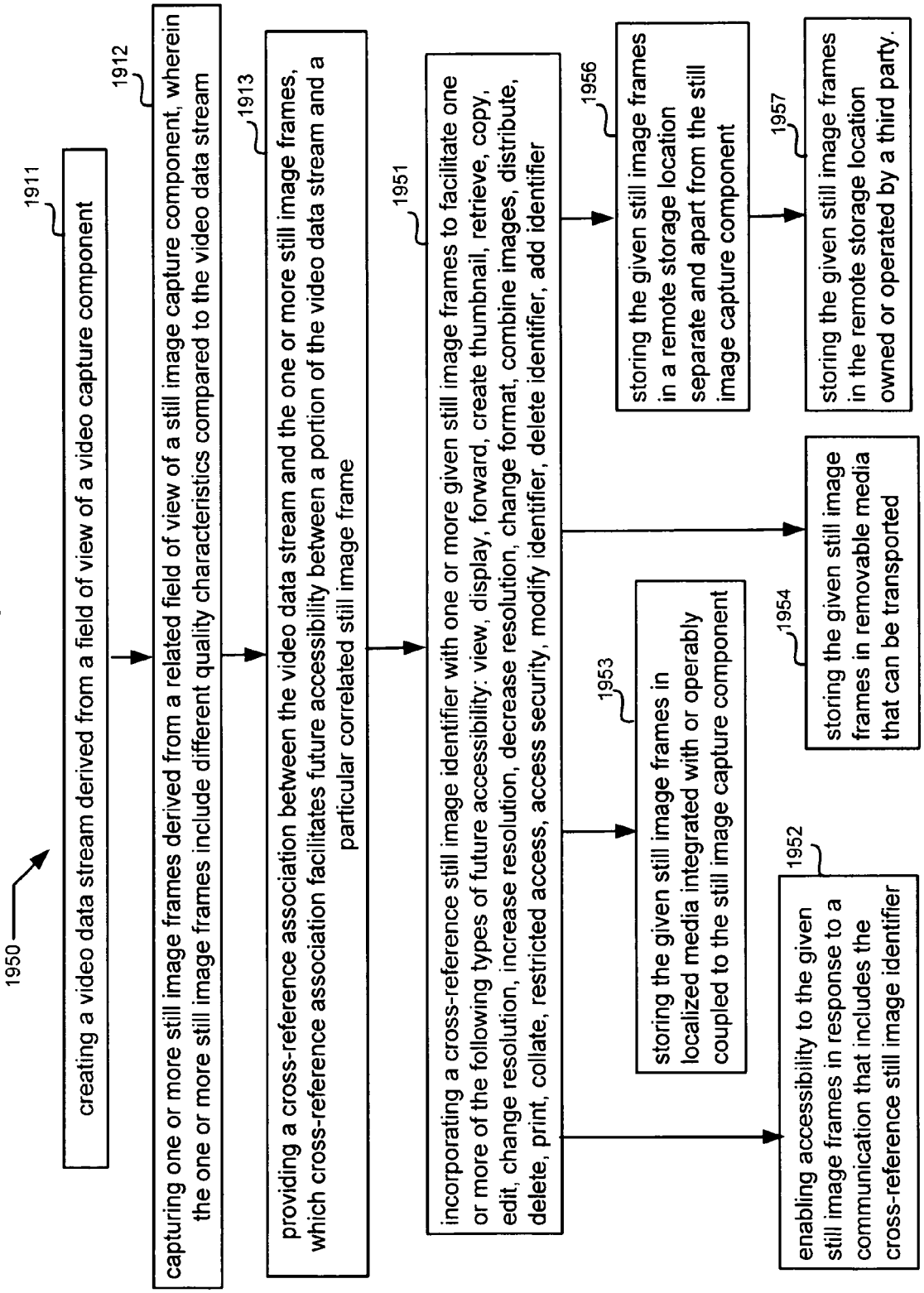

The embodiments 1950 shown in FIG. 45 include various possible implementation features relating to a still image identifier in combination with previously described process features 1911, 1912, 1913. Such exemplary implementation may include incorporating a cross-reference still image identifier with one or more given still image frames to facilitate one or more of the following types of future accessibility: view, display, forward, create thumbnail, retrieve, copy, edit, change resolution, increase resolution, decrease resolution, change format, combine images, distribute, delete, print, collate, restricted access, access security, modify identifier, delete identifier, and add identifier (block 1951).

Other storage accessibility aspects may include enabling accessibility to the given still image frames in response to a communication that includes the cross-reference still image identifier (block 1952), and storing the given still image frames in localized media integrated with or operably coupled to the still image capture component (block 1953). Another possible aspect may include storing the given still image frames in removable media that can be transported separate and apart from the still image capture component (block 1954).

Further possible implementation features may include storing the given still image frames in a remote storage location separate and apart from the still image capture component (block 1956), and storing the given still image frames in the remote storage location owned or operated by a third party (block 1957).

Figure 46:
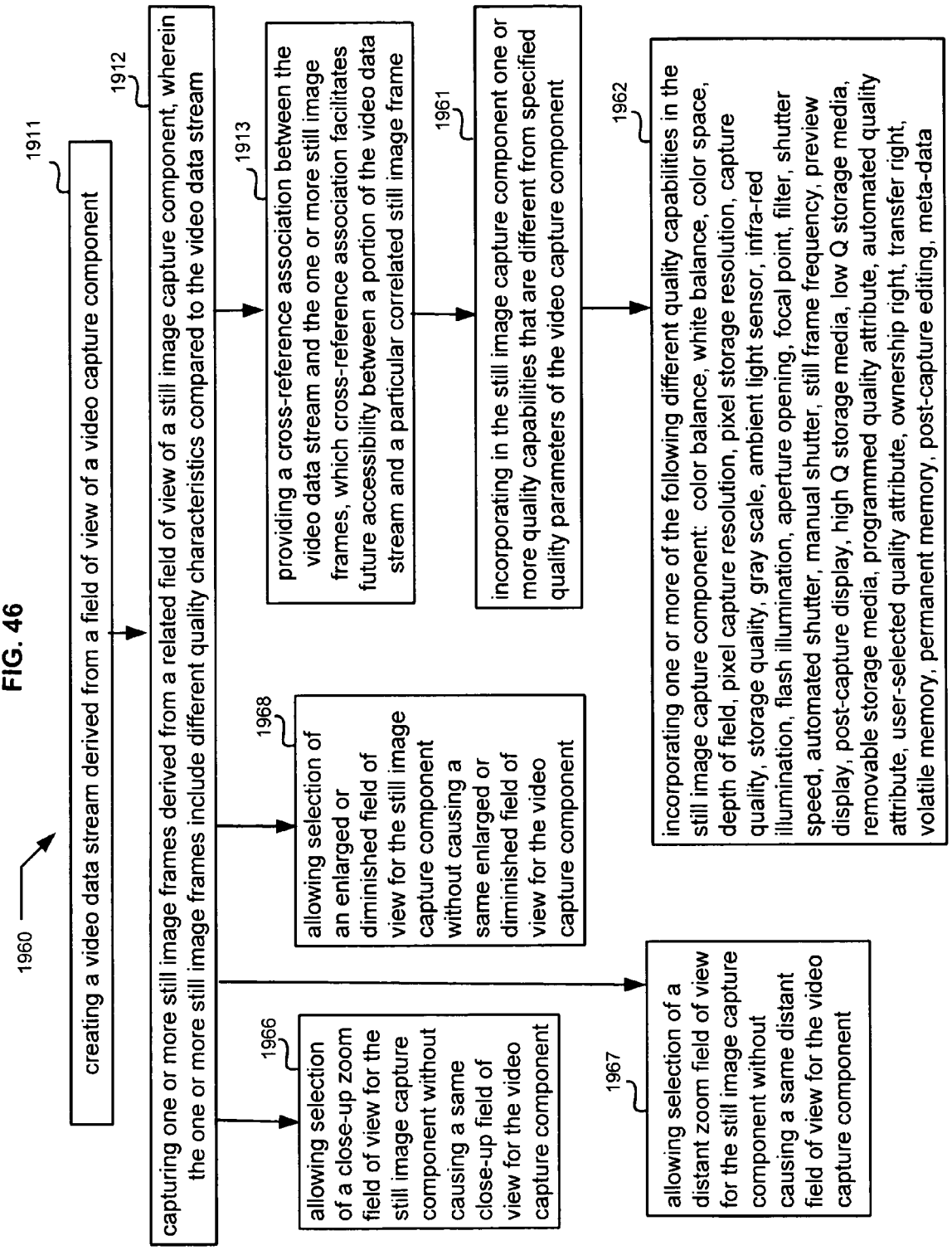

The exemplary embodiments 1960 of FIG. 46 may include previously described process components 1911, 1912, 1913 in combination with incorporating in the still image capture component one or more quality capabilities that are different from specified quality parameters of the video capture component (block 1961). A related aspect may include incorporating one or more of the following different quality capabilities in the still image capture component: color balance, white balance, color space, depth of field, pixel capture resolution, pixel storage resolution, capture quality, storage quality, gray scale, ambient light sensor, infra-red illumination, flash illumination, aperture opening, focal point, filter, shutter speed, automated shutter, manual shutter, still frame frequency, preview display, post-capture display, high Q storage media, low Q storage media, removable storage media, programmed quality attribute, automated quality attribute, user-selected quality attribute, ownership right, transfer right, volatile memory, permanent memory, post-capture editing, and metadata (block 1962).

Further possible aspects may include allowing selection of a close-up zoom field of view for the still image capture component without causing a same close-up field of view for the video capture component (block 1966), allowing selection of a distant zoom field of view for the still image capture component without causing a same distant field of view for the video capture component (block 1967), and allowing selection of an enlarged or diminished field of view for the still image capture component without causing a same enlarged or diminished field of view for the video capture component (block 1968).

Figure 47:
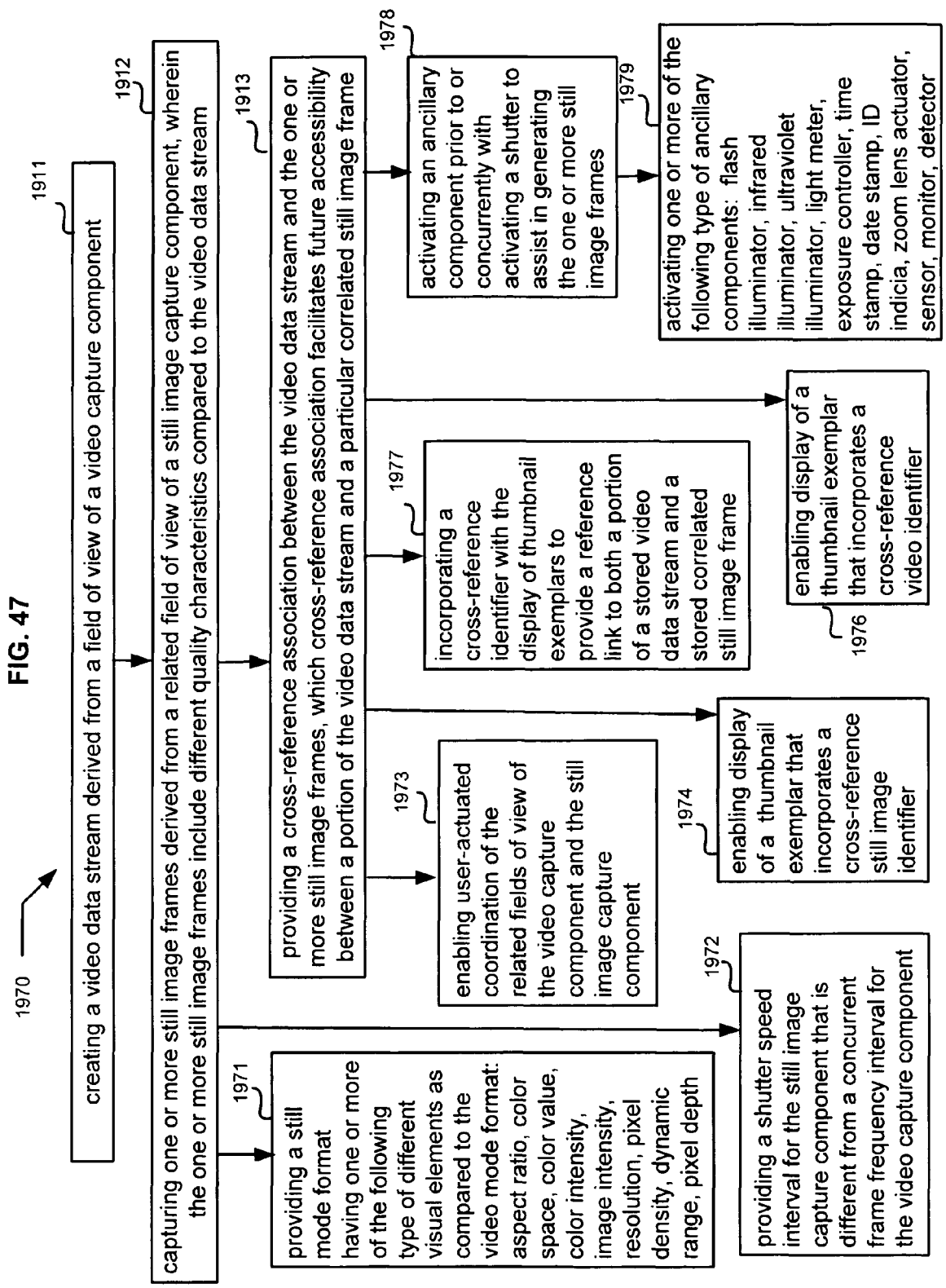

The detailed exemplary embodiments 1970 of FIG. 47 may include previously described process components 1911, 1912, 1913 along with other possible features such as providing a still mode format having one or more of the following type of different visual elements as compared to the video mode format: aspect ratio, color space, color value, color intensity, image intensity, resolution, pixel density, dynamic range, and pixel depth (block 1971).

Another possible aspect may include providing a shutter speed interval for the still image capture component that is different from a concurrent frame frequency interval for the video capture component (block 1972). A further exemplary aspect may include enabling user-actuated coordination of the related fields of view of the video capture component and the still image capture component (block 1973).

Additional exemplary features shown in FIG. 47 include enabling display of a thumbnail exemplar that incorporates a cross-reference still image identifier (block 1974), and enabling display of a thumbnail exemplar that incorporates a cross-reference video identifier (block 1976). A related possible feature may include incorporating a cross-reference identifier with the display of thumbnail exemplars to provide a reference link to both a portion of a stored video data stream and a stored correlated still image frame (block 1977).

Further aspects relating to an ancillary component may include activating an ancillary component prior to or concurrently with activating a shutter to assist in generating the one or more still image frames (block 1978). A related aspect may include activating one or more of the following type of ancillary components: flash illuminator, infrared illuminator, ultraviolet illuminator, light meter, exposure controller, time stamp, date stamp, ID indicia, zoom lens actuator, sensor, monitor, and detector (block 1979).

Figure 48:
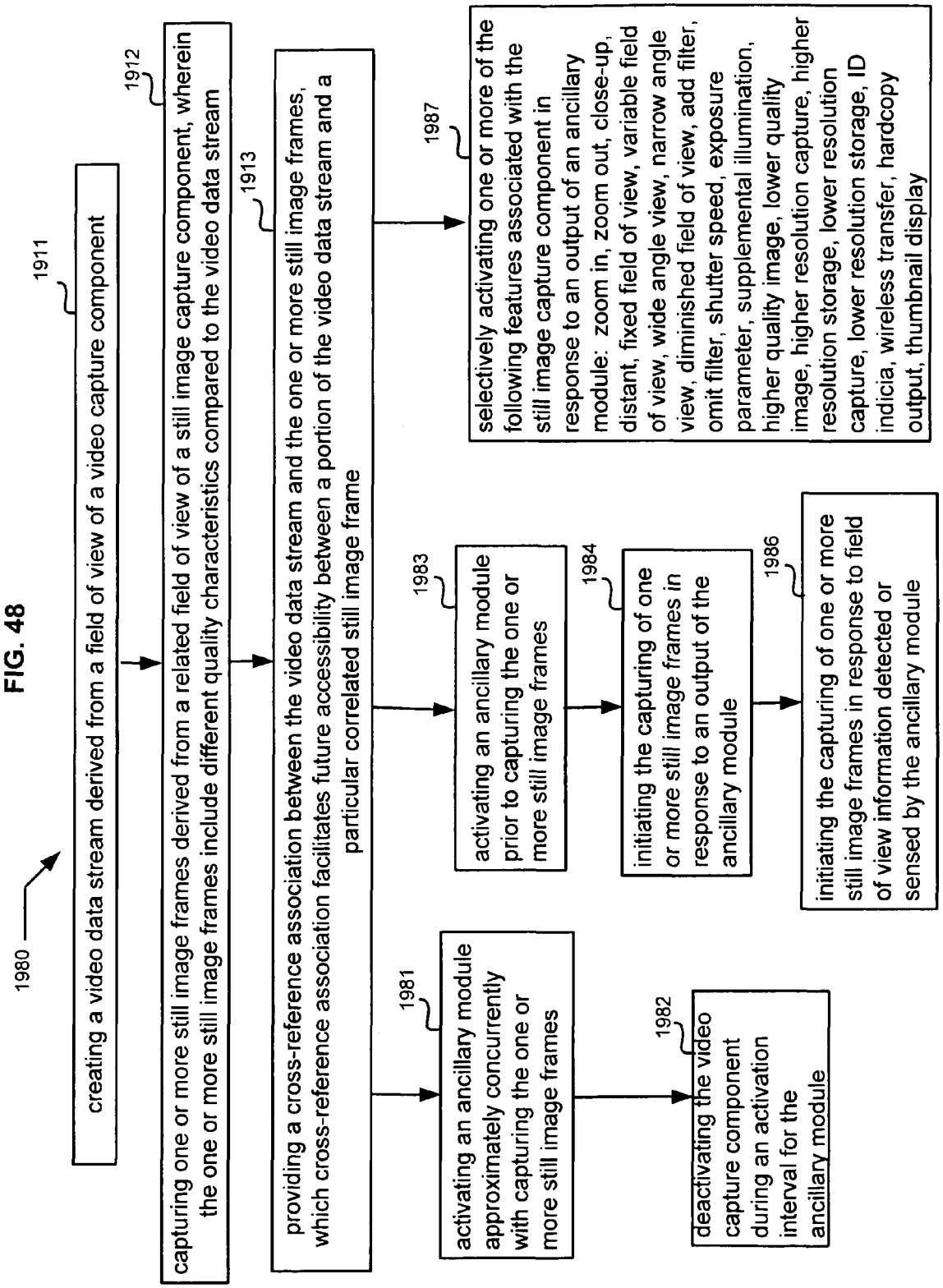

The detailed exemplary embodiments 1980 of FIG. 48 disclose other possibilities for implementing an image capture correlation method. Such possibilities may include previously described process components 1911, 1912, 1913 along with various aspects related to an ancillary module. For example, further exemplary aspects may include activating an ancillary module approximately concurrently with capturing the one or more still image frames (block 1981), and deactivating the video capture component during an activation interval for the ancillary module (block 1981).

Other possible features may include activating an ancillary module prior to capturing the one or more still image frames (block 1983), initiating the capturing of one or more still image frames in response to an output of the ancillary module (block 1984), and initiating the capturing of one or more still image frames in response to field of view information detected or sensed by the ancillary module (block 1986).

Yet another exemplary aspect may include selectively activating one or more of the following features associated with the still image capture component in response to an output of an ancillary module: zoom in, zoom out, close-up, distant, fixed field of view, variable field of view, wide angle view, narrow angle view, diminished field of view, add filter, omit filter, shutter speed, exposure parameter, supplemental illumination, higher quality image, lower quality image, higher resolution capture, higher resolution storage, lower resolution capture, lower resolution storage, ID indicia, wireless transfer, hardcopy output, and thumbnail display (block 1987).

Figure 49:
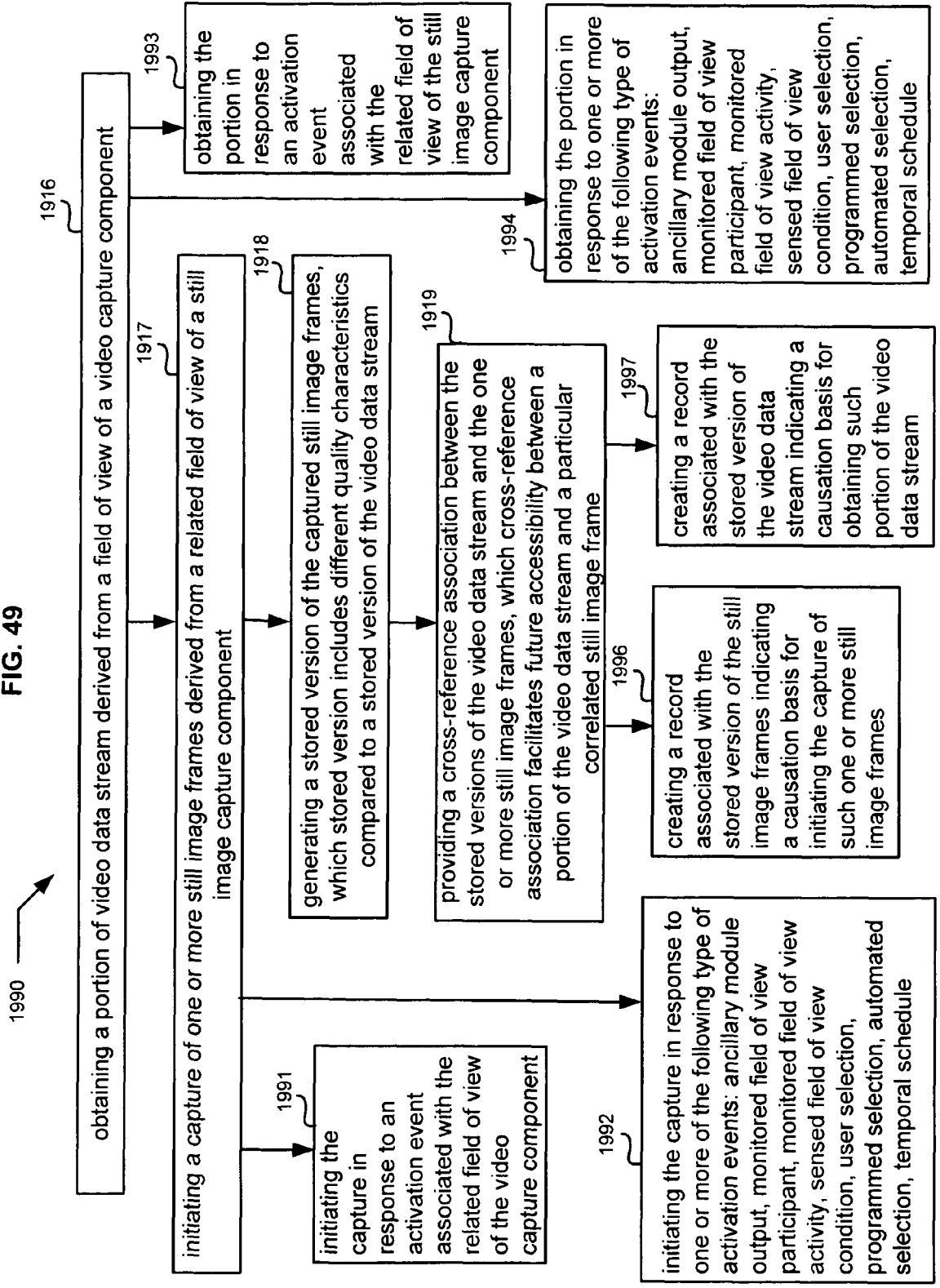

The exemplary embodiments 1990 of FIG. 49 may include previously described features 1916, 1917, 1918, 1919 as well as a possibility of initiating the capture of a still image frame in response to an activation event associated with the related field of view of the video capture component (block 1991). A further related aspect may include initiating such capture in response to one or more of the following type of activation events: ancillary module output, monitored field of view participant, monitored field of view activity, sensed field of view condition, user selection, programmed selection, automated selection, and temporal schedule (block 1992).

Further disclosed exemplary features may include obtaining a portion of the video data stream in response to an activation event associated with the related field of view of the still image capture component (block 1993), and obtaining a portion of the video data stream in response to one or more of the following type of activation events: ancillary module output, monitored field of view participant, monitored field of view activity, sensed field of view condition, user selection, programmed selection, automated selection, and temporal schedule (block 1994).

Other possible implementation features shown in FIG. 49 include creating a record associated with the stored version of the still image frames indicating a causation basis for initiating the capture of such still image frames (block 1996), and creating a record associated with the stored version of the video data stream indicating a causation basis for obtaining the video data stream portion (block 1997).

Figure 50:
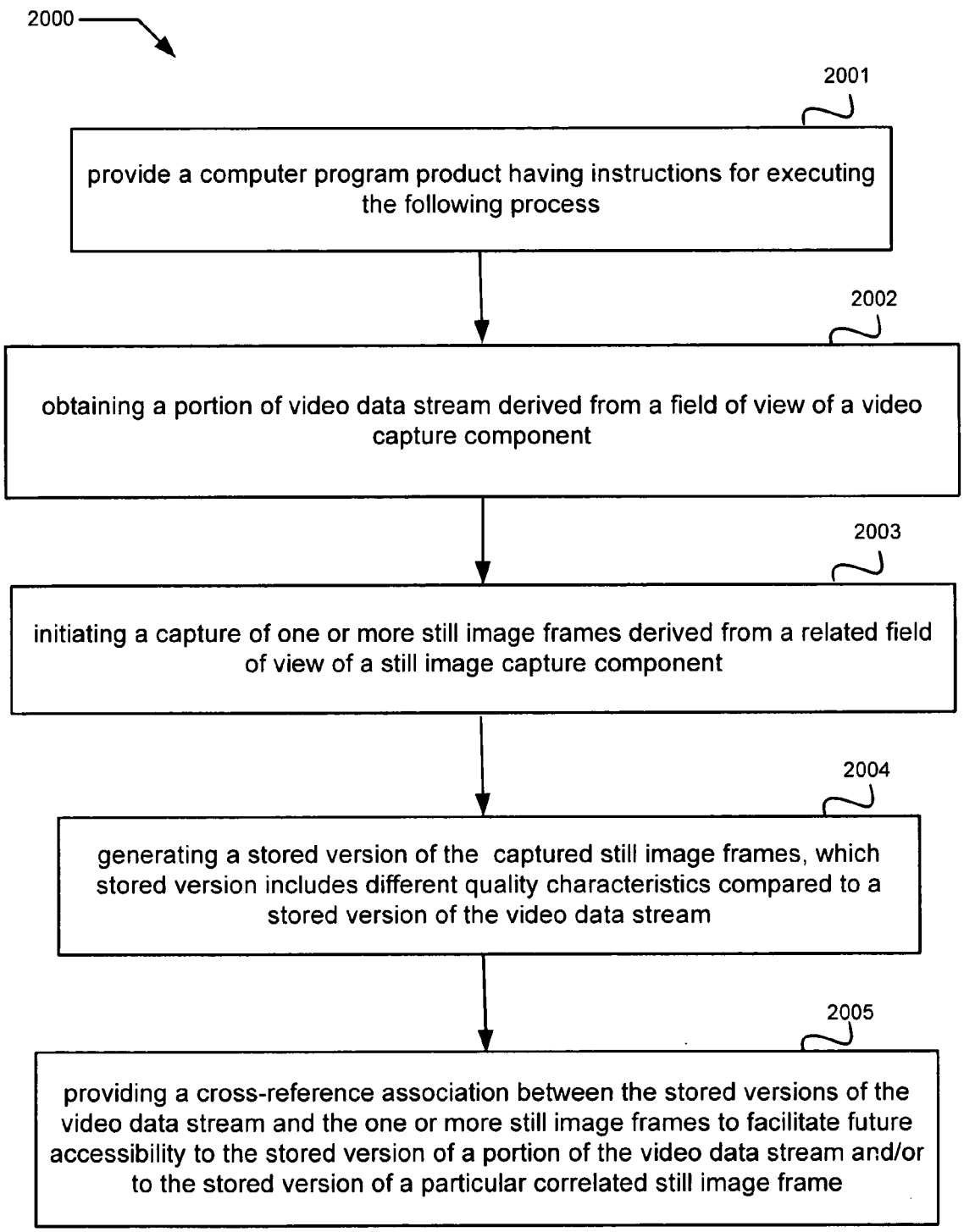
FIG. 50 illustrates a further exemplary computer program product embodiment.

An exemplary embodiment 2000 shown in FIG. 50 discloses a computer program product having instructions for executing a process (block 2001) that may include obtaining a portion of video data stream derived from a field of view of a video capture component (block 2002); initiating a capture of one or more still image frames derived from a related field of view of a still image capture component (block 2003); and generating a stored version of the captured still image frames, which stored version includes different quality characteristics compared to a stored version of the video data stream (block 2004).

A further possible process feature may include providing a cross-reference association between the stored versions of the video data stream and the one or more still image frames to facilitate future accessibility to the stored version of a portion of the video data stream and/or to the stored version of a particular correlated still image frame (block 2005).

It will be understood that various process features may be implemented in a computer program product. For example, process instructions may include enabling the cross-reference association to facilitate one or more of the following types of future accessibility to the stored versions of the video data stream and/or the one or more still image frames: view, display, forward, create thumbnail, retrieve, copy, edit, change resolution, increase resolution, decrease resolution, change format, combine images, distribute, delete, print, collate, restricted access, access security, modify cross-reference identifier, delete cross-reference identifier, and add cross-reference identifier.

Additional exemplary process instructions may include selectively activating a still image capture feature that is not concurrently activated in the video capture module. Further exemplary process instructions may include selectively activating a video capture feature that is not concurrently activated in the still image capture module.

Figure 51:
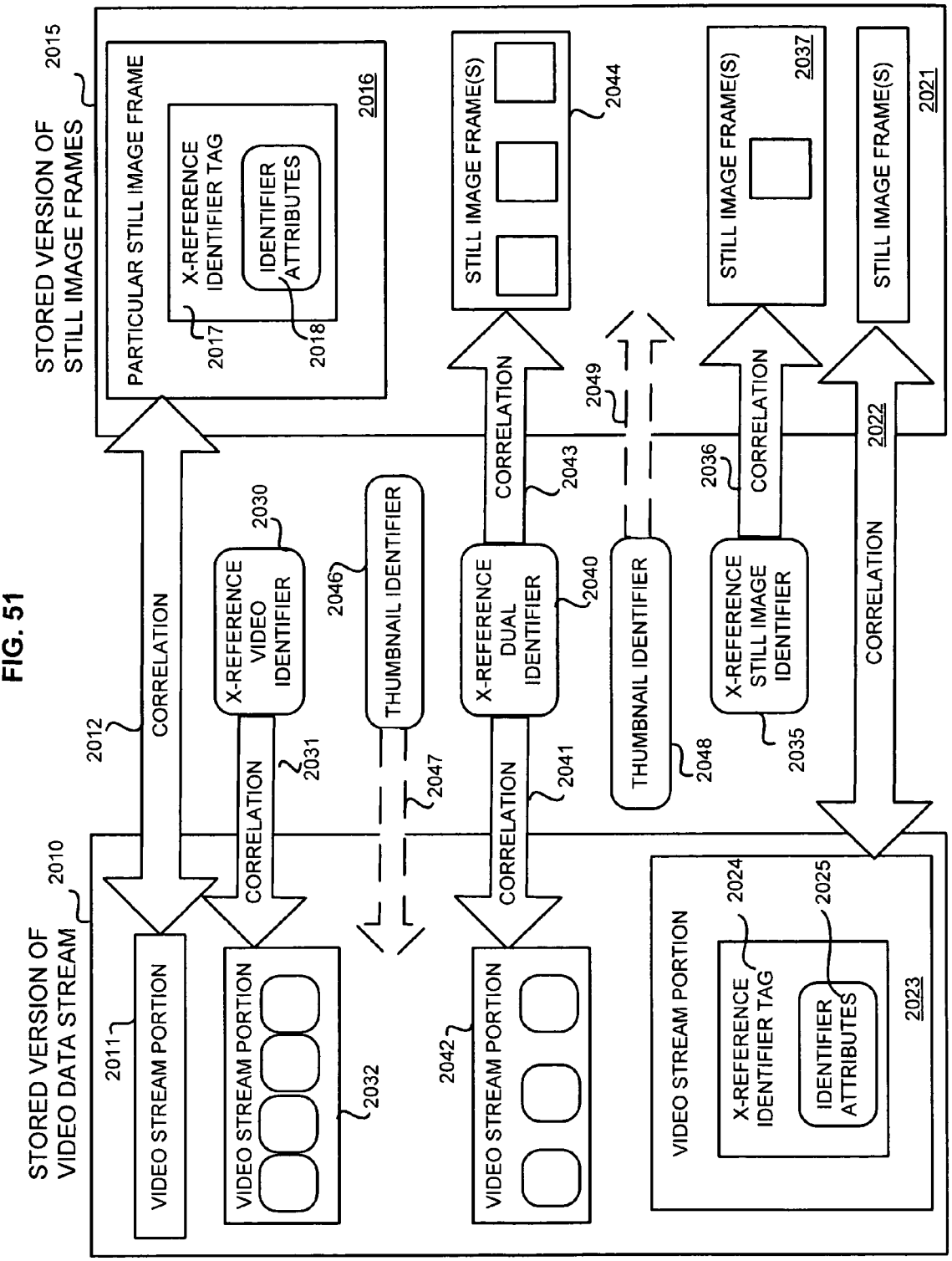
FIG. 51 is a schematic block diagram illustrating various exemplary embodiments for correlating captured video streams and still images.

Referring to the schematic block diagram of FIG. 51, an exemplary image capture system embodiment includes a stored version of video data stream 2010 and a stored version of still image frames 2015.

Various types of correlation features are illustrated in the embodiments shown in FIG. 51. For example, a bidirectional correlation 2012 may be provided between a stored video stream portion 2011 and a stored version of a particular still image frame 2016. This exemplary embodiment may provide a cross-reference (x-reference) identifier tag 2017 associated with the stored still image frame (or frames), which identifier tag may include one or more identifier attributes 2018. A similar or different identifier tag (not shown) may also be associated with the correlated video stream portion 2011.

In another example, a bidirectional correlation 2022 may be provided between a stored still image frame 2021 and a stored version of a video stream portion 2023. This exemplary embodiment includes a cross-reference (x-reference) identifier tag 2024 associated with the stored video stream portion (or individual video frame), which identifier tag may include one or more identifier attributes 2025. A similar or different identifier tag (not shown) may also be associated with the correlated still image frame 2021.

In a further example, a correlation 2031 may provide a cross-reference association (e.g., communication link, ID indicia, etc.) between a cross-reference video identifier 2030 and a stored video stream portion 2032 that is illustrated schematically as four sequential video frames.

In yet another example, a correlation 2036 may provide a cross-reference association between a cross-reference still image identifier 2035 and one or more stored image frames 2037 illustrated schematically as a single still frame.

In an additional example, a first correlation 2041 may provide a cross-reference association between a cross-reference dual identifier 2040 and a video stream portion 2042 illustrated schematically as three non-sequential video frames. In this instance a second correlation 2043 may provide a cross-reference association between the same cross-reference dual identifier 2040 and one or more still image frames 2044 illustrated schematically as three still frames. Of course such dual identifiers may also be incorporated in other exemplary embodiments.

Other possible exemplary embodiments may include a thumbnail identifier 2046 having a temporary correlation linkage (shown in phantom as 2047) with stored video data streams. The temporary correlation linkage 2047 may be capable of modification to provide correlation linkage to new or previously stored versions of captured video data streams. A further exemplary thumbnail identifier 2048 may also include different types of correlation linkages (shown in phantom as 2049) with stored still image frames. Of course such variable or temporary or changeable or updateable correlation features may be incorporated in other exemplary embodiments.

It will be understood that some x-reference identifiers may include a fixed default identifier (e.g., non-alterable) or may be subject to limited access (e.g., encoded, password protected, etc.) or may be accessible without restriction depending on the circumstances. The exemplary embodiments are disclosed for purposes of illustration only and are not intended to be limiting.

Figure 52:
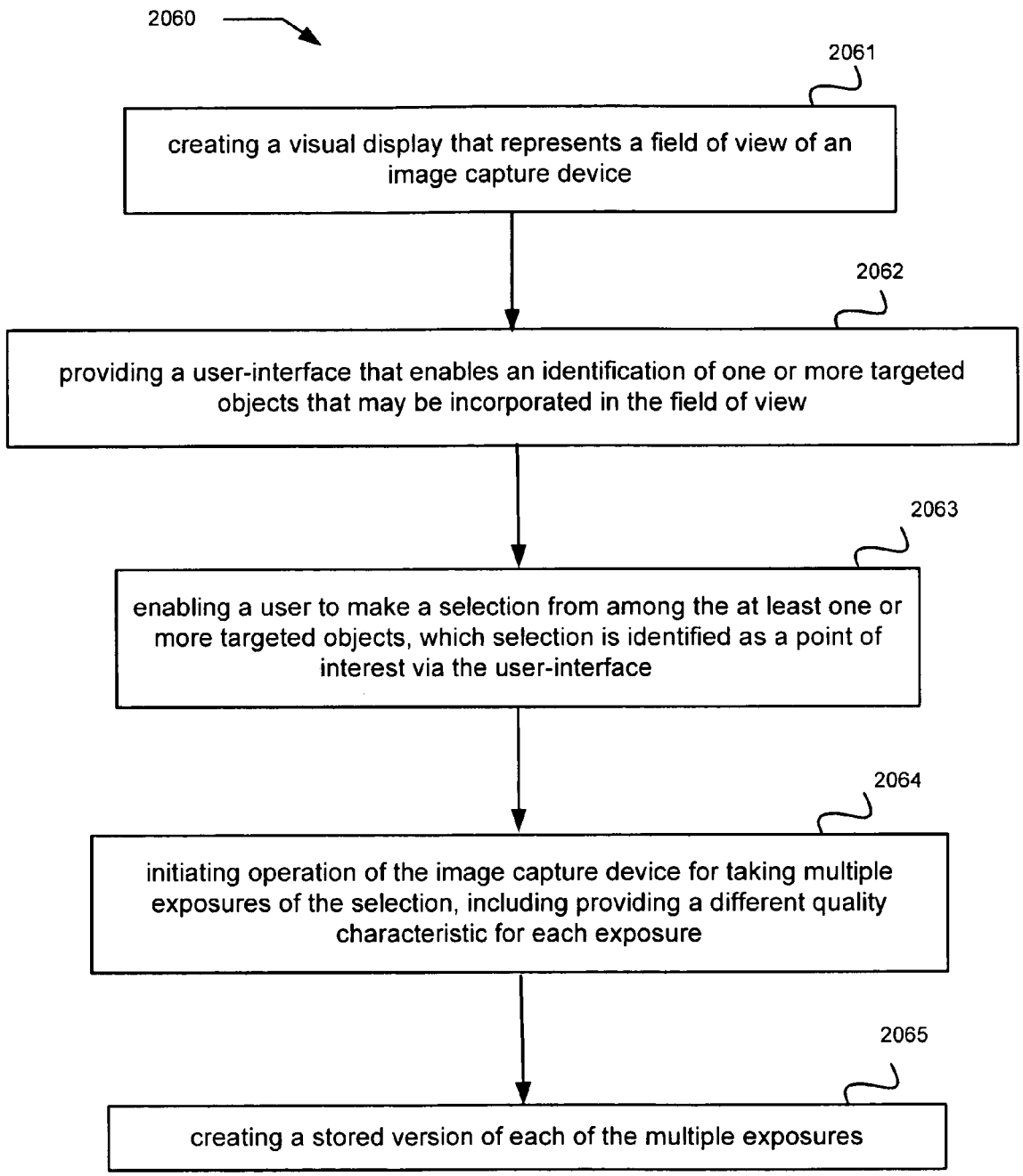
FIG. 52 is a high level flow chart illustrating another exemplary process embodiment.

Referring to the exemplary process embodiment 2060 of FIG. 52, various possible aspects of an image capturing method are illustrated including creating a visual display that represents a field of view of an image capture device (block 2061); providing a user-interface that enables an identification of one or more targeted objects that may be incorporated in the field of view (block 2062); and enabling a user to make a selection from among the at least one or more targeted objects, which selection is identified as a point of interest via the user-interface (block 2063). Other aspects may include initiating operation of the image capture device for taking multiple exposures of the selection, including providing a different quality characteristic for each exposure (block 2064); and creating a stored version of each of the multiple exposures (block 2065).

Figure 53:
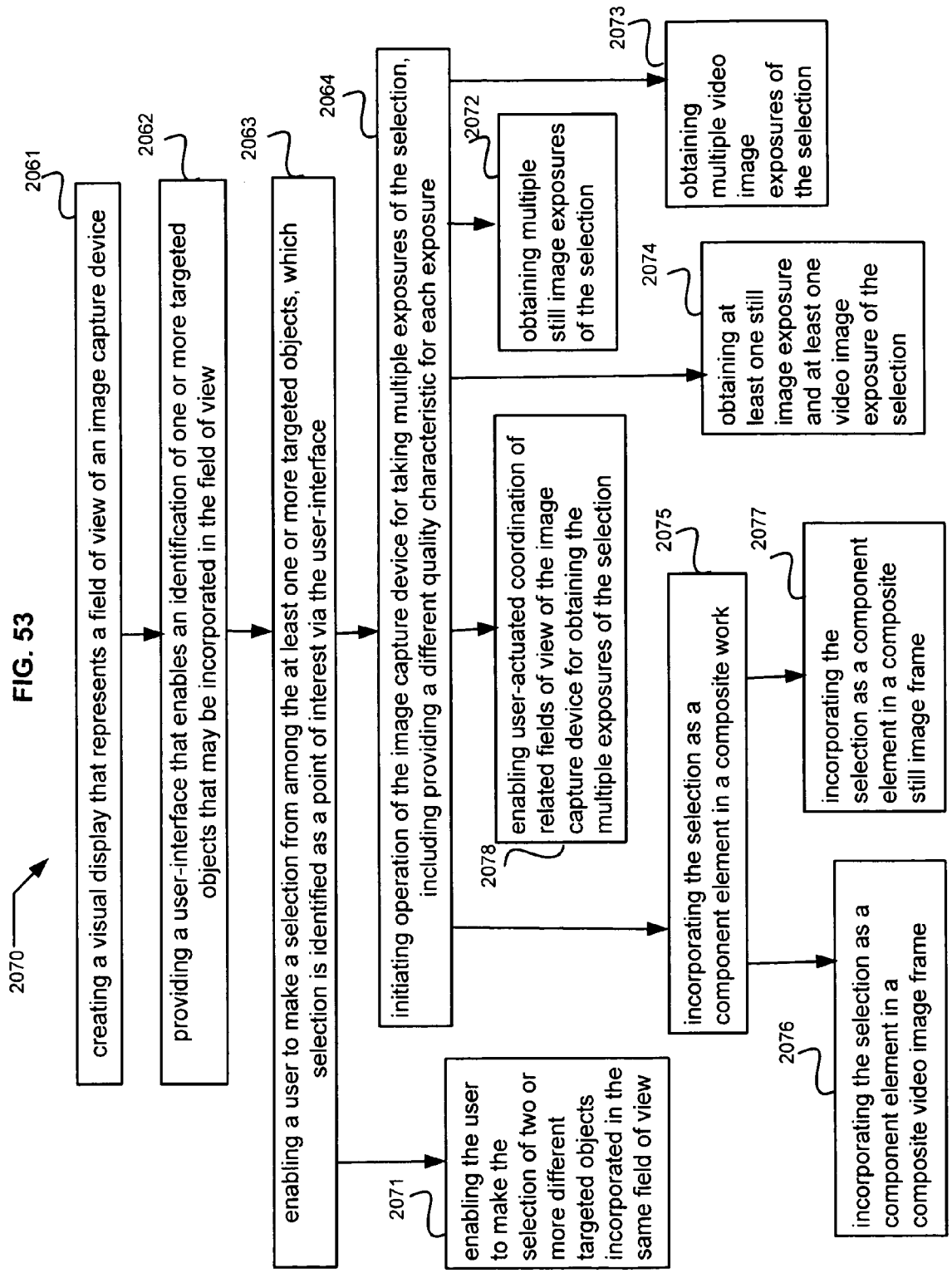
FIGS. 53-57 are detailed flow charts depicting other exemplary embodiments.

The exemplary embodiment features 2070 illustrated in FIG. 53 include the previously described process components 2061, 2062, 2063, 2064 in combination with various possible aspects relating to selection of targeted objects. For example, an implementation feature may include enabling the user to make the selection of two or more different targeted objects incorporated in the same field of view (block 2071). Other possible aspects may include obtaining multiple still image exposures (block 2072) and multiple video image exposures (block 2073) of the selection.

Another exemplary feature may include enabling user-actuated coordination of the related fields of view of the image capture device for obtaining the multiple exposures of the selection (block 2078).

Additional possible aspects shown in FIG. 53 may include obtaining at least one still image exposure and at least one video image exposure of the selection (block 2074). Further possible implementation features may include incorporating the selection of targeted objects as a component element in a composite work (block 2075), incorporating the selection as a component element in a composite video image frame (block 2076), and incorporating the selection of targeted objects as a component element in a composite still image frame (block 2077).

It is to be noted that various image capture systems and methods have been suggested as a basis for constructing composite images. In that regard, see the subject matter of the following commonly assigned related applications which are incorporated herein by reference: U.S. Ser. No. 10/764,431 filed 21 Jan. 2004, entitled IMAGE CORRECTION USING INDIVIDUAL MANIPULATION OF MICROLENSES IN A MICROLENS ARRAY, issued 22 Nov. 2005 as U.S. Pat. No. 6,967,780; and U.S. Ser. No. 10/785,697 filed 24 Feb. 2004, entitled VOLUMETRIC IMAGE USING "VIRTUAL" LENSLETS, published 25 Aug. 2005 as publication No. 2005/0185062.

Figure 54:
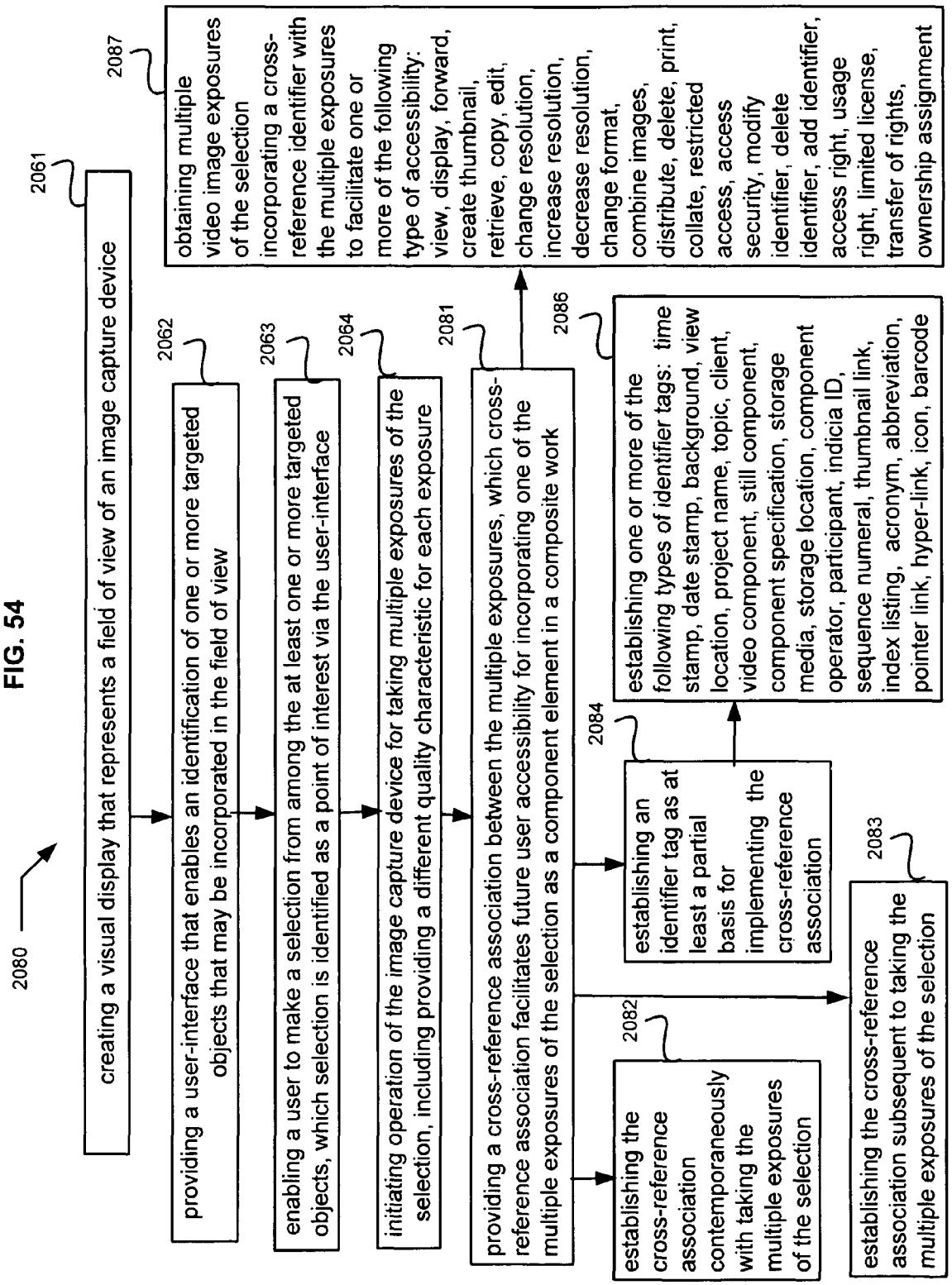

The exemplary process features 2080 illustrated in FIG. 54 include previously described process components 2061, 2062, 2063, 2064 in combination with providing a cross-reference association between the multiple exposures, which cross-reference association facilitates future user accessibility for incorporating one of the multiple exposures of the selection as a component element in a composite work (block 2081).

Other possible cross-reference features shown in FIG. 54 may include establishing the cross-reference association contemporaneously with taking the multiple exposures of the selection (block 2082), establishing the cross-reference association subsequent to taking the multiple exposures of the selection (block 2083), and establishing an identifier tag as at least a partial basis for implementing the cross-reference association (block 2084).

An additional aspect may include establishing one or more of the following types of identifier tags: time stamp, date stamp, background, view location, project name, topic, client, video component, still component, component specification, storage media, storage location, component operator, participant, indicia ID, sequence numeral, thumbnail link, index listing, acronym, abbreviation, pointer link, hyper-link, icon, and barcode (block 2086).

A further aspect may include incorporating a cross-reference identifier with the multiple exposures to facilitate one or more of the following type of accessibility: view, display, forward, create thumbnail, retrieve, copy, edit, change resolution, increase resolution, decrease resolution, change format, combine images, distribute, delete, print, collate, restricted access, access security, modify identifier, delete identifier, add identifier, access right, usage right, limited license, transfer of rights, and ownership assignment (block 2087).

Figure 55:
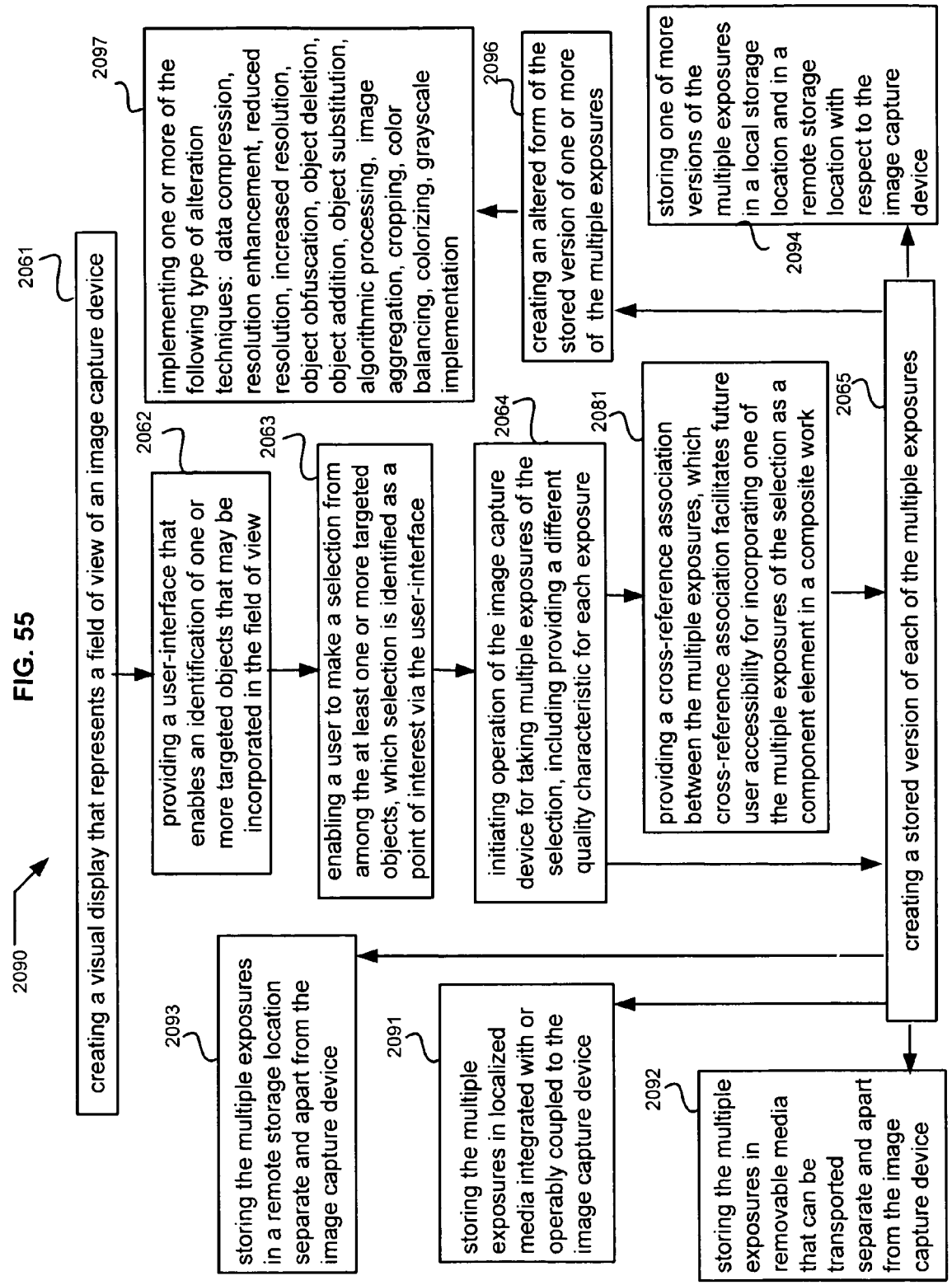

Referring to FIG. 55, exemplary process embodiments 2090 may include previously described features 2061, 2062, 2063, 2064, 2065 along with various storage implementation features. For example, possible aspects may include storing the multiple exposures in localized media integrated with or operably coupled to the image capture device (block 2091), storing the multiple exposures in removable media that can be transported separate and apart from the image capture device (block 2092), and storing the multiple exposures in a remote storage location separate and apart from the image capture device (block 2093).

An additional possible aspect may include storing one of more versions of the multiple exposures in a local storage location and in a remote storage location with respect to the image capture device (block 2094). A further possible implementation feature may include creating an altered form of the stored version of one or more of the multiple exposures (block 2096).

Another possible feature may include implementing one or more of the following type of alteration techniques: data compression, resolution enhancement, reduced resolution, increased resolution, object obfuscation, object deletion, object addition, object substitution, algorithmic processing, image aggregation, cropping, color balancing, colorizing, and grayscale implementation (block 2097).

Figure 56:
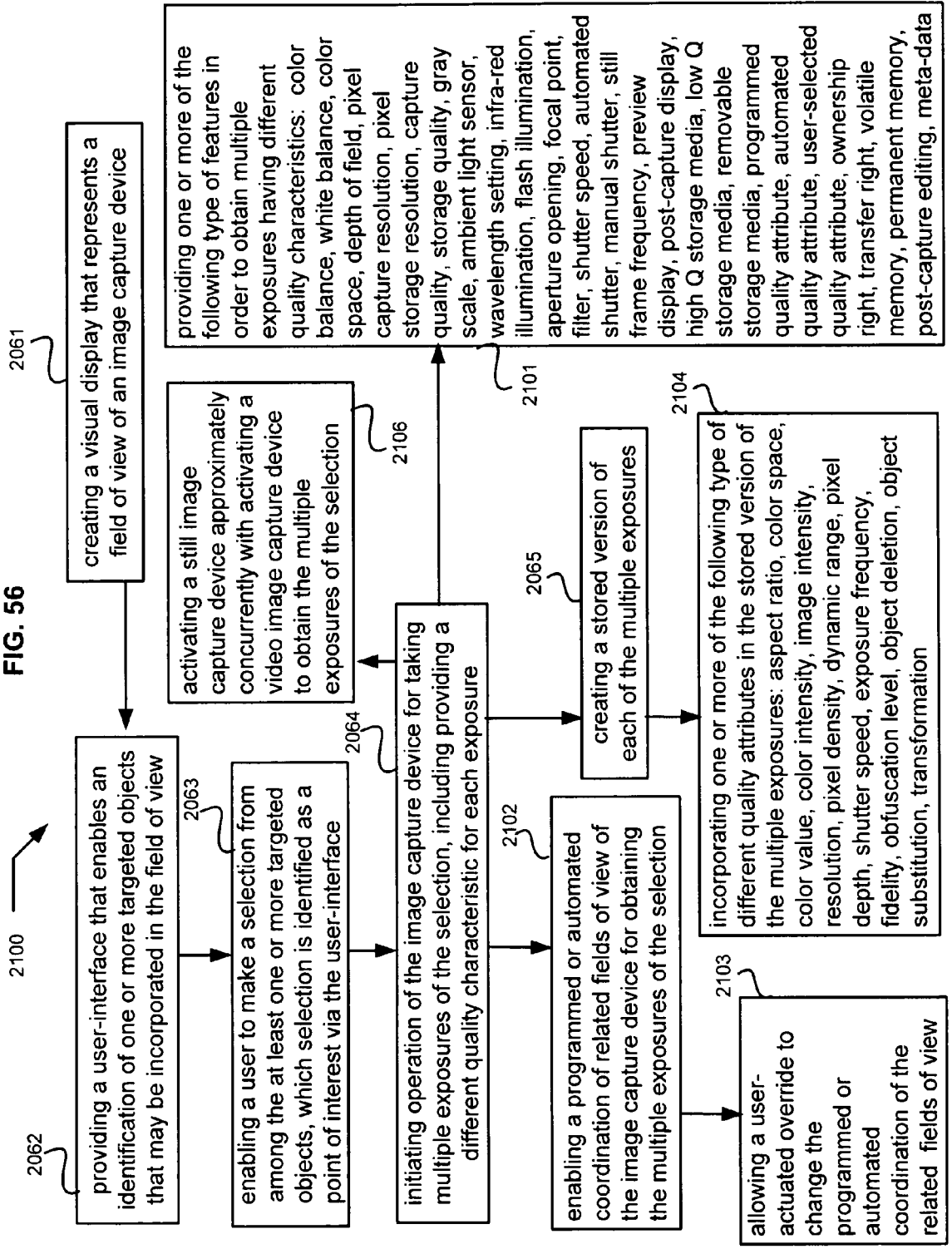

The illustrated embodiment features 2100 of FIG. 56 include previously described aspects 2061, 2062, 2063, 2064, 2065 in combination with providing one or more of the following type of features in order to obtain multiple exposures having different quality characteristics: color balance, white balance, color space, depth of field, pixel capture resolution, pixel storage resolution, capture quality, storage quality, gray scale, ambient light sensor, wavelength setting, infra-red illumination, flash illumination, aperture opening, focal point, filter, shutter speed, automated shutter, manual shutter, still frame frequency, preview display, post-capture display, high Q storage media, low Q storage media, removable storage media, programmed quality attribute, automated quality attribute, user-selected quality attribute, ownership right, transfer right, volatile memory, permanent memory, post-capture editing, and meta-data (block 2101).

Additional exemplary features may include enabling a programmed or automated coordination of related fields of view of the image capture device for obtaining the multiple exposures of the selection (block 2102), and allowing a user-actuated override to change the programmed or automated coordination of the related fields of view (block 2103).

Another implementation feature may include incorporating one or more of the following type of different quality attributes in the stored version of the multiple exposures: aspect ratio, color space, color value, color intensity, image intensity, resolution, pixel density, dynamic range, pixel depth, shutter speed, exposure frequency, fidelity, obfuscation level, object deletion, object substitution, and transformation (block 2104). Another implementation feature may include activating a still image capture device approximately concurrently with activating a video image capture device to obtain the multiple exposures of the selection (block 2106).

Figure 57:
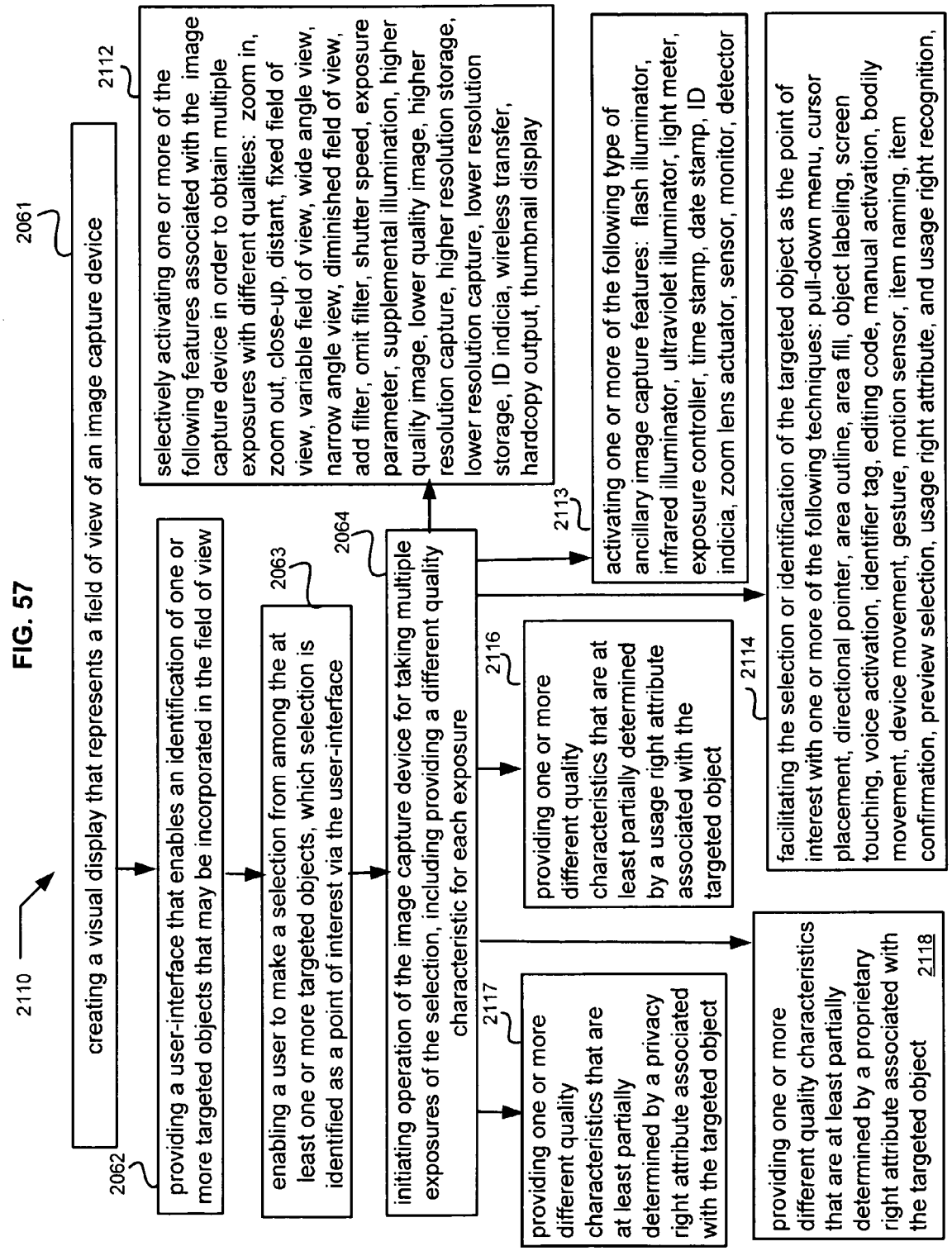

The flow chart features 2110 shown in FIG. 57 include previously described process components 2061, 2062, 2063, 2064 along with selectively activating one or more of the following features associated with the image capture device in order to obtain multiple exposures with different qualities: zoom in, zoom out, close-up, distant, fixed field of view, variable field of view, wide angle view, narrow angle view, diminished field of view, add filter, omit filter, shutter speed, exposure parameter, supplemental illumination, higher quality image, lower quality image, higher resolution capture, higher resolution storage, lower resolution capture, lower resolution storage, ID indicia, wireless transfer, hardcopy output, and thumbnail display (block 2112).

Further exemplary features may include activating one or more of the following type of ancillary image capture features: flash illuminator, infrared illuminator, ultraviolet illuminator, light meter, exposure controller, time stamp, date stamp, ID indicia, zoom lens actuator, sensor, monitor, and detector (block 2113). Other possible aspects may include facilitating the selection or identification of the targeted object as the point of interest with one or more of the following techniques: pull-down menu, cursor placement, directional pointer, area outline, area fill, object labeling, screen touching, voice activation, identifier tag, editing code, manual activation, bodily movement, device movement, gesture, motion sensor, item naming, item confirmation, preview selection, usage right attribute, and usage right recognition (block 2114), Additional exemplary features shown in FIG. 57 include providing one or more different quality characteristics that are at least partially determined by a usage right attribute associated with the targeted object (block 2116), and providing one or more different quality characteristics that are at least partially determined by a privacy right attribute associated with the targeted object (block 2117). Another exemplary feature may include providing one or more different quality characteristics that are at least partially determined by a proprietary right attribute associated with the targeted object (block 2118).

Figure 58:
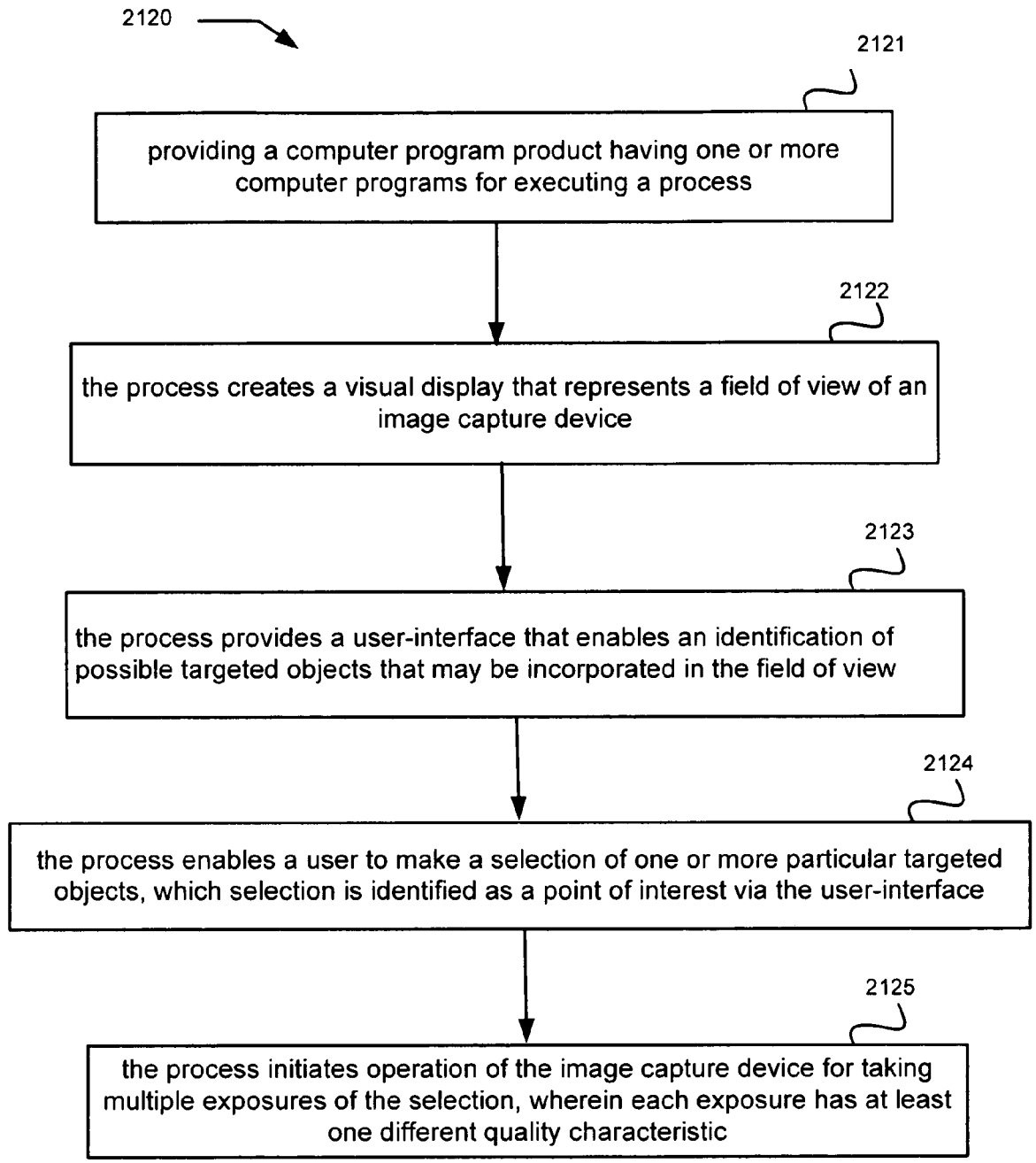
FIG. 58 illustrates an additional exemplary computer program product embodiment.

The high level flow chart of FIG. 58 illustrates an exemplary embodiment 2120 that includes a computer program product having one or more computer programs for executing a process (block 2121). A possible encoded process may include creating a visual display that represents a field of view of an image capture device (block 2122); providing a user-interface that enables an identification of possible targeted objects that may be incorporated in the field of view (block 2123); and enabling a user to make a selection of one or more particular targeted objects, which selection is identified as a point of interest via the user-interface (block 2124). A further exemplary encoded process aspect may include initiating operation of the image capture device for taking multiple exposures of the selection, wherein each exposure has at least one different quality characteristic (block 2125).

Various other aspects may be incorporated as part of a computer program product, including instructions for creating a data record that identifies the selection of one or more targeted objects as the point of interest. Other exemplary aspects may include encoded instructions for creating a stored version of the multiple exposures of the selection for future reference, and encoded instructions for enabling access and retrieval of visual elements incorporated in the stored version of the multiple exposures for incorporation in a composite work. It will be understood that storage media and/or signal communication media may incorporate encoded instructions for executing many types of process features.

Figure 59:
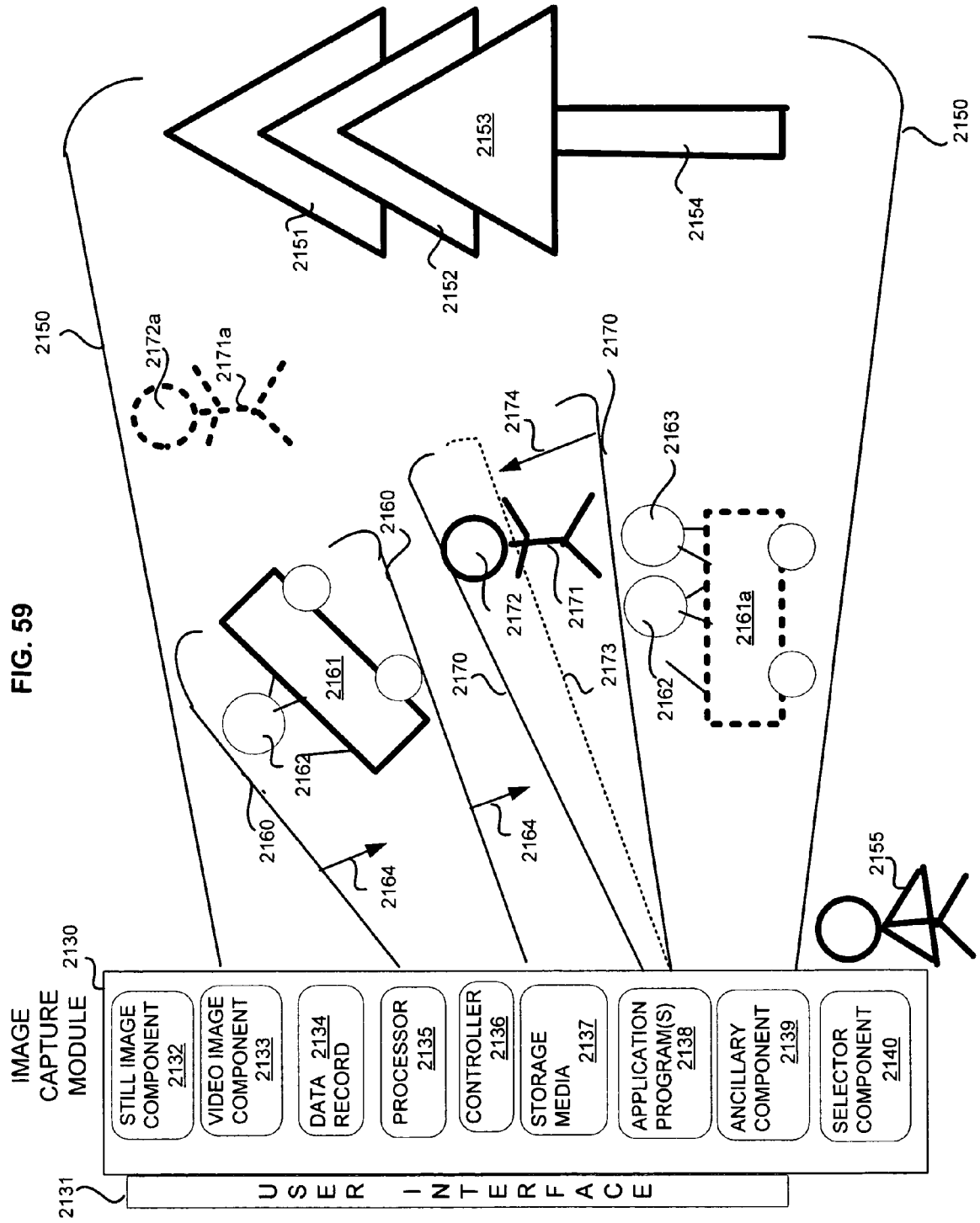
FIG. 59 is a schematic block diagram showing various exemplary implementation features for capturing multiple exposures.

The schematic block diagram embodiment features of FIG. 59 include image capture module 2130 and user interface 2131 that are configured for operative coupling with various types of component features for selection and capturing of multiple exposures of targeted objects. For example, illustrated exemplary components may include still image component 2132, video image component 2133, and data record 2134 as well as processor 2135 and controller 2136. Additional exemplary components may further include storage media 2137, one or more application programs 2138, one or more ancillary components 2139, and selector component 2140.

The exemplary embodiment features of image capture module 2130 may have capability for a wide angle field of view 2150 that covers many possible target objects. FIG. 59 shows a fixed field of view 2150 that is directed toward a targeted stationary background of trees 2151, 2152, 2153, 2154 (shown in bold outline). Such targeting may exclude other objects such as person 2155 who is shown to be outside the field of view boundaries. Of course person 2155 may from time to time wander in and out of the fixed field of view 2150, and may therefore be captured by still image component 2132 or video image component 2133.

FIG. 59 also shows another field of view 2160 that is capable of different alignments. For example, if vehicle 2161 (shown in bold outline) is selected as a targeted object, than one or more image capture components such as still image component 2132 or video image component 2133 may be subject to automatic or programmed or user-activated control to keep such targeted object within its field of view 2160. In other words, the targeted vehicle 2161 would remain within the desired field of view even though driver 2162 might exit the vehicle 2161 and leave it unoccupied. However, if the vehicle were occupied by an additional passenger 2163 and driven by driver 2162 to a new location (e.g., see vehicle 2161a outlined in bold phantom), the applicable image capture component would have capability to change its alignment direction (see arrows 2164) in order to keep the targeted vehicle within its field of view 2160.

It will be understood that driver 2162 or passenger 2163 are also possible target objects, and may be targeted by different image capture components depending on the circumstances. The exemplary target objects shown are by way of illustration only and are not intended to be limiting.

FIG. 59 shows a further field of view 2170 that is capable of wide or narrow boundaries (see arrow 2174) as well as different alignment positions. For example, if person 2171 (shown in bold outline) is selected as a target object, then one or more image capture components may be configured to keep such targeted object within its field of view 2170. A smaller object such as head 2172 may also be selected as a target object, and a narrower field of view (see dotted boundary 2173) combined with a zoom-in close up lens may be desirable in some circumstances.

In the event the targeted object such as person 2171 or head 2172 is relocated (see 2171a and 2172a shown in bold phantom outline), the applicable capture component can be re-aligned to keep the targeted object within the appropriate field of view.

Of course in some instances another image capture component (e.g., wide angle fixed field of view) could initiate coverage of a targeted object, thereby providing transfer capability between two image capture devices or alternatively simultaneous coverage (e.g. different angles, different focus, different resolution, etc.) of the same targeted object.

Figure 60:
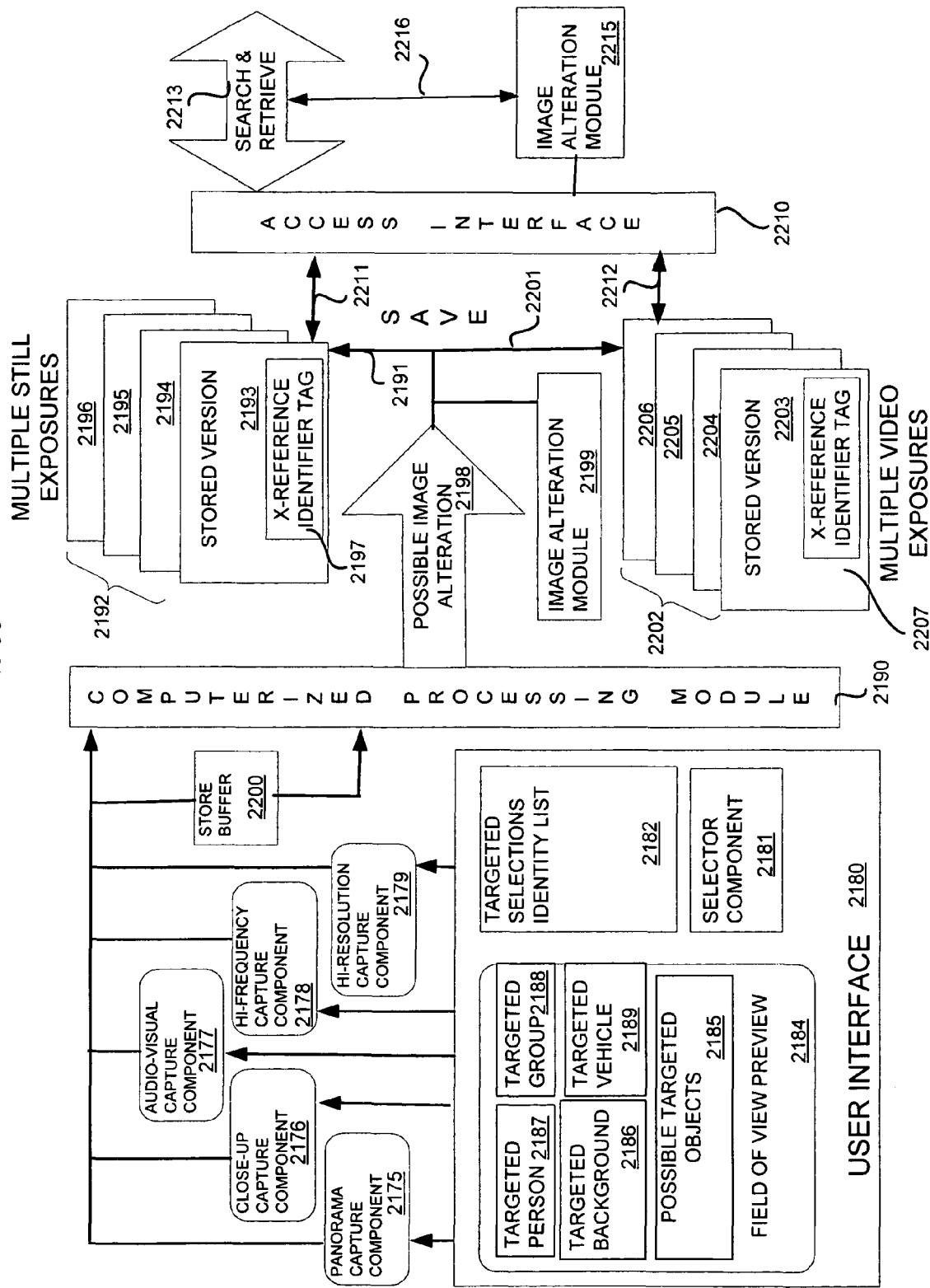
FIG. 60 is a schematic diagram illustrating exemplary components that may be used for capturing and processing multiple exposures.

Referring to the schematic diagram of FIG. 60, a representation of exemplary embodiment features shows user interface 2180 operatively coupled to various image capture devices such as panorama capture component 2175, close-up capture component 2176, audio-visual capture component 2177, hi-frequency capture component 2178, and hi-resolution capture component 2179.

The user interface 2180 may include selector component 2181 and a targeted selections identity list 2182. Another possible feature may include field of view preview 2184 that visually shows or otherwise identifies possible targeted objects 2185. The field of view preview may also show or otherwise identify targeted objects already selected such as a targeted background 2186, targeted person 2187, targeted group 2188, and targeted vehicle 2189.

Output images from the various capture components 2175, 2176, 2177, 2178, 2179 may be sent temporarily to a store buffer 2200 to await further processing, or in some instances may be sent directly to a computerized processing module 2190. Such processing may include providing some form of cross-reference association between different exposures of the same objects or related objects or unrelated objects or specified visual elements thereof. In some instances it may be desirable to make certain possible image alterations 2198 of captured exposures in accordance with quality standards, storage limitations, future usage expectations, and the like. Such editing may be accomplished by the computerized processing module 2190 or by a separate image alteration module 2199.

Some or all of the multiple still exposures 2192 in original or altered form may be transferred via communication link 2191 to be saved on local and/or remote storage media for future reference. Similarly some or all of the multiple video exposures 2202 in original or altered form may be transferred via communication link 2201 to be saved on local and/or remote storage media for future reference.

Of course it will be understood that original or altered still/video image exposures may be stored together, or separately, or intermixed in various types of temporary or long-term storage arrangements. In that regard the exemplary processing, editing, and storage embodiments are provided by way of illustration and are not intended to be limiting.

As shown in FIG. 60, future usage of the still image multiple exposures 2192, may be accomplished via access interface 2210. For example, an authorized user of access interface 2210 can use communication link 2211 for purposes of search and retrieval 2213 of stored versions 2193, 2194, 2195, 2196. Searching of group still image categories or individual still image frames may by facilitated by an identification scheme based on cross-reference identifier tags 2197.

Similarly future usage of the video image multiple exposures 2202 may be accomplished via access interface 2210. For example, an authorized user of access interface 2210 can use communication link 2212 for purposes of search and retrieval 2213 of stored versions 2203, 2204, 2205, 2206. Searching of group video image categories or individual video image frames may by facilitated by an identification scheme based on cross-reference identifier tags 2207.

A further possible implementation feature may include an image alteration module 2215 linked to the access interface 2210 in order to provide an optional choice of obtaining a particular modification of an exposure image (see arrow 2216).

It will be understood from the exemplary embodiment features disclosed herein that some system implementations may provide a still image capture component for taking multiple still image frames of the designated targeted object, wherein the multiple still image frames each have different quality characteristics. A related system implementation may provide a video capture component for taking a stream of multiple video frames of the designated targeted object, wherein the multiple video frames each have different quality characteristics.

Further possible system implementation may include a still image capture component for taking multiple still image frames of the designated targeted object; and a video capture component for taking a stream of multiple video frames of the designated targeted object, wherein the multiple video frames each have different quality characteristics compared to the multiple still image frames.

In some instances an exemplary system implementation may incorporate storage media that includes one or more of the following type of cross-reference associations between the multiple exposures of the designated targeted object: time stamp, date stamp, background, view location, project name, topic, client, video component, still component, component specification, storage media, storage location, component operator, participant, indicia ID, sequence numeral, thumbnail link, index listing, acronym, abbreviation, pointer link, hyper-link, icon, and barcode.

Further possible system implementation may provide an interface linked to the storage media to enable access and retrieval of visual elements incorporated in the stored version of the multiple exposures of the designated object for incorporation in a composite work. In some instances the composite work may include a composite still image frame or a composite video image frame.

An exemplary system embodiment may include a controller configuration for programmed or automated activation of the image capture module to take multiple exposures of the designated targeted object. In some instances the controller configuration may provide for user-activation of the image capture module to take multiple exposures of the designated targeted object.

Another possible system feature may include a controller configuration to take multiple exposures of the designated targeted object based on different fields of view of the image capture module. A further possible system feature may provide an image capture module that includes one or more of the following component features for taking multiple exposures having different quality characteristics: zoom in, zoom out, close-up, distant, fixed field of view, variable field of view, wide angle view, narrow angle view, diminished field of view, add filter, omit filter, shutter speed, exposure parameter, supplemental illumination, higher quality image, lower quality image, higher resolution capture, higher resolution storage, lower resolution capture, lower resolution storage, ID indicia, wireless transfer, hardcopy output, and thumbnail display.

Additional system features may include a controller configuration for incorporating one or more of the following type of different quality attributes in the stored version of the multiple exposures: aspect ratio, color space, color value, color intensity, image intensity, resolution, pixel density, dynamic range, pixel depth, shutter speed, exposure frequency, fidelity, obfuscation level, object deletion, object substitution, and transformation.

Further possible system features may include a controller configuration to create an altered form of one or more multiple exposures to be retained by the storage media, which altered form is a modified version of the multiple exposures initially captured by the image capture module. In some instances an exemplary system may include a controller configuration for implementing one or more of the following alteration techniques for creating the altered form of the one or more multiple exposures to be retained by the storage media: data compression, resolution enhancement, reduced resolution, increased resolution, object obfuscation, object deletion, object addition, object substitution, algorithmic processing, image aggregation, cropping, color balancing, colorizing, and grayscale implementation.

Further possible system implementation features may includes one or more ancillary components for providing input information to the controller based on a monitored or sensed or detected event in the field of view of the image capture module regarding the designated target object, wherein said controller activates the image capture module in response to the input.

Figure 61:
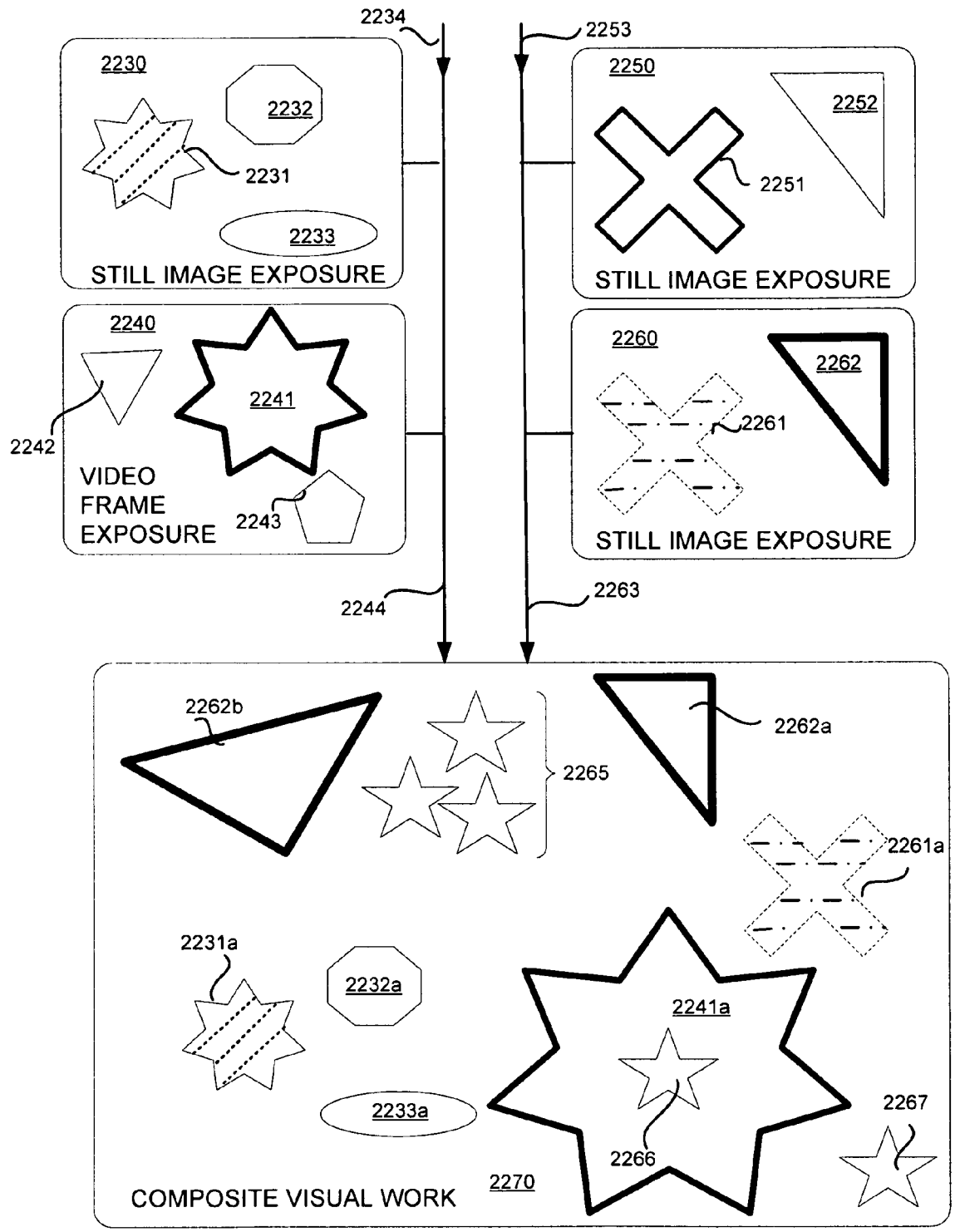
FIG. 61 is a diagrammatic representation of exemplary embodiment features for retrieval of captured image elements to be incorporated in a composite visual work.

FIG. 61 is a schematic representing showing a possible exemplary technique for using the temporarily stored exposure versions from store buffer 220 or the longer term storage media versions of multiple exposures 2192, 2202 (see FIG. 60) to create a composite visual work 2270.

For example, a still image exposure 2230 may include a still frame with targeted visual element 2231 (e.g., seven point symbol with interior design) having a particular set of quality characteristics. A video frame exposure 2240 may include a video frame with a same or related targeted visual element 2241 (e.g., larger bold-outlined seven point symbol) having a different set of quality characteristics. Pursuant to a search and retrieval operation exemplified by communication link arrow 2244, an altered version 2241*a* (e.g., further enlarged seven point symbol with superimposed element 2266) derived from video frame exposure 2240 has been chosen to be incorporated into the composite visual work 2270.

As a further example, a still image exposure 2250 may include a still frame with targeted visual element 2251 (e.g., bold outlined X-shaped symbol) having a particular set of quality characteristics. Another still image exposure 2260 may include a same or related targeted visual element 2261 (e.g., X-shaped symbol with interior design) having a different set of quality characteristics. Pursuant to a search and retrieval operation exemplified by communication link arrow 2263, an unchanged version 2261*a* taken from still image exposure 2260 has been chosen to be incorporated into the composite visual work 2270.

As an additional example, a still image exposure 2250 may include a still frame with targeted visual element 2252 (e.g., triangle symbol) having a particular set of quality characteristics. A video frame exposure 2260 may include a video frame with a same or related targeted visual element 2241 (e.g., bold outlined triangle symbol) having a different set of quality characteristics. Pursuant to a search and retrieval operation exemplified by communication link arrow 2263, an unchanged version 2262*a* as well as an altered version 2262*b* (e.g., rotated enlarged bold outlined triangle symbol) derived from video frame exposure 2243 have both been chosen to be incorporated into the composite visual work 2270.

As yet another example, a still image exposure 2230 may include a still frame with targeted (or in some instances untargeted) group visual elements 2231, 2232, 2233 having a particular set of quality characteristics. Another image exposure of this same or related group of visual elements may be unavailable. Pursuant to a search and retrieval operation exemplified by communication link arrow 2244, an unchanged version 2231*a*, 2232*a*, 2233*a* derived from still frame exposure 2230 has been chosen to be incorporated into the composite visual work 2270.

It is to be noted that other collections of captured images may be available (see communication link arrows 2234, 2253) for search and retrieval of related or unrelated visual elements to be considered for incorporation in the composite visual work 2270. For example, the grouping 2265 of visual elements (e.g., five point stars) as well as individual visual element 2267 (e.g., five point star) shown to be included in composite visual work 2270 may have been part of existing default elements, or may have been obtained from other collections of captured images.

Of course the geometric visual elements depicted in FIG. 61 are not intended to be attractive or aesthetic, but are merely illustrative symbols that represent the countless visual objects and/or portions thereof that can be targeted, captured, saved, altered, and in some instances ultimately incorporated in a composite visual work.

It will be understood that composite visual work 2270 may constitute a tentative composite display subject to further evaluation, deletions, substitution, reorientation, additions, modification, etc. In some instances it may constitute a completed composite display to be exhibited, distributed, reproduced, etc. Of course retrieved visual elements may be incorporated in the composite visual work 2270 in their original form as distinct elements, or otherwise incorporated as aggregated elements that may be superimposed, altered, transformed, cropped, fragmented, etc. or otherwise modified in ways that are impossible to enumerate.

Various types of operational features disclosed herein may be implemented in exemplary image capture system embodiments. For example, an exemplary system feature may include one or more ancillary components for helping to provide different types of enhanced still or video images derived from a field of view for the image capture module. Other possible system features may include one or more ancillary components for providing input information to the control means based on a monitored or sensed or detected event in a fixed or variable field of view of the video capture component or of the still image capture component.

Further possible system features may include control means for implementing user coordination or programmed coordination or automated coordination of the related fields of view of the video capture component and the still image capture component.

It will be understood by those skilled in the art that the various components and elements disclosed in the block diagrams herein as well as the various steps and sub-steps disclosed in the flow charts herein may be incorporated together in different claimed combinations in order to enhance possible benefits and advantages.

The exemplary system, apparatus, and computer program product embodiments disclosed herein including FIGS. 1-4 and FIGS. 9-11 and FIG. 19 and FIGS. 38-39 and FIG. 51 and FIGS. 59-61 along with other components, devices, know-how, skill and techniques that are known in the art have the capability of implementing and practicing the methods and processes shown in FIGS. 5-8 and FIGS. 12-18 and FIGS. 20-37 and FIGS. 40-50 and FIGS. 52-58. It is to be understood that the methods and processes can be incorporated in one or more different types of computer program products with a carrier medium having program instructions encoded thereon. However it is to be further understood by those skilled in the art that other systems, apparatus and technology may be used to implement and practice such methods and processes.

Those skilled in the art will also recognize that the various aspects of the embodiments for methods, processes, apparatus and systems as described herein can be implemented, individually and/or collectively, by a wide range of hardware, software, firmware, or any combination thereof.

It will be understood that variations may be incorporated in the methods, systems and program products disclosed herein for determining what data to transfer to the separate storage location, and what data to be retained by the capture device. Some predetermined guidelines or real-time decisions may be employed to determine how and whether to organize and reorganize the transferred data as well as how and whether to organize and reorganize the retained data. Possible factors may include rule guidelines, user input, context at the capture (e.g., transferring) device and/or at the separate storage location. Other types of factors may include space, bandwidth, device capabilities, accessibility of remote storage, cost task, preferences, etc.

It will be further understood that a possible return transfer (e.g., retrieval, etc.) from the separate storage location back to the capture device or other designated device (e.g., another device being used by an authorized user or other authorized third party) may depend on various factors such as freed-up or added device storage, bandwidth opportunities, tasks, context, etc.

Various computer program product embodiments and process components may include allowing accessibility to the selected captured data by an authorized party, as well as accessibility to the selected captured data by a designated device. Other possible features may include storage media or communication media for encoding process instructions.

It will be understood from the illustrative examples herein that a technique as disclosed herein processes captured data on a device, wherein selected captured data of a given quality resolution is transferred via a communication link to a separate storage location for future availability. A storage protocol may include different storage organization categories. A possible aspect includes an identifier record to enable future accessibility to selected captured data by one or more authorized parties or approved devices or authorized recipients. In some embodiments the captured data may include both a video data stream and one or more still image frames having different quality characteristics and/or formats. Initial and ongoing coordination as well as correlation may be facilitated between video and still image data derived from related fields of view.

Further exemplary embodiments provide a technique that processes captured images derived from selected targeted objects in a field of view. The captured images may be transferred via a communication link to a storage location for future availability. A possible aspect may provide a cross-reference association between saved multiple exposures having different quality characteristics. In some instances an identifier record is provided to enable future accessibility to selected captured data by one or more authorized parties or approved devices or authorized recipients. In some embodiments the captured data may include both a video data stream and one or more still image frames derived from related fields of view. Stored versions of the captured images may be provided in original or altered form to be incorporated in a composite visual work.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost versus efficiency tradeoffs. Those having skill in the art will appreciate that there are various vehicles by which processes and/or systems and/or other technologies described herein can be effected (e.g., hardware, software, and/or firmware), and that the preferred vehicle may vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle may be deployed and the specific concerns (e.g., speed, flexibility, or predictability) of the implementer, any of which may vary. Those skilled in the art will recognize that optical aspects of implementations will require optically-oriented hardware, software, and or firmware.

The foregoing detailed description has set forth various embodiments of the devices and/or processes via the use of block diagrams, flow diagrams, operation diagrams, flowcharts, illustrations, and/or examples. Insofar as such block diagrams, operation diagrams, flowcharts, illustrations, and/or examples contain one or more functions and/or operations, it will be understood by those within the art that each function and/or operation within such block diagrams, operation diagrams, flowcharts, illustrations, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory; and transmission type media such as digital and analog communication links using TDM or IP based communication links (e.g., packet links).

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.).

The herein described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality. Any two components capable of being so associated can also be viewed as being "operably couplable" to each other to achieve the desired functionality. Specific examples of operably couplable include but are not limited to physically mateable and/or physically interacting components and/or wirelessly interactable and/or wirelessly interacting components.

As a further definition of "open" terms in the present specification and claims, it will be understood that usage of a language construction "A or B" is generally interpreted as a non-exclusive "open term" meaning: A alone, B alone, A and B together.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

We claim:

1. A method of capturing an image comprising:
   creating a visual display that represents a field of view of at least one image capture device;
   providing a user-interface that enables an identification of one or more targeted objects that may be incorporated in the field of view, wherein data representing the identification of the one or more targeted objects includes at least audio data;
   enabling a user to make a selection from among the at least one or more targeted objects, which selection is identified as a point of interest via the user-interface;
   initiating operation of the at least one image capture device for obtaining multiple exposures of the selection, including at least providing a different quality characteristic for at least one exposure;
   creating a stored version of at least some of the multiple exposures; and
   activating a still image capture device approximately concurrently with activating a video image capture device to obtain the multiple exposures of the selection.

2. The method of claim 1 wherein said enabling the user to make the selection from among the at least one or more targeted objects includes;
   enabling the user to make the selection of two or more different targeted objects incorporated in the same field of view.

3. The method of claim 1 wherein said initiating operation of the at least one image capture device for obtaining multiple exposures of the selection includes:
   obtaining multiple still image exposures of the selection.

4. The method of claim 1 wherein said initiating operation of the at least one image capture device for obtaining multiple exposures of the selection includes:
   obtaining multiple video image exposures of the selection.

5. The method of claim 1 wherein said initiating operation of the at least one image capture device for obtaining multiple exposures of the selection includes:
   obtaining at least one still image exposure and at least one video image exposure of the selection.

6. The method of claim 1 further comprising:
   incorporating the selection as a component element in a composite work.

7. The method of claim 6 wherein said incorporating the selection includes:
   incorporating the selection as a component element in a composite video image frame.

8. The method of claim 6 wherein said incorporating the selection includes:
   incorporating the selection as a component element in a composite still image frame.

9. The method of claim 1 further comprising:
   providing a cross-reference association between the multiple exposures, which cross-reference association facilitates future user accessibility for incorporating one of the multiple exposures of the selection as a component element in a composite work.

10. The method of claim 9 wherein said providing the cross-reference association includes:
    establishing the cross-reference association contemporaneously with obtaining the multiple exposures of the selection.

11. The method of claim 9 wherein said providing the cross-reference association includes:
    establishing the cross-reference association subsequent to obtaining the multiple exposures of the selection.

12. The method of claim 9 wherein said providing the cross-reference association includes:
    establishing an identifier tag as at least a partial basis for implementing the cross-reference association.

13. The method of claim 12 wherein said establishing the identifier tag includes;
    establishing one or more of the following types of identifier tags: time stamp, date stamp, background, view location, project name, topic, client, video component, still component, component specification, storage media, storage location, component operator, participant, indicia 10, sequence numeral, thumbnail link, index listing, acronym, abbreviation, pointer link, hyper-link, icon, and barcode.

14. The method of claim 9 wherein said providing the cross-reference association includes:
    incorporating a cross-reference identifier with the multiple exposures to facilitate one or more of the following type of accessibility: view, display, forward, create thumbnail, retrieve, copy, edit, change resolution, increase resolution, decrease resolution, change format, combine images, distribute, delete, print, collate, restricted access, access security, modify identifier, delete identifier, add identifier, access right, usage right, limited license, transfer of rights, and ownership assignment.

15. The method of 1 wherein said creating the stored version of the multiple exposures includes:
    storing the multiple exposures in localized media integrated with or operably coupled to the image capture device.

16. The method of claim 1 wherein said creating the stored version of the multiple exposures includes:
    storing the multiple exposures in removable media that can be transported separate and apart from the image capture device.

17. The method of claim 1 wherein said creating the stored version of the multiple exposures includes:
    storing the multiple exposures in a remote storage location separate and apart from the image capture device.

18. The method of claim 1 wherein said creating the stored version of the multiple exposures includes:
    storing one of more versions of the multiple exposures in a local storage location and in a remote storage location with respect to the image capture device.

19. The method of claim 1 wherein said creating the stored version of the multiple exposures includes:
    creating an altered form of the stored version of one or more of the multiple exposures.

20. The method of claim 19 wherein said creating an altered form of the stored version includes:
    implementing one or more of the following type of alteration techniques: data compression, resolution enhancement, reduced resolution, increased resolution, object obfuscation, object deletion, object addition, object substitution, algorithmic processing, image aggregation, cropping, color balancing, colorizing, and grayscale implementation.

21. The method of claim 1 further comprising:
providing one or more of the following type of features in order to obtain multiple exposures having different quality characteristics: color balance, white balance, color space, pixel capture resolution, pixel storage resolution, capture quality, storage quality, gray scale, ambient light sensor, wavelength setting, infra-red illumination, flash illumination, aperture opening, focal point, filter, shutter speed, automated shutter, manual shutter, still frame frequency, preview display, post-capture display, high Q storage media, low Q storage media, removable storage media, programmed quality attribute, automated quality attribute, user-selected quality attribute, ownership right, transfer right, volatile memory, permanent memory, post-capture editing, and meta-data.

22. The method of claim 1 further comprising:
enabling a programmed or automated coordination of related fields of view of the image capture device for obtaining the multiple exposures of the selection.

23. The method of claim 22 further comprising:
allowing a user-actuated override to change the programmed or automated coordination of the related fields of view.

24. The method of claim 1 further comprising:
enabling user-actuated coordination of the related fields of view of the image capture device for obtaining the multiple exposures of the selection.

25. The method of claim 1 further comprising:
incorporating one or more of the following type of different quality attributes in the stored version of the multiple exposures: aspect ratio, color space, color value, color intensity, image intensity, resolution, pixel density, dynamic range, pixel depth, shutter speed, exposure frequency, fidelity, obfuscation level, object deletion, object substitution, and transformation.

26. The method of claim 1 further comprising:
selectively activating one or more of the following features associated with the image capture device in order to obtain multiple exposures with different qualities: zoom in, zoom out, close-up, distant, fixed field of view, variable field of view, wide angle view, narrow angle view, diminished field of view, add filter, omit filter, shutter speed, exposure parameter, supplemental illumination, higher quality image, lower quality image, higher resolution capture, higher resolution storage, lower resolution capture, lower resolution storage, ID indicia, wireless transfer, hardcopy output, and thumbnail display.

27. The method of claim 1 wherein obtaining the multiple exposures having different quality characteristics includes;
activating one or more of the following type of ancillary image capture features: flash illuminator, infrared illuminator, ultraviolet illuminator, light meter, exposure controller, time stamp, date stamp, ID indicia, zoom lens actuator, sensor, monitor, and detector.

28. The method of claim 1 wherein said enabling the user to make the selection includes:
facilitating the selection or identification of the targeted object as the point of interest with one or more of the following techniques: pull-down menu, cursor placement, directional pointer, area outline, area fill, object labeling, screen touching, voice activation, identifier tag, editing code, manual activation, bodily movement, device movement, gesture, motion sensor, item naming, item confirmation, preview selection, usage right attribute, and usage right recognition.

29. The method of claim 1 wherein providing a different quality characteristic for at least one exposure includes:
providing one or more different quality characteristics that are at least partially determined by a usage right attribute associated with the targeted object.

30. The method of claim 1 wherein providing a different quality characteristic for at least one exposure includes:
providing one or more different quality characteristics that are at least partially determined by a privacy right attribute associated with the targeted object.

31. The method of claim 1 wherein providing a different quality characteristic for at least one exposure includes:
providing one or more different quality characteristics that are at least partially determined by a proprietary right attribute associated with the targeted object.

32. The method of claim 1 wherein providing a user-interface that enables an identification of one or more targeted objects that may be incorporated in the field of view, wherein data representing the identification of the one or more targeted objects includes at least audio data comprises:
providing a user-interface that enables an identification of the one or more targeted objects that may be incorporated in the field of view, wherein the data representing the identification of the one or more targeted objects includes at least the audio data, the audio data includes at least data acquired by voice activation.

33. The method of claim 1 wherein initiating operation of the at least one image capture device for obtaining multiple exposures of the selection, including at least providing a different quality characteristic for at least one exposure comprises:
initiating operation of the at least one image capture device for obtaining the multiple exposures of the selection, including at least providing the different quality characteristic for the at least one exposure, the different quality characteristics includes at least color balance.

34. The method of claim 1 wherein initiating operation of the at least one image capture device for obtaining multiple exposures of the selection, including at least providing a different quality characteristic for at least one exposure comprises:
initiating operation of the at least one image capture device for obtaining the multiple exposures of the selection, including at least providing the different quality characteristic for the at least one exposure, the different quality characteristics includes at least depth of field.

35. The method of claim 1 wherein initiating operation of the at least one image capture device for obtaining multiple exposures of the selection, including at least providing a different quality characteristic for at least one exposure comprises:
initiating operation of the at least one image capture device for obtaining the multiple exposures of the selection, including at least providing the different quality characteristic for the at least one exposure, the different quality characteristics includes at least focal point.

36. The method of claim 1 further comprising:
controlling to keep the one or more targeted objects within the field of view.

37. The method of claim 36 wherein controlling to keep the one or more targeted objects within the field of view comprises:
controlling to keep the one or more targeted objects within the field of view by one or more automatic controls.

38. The method of claim 36 wherein controlling to keep the one or more targeted objects within the field of view comprises:
  controlling to keep the one or more targeted objects within the field of view by one or more programmed controls.

39. The method of claim 36 wherein controlling to keep the one or more targeted objects within the field of view comprises:
  controlling to keep the one or more targeted objects within the field of view by one or more user activated controls.

40. An image selection system comprising:
  an image capture module with one or more specified quality parameters for capturing one or more targeted objects that may be incorporated in a field of view, wherein data representing identification of the one or more targeted objects includes at least audio data;
  a user-interface for facilitating selection of a designated targeted object, wherein the user-interface includes at least a data record that identifies the designated targeted object as a point of interest;
  a controller operatively coupled to the data record and configured to activate the image capture module to take multiple exposures of the designated targeted object, wherein the multiple exposures each have different quality characteristics; and
  storage media for retaining a stored version of the multiple exposures for future reference, wherein the stored version includes at least a cross-reference association between the multiple exposures of the designated targeted object.

41. The system of claim 10 wherein the image capture module includes:
  a still image capture component for taking multiple still image frames of the designated targeted object, wherein the multiple still image frames each have different quality characteristics.

42. The system of claim 10 wherein said image capture module includes:
  a video capture component for taking a stream of multiple video frames of the designated targeted object, wherein the multiple video frames each have different quality characteristics.

43. The system of claim 40 wherein said image capture module includes:
  a still image capture component for taking multiple still image frames of the designated targeted object; and
  a video capture component for taking a stream of multiple video frames of the designated targeted object, wherein the multiple video frames each have different quality characteristics compared to the multiple still image frames.

44. The system of claim 40 wherein said storage media includes one or more of the following type of cross-reference associations between the multiple exposures of the designated targeted object:
  time stamp, date stamp, background, view location, project name, topic, client, video component, still component, component specification, storage media, storage location, component operator, participant, indicia 10, sequence numeral, thumbnail link, index listing, acronym, abbreviation, pointer link, hyper-link, icon, and barcode.

45. The system of claim 44 further comprising:
  an interface linked to the storage media to enable access and retrieval of visual elements incorporated in the stored version of the multiple exposures of the designated object for incorporation in a composite work.

46. The system of claim 44 further comprising:
  an interface linked to the storage media to enable access and retrieval of visual elements incorporated in the stored version of the multiple exposures of the designated object for incorporation in a composite still image frame or a composite video image frame.

47. The system of claim 40 wherein said controller includes:
  a controller configuration for programmed or automated activation of the image capture module to take multiple exposures of the designated targeted object.

48. The system of claim 40 wherein said controller includes:
  a controller configuration for user-activation of the image capture module to take multiple exposures of the designated targeted object.

49. The system of claim 40 wherein said controller includes;
  a controller configuration to take multiple exposures of the designated targeted object based on different fields of view of the image capture module.

50. The system of claim 40 wherein said image capture module includes one or more of the following component features for taking multiple exposures having different quality characteristics:
  zoom in, zoom out, close-up, distant, fixed field of view, variable field of view, wide angle view, narrow angle view, diminished field of view, add filter, omit filter, shutter speed, exposure parameter, supplemental illumination, higher quality image, lower quality image, higher resolution capture, higher resolution storage, lower resolution capture, lower resolution storage, ID indicia, wireless transfer, hardcopy output, and thumbnail display.

51. The system of claim 40 wherein said controller includes:
  a controller configuration for incorporating one or more of the following type of different quality attributes in the stored version of the multiple exposures: aspect ratio, color space, color value, color intensity, image intensity, resolution, pixel density, dynamic range, pixel depth, shutter speed, exposure frequency, fidelity, obfuscation level, object deletion, object substitution, and transformation.

52. The system of claim 40 wherein said controller includes:
  a controller configuration to create an altered form of one or more multiple exposures to be retained by the storage media, which altered form is a modified version of the multiple exposures initially captured by the image capture module.

53. The system of claim 52 wherein said controller includes:
  a controller configuration for implementing one or more of the following alteration techniques for creating the altered form of the one or more multiple exposures to be retained by the storage media: data compression, resolution enhancement, reduced resolution, increased resolution, object obfuscation, object deletion, object addition, object substitution, algorithmic processing, image aggregation, cropping, color balancing, colorizing, and grayscale implementation.

54. The system of claim 40 further comprising:
  one or more ancillary components for providing input information to the controller based on a monitored or sensed or detected event in the field of view of the image capture module regarding the designated target object, wherein said controller activates the image capture module in response to the input information.

55. The system of claim 40 wherein an image capture module with one or more specified quality parameters for capturing one or more targeted objects that may be incorporated in a field of view, wherein data representing identification of the one or more targeted objects includes at least audio data comprises:
an image capture module with one or more quality parameters for capturing the one or more targeted objects that may be incorporated in the field of view, wherein the data representing identification of the one or more targeted objects includes at least the audio data, the audio data includes at least voice activation data.

56. A computer program product comprising:
a non-transitory signal-bearing medium including at least:
one or more instructions for creating a visual display that represents a field of view of an image capture device;
one or more instructions for providing a user-interface that enables an identification of possible targeted objects that may be incorporated in the field of view, wherein data representing the identification of the possible targeted objects includes at least audio data;
one or more instructions for enabling a user to make a selection of one or more particular targeted objects, which selection is identified as a point of interest via the user-interface;
one or more instructions for initiating operation of the image capture device for obtaining multiple exposures of the selection, wherein at least one exposure has at least one different quality characteristic;
one or more instructions for creating a stored version of the multiple exposures of the selection for future reference; and
one or more instructions for activating a still image capture device approximately concurrently with activating a video image capture device to obtain the multiple exposures of the selection.

57. The computer program product of claim 56 further including:
one or more instructions for creating a data record that identifies the selection as the point of interest.

58. The computer program product of claim 56 further including:
one or more instructions for enabling access and retrieval of visual elements incorporated in the stored version of the multiple exposures for incorporation in a composite work.

59. The computer program product of claim 56 further comprising:
one or more instructions for a non-transitory storage media and/or a non-transitory signal communication media for encoding instructions for executing the process.

60. The computer program product of claim 56 further including:
one or more instructions for activating the image capture module in response to input information based on a monitored or sensed or detected event in the field of view of the image capture module.

61. A method of capturing an image comprising:
creating a visual display that represents a field of view of at least one image capture device;
providing a user-interface that enables an identification of the one or more targeted objects that may be incorporated in the field of view, the data representing the identification of the one or more targeted objects including at least audio data;
enabling a user to make a selection from among the at least one or more targeted objects, which selection is identified as a point of interest via the user-interface;
initiating operation of the at least one image capture device for obtaining multiple exposures of the selection, including at least providing a different quality characteristic for at least one exposure;
creating a stored version of at least some of the multiple exposures; and
activating a still image capture device approximately concurrently with activating a video image capture device to obtain the multiple exposures of the selection.

62. The method of claim 61 wherein providing a user-interface that enables an identification of the one or more targeted objects that may be incorporated in the field of view, the data representing the identification of the one or more targeted objects including at least audio data comprises:
providing the user-interface that enables the identification of the one or more targeted objects that may be incorporated in the field of view, the data representing the identification of the one or more targeted objects including at least audio data identifying unique surface features of the one or more targeted objects.

63. An image selection system comprising:
circuitry for creating a visual display that represents a field of view of at least one image capture device;
circuitry for providing the user-interface that enables an identification of the one or more targeted objects that may be incorporated in the field of view, the data representing the identification of the one or more targeted objects including at least audio data;
circuitry for enabling a user to make a selection from among the at least one or more targeted objects, which selection is identified as a point of interest via the user-interface;
circuitry for initiating operation of the at least one image capture device for obtaining multiple exposures of the selection, including at least providing a different quality characteristic for at least one exposure;
circuitry for creating a stored version of at least some of the multiple exposures, and
circuitry for activating a still image capture device approximately concurrently with activating a video image capture device to obtain the multiple exposures of the selection.

64. The system of claim 63 wherein circuitry for providing the user-interface that enables an identification of the one or more targeted objects that may be incorporated in the field of view, the data representing the identification of the one or more targeted objects including at least audio data comprises:
circuitry for providing the user-interface that enables the identification of the one or more targeted objects that may be incorporated in the field of view, the data representing the identification of the one or more targeted objects including at least audio data identifying unique surface features of the one or more targeted objects.

* * * * *

UNITED STATES PATENT AND TRADEMARK OFFICE
CERTIFICATE OF CORRECTION

| | |
|---|---|
| PATENT NO. | : 9,041,826 B2 |
| APPLICATION NO. | : 11/506760 |
| DATED | : May 26, 2015 |
| INVENTOR(S) | : Jung et al. |

It is certified that error appears in the above-identified patent and that said Letters Patent is hereby corrected as shown below:

In the Claims,

In Column 55, Line 32, Claim 41 please delete "The system of claim 10 wherein the image capture" and replace with --The system of claim 40 wherein the image capture--

In Column 55, Line 37, Claim 42 please delete "The system of claim 10 wherein said image capture" and replace with --The system of claim 40 wherein said image capture--

Signed and Sealed this
Twenty-fourth Day of November, 2015

Michelle K. Lee
*Director of the United States Patent and Trademark Office*